(12) United States Patent
Cho et al.

(10) Patent No.: US 12,169,606 B2
(45) Date of Patent: Dec. 17, 2024

(54) ELECTRONIC DEVICE INCLUDING FLEXIBLE DISPLAY, AND DISPLAY METHOD USING SAME

(71) Applicant: SAMSUNG ELECTRONICS CO., LTD., Suwon-si (KR)

(72) Inventors: Youngho Cho, Suwon-si (KR); Dahee Lim, Suwon-si (KR); Mooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/127,466

(22) Filed: Mar. 28, 2023

(65) Prior Publication Data

US 2023/0236697 A1 Jul. 27, 2023

Related U.S. Application Data

(63) Continuation of application No. PCT/KR2021/014877, filed on Oct. 22, 2021.

(30) Foreign Application Priority Data

Nov. 13, 2020 (KR) .......................... 10-2020-0152303
Mar. 8, 2021 (KR) .......................... 10-2021-0029936

(51) Int. Cl.
*G06F 3/041* (2006.01)
*G06F 1/16* (2006.01)
*G06F 3/044* (2006.01)

(52) U.S. Cl.
CPC ........ *G06F 3/04166* (2019.05); *G06F 1/1652* (2013.01); *G06F 3/0412* (2013.01); *G06F 3/044* (2013.01); *G06F 2203/04102* (2013.01)

(58) Field of Classification Search
CPC .. G06F 3/04166; G06F 1/1652; G06F 3/0412; G06F 3/044; G06F 2203/04102;
(Continued)

(56) References Cited

U.S. PATENT DOCUMENTS 9,019,313 B2 4/2015 Kwack et al.
9,646,407 B2 5/2017 Lee et al.
(Continued)

FOREIGN PATENT DOCUMENTS

JP 2005-099872 A 4/2005
JP 2018-005484 A 1/2018
(Continued)

OTHER PUBLICATIONS

Written Opinion (PCT/ISA/237) issued from the International Searching Authority on Jan. 20, 2022 to International Application No. PCT/KR2021/014877.
(Continued)

*Primary Examiner* — William Lu
(74) *Attorney, Agent, or Firm* — Sughrue Mion, PLLC

(57) ABSTRACT

According to various embodiments of the present disclosure, an electronic device includes: a housing; a touch circuit including a plurality of TX electrodes, and a plurality of RX electrodes arranged to cross over the plurality of TX electrode; a flexible display which includes the touch circuit, and which can be withdrawn from the inner space of the housing; a touch controller; and a processor operatively connected to the touch circuit, the flexible display and the touch controller, wherein the touch controller applies a driving signal by using the plurality of TX electrodes of the touch circuit, acquires the driving signal by using the plurality of RX electrodes, confirms a capacitance value on the basis of the acquired driving signal, and confirms information about a folded area of the flexible display on the basis of the
(Continued)

capacitance value, and the processor can set an activation area for an unfolded area of the flexible display on the basis of the folded area of the flexible display. Various embodiments, in addition to various embodiments disclosed in the present document, are also possible.

14 Claims, 36 Drawing Sheets

(58) Field of Classification Search
CPC ...... G06F 3/017; G06F 1/3228; G06F 1/3234; G09F 9/301
See application file for complete search history.

(56) References Cited

U.S. PATENT DOCUMENTS

| | | | |
|---|---|---|---|
| 10,254,907 B2 | 4/2019 | Nakanishi | |
| 10,416,722 B2 | 9/2019 | Cho et al. | |
| 10,444,917 B2 | 10/2019 | Seo et al. | |
| 10,488,957 B2* | 11/2019 | Kim | G09F 9/301 |
| 10,539,980 B2* | 1/2020 | Xu | G09F 9/00 |
| 10,684,714 B2* | 6/2020 | Seo | G06F 1/3218 |
| 10,877,525 B2* | 12/2020 | Kang | H04M 1/0268 |
| 10,936,016 B2* | 3/2021 | Zhang | G06F 1/1652 |
| 10,963,016 B1* | 3/2021 | Oh | G06F 3/0416 |
| 11,068,074 B2* | 7/2021 | Lee | H04M 1/0214 |
| 11,976,922 B1* | 5/2024 | Vandermeijden | G01B 7/30 |
| 2008/0291225 A1* | 11/2008 | Arneson | G06F 3/147 |
| | | | 345/698 |
| 2010/0167791 A1 | 7/2010 | Lim | |
| 2014/0015743 A1* | 1/2014 | Seo | G06F 3/017 |
| | | | 345/156 |
| 2014/0028596 A1* | 1/2014 | Seo | G06F 3/0487 |
| | | | 345/173 |
| 2014/0292672 A1* | 10/2014 | Choi | G06F 3/041 |
| | | | 345/173 |
| 2015/0261264 A1* | 9/2015 | Brown | G06F 3/044 |
| | | | 345/174 |
| 2015/0346776 A1* | 12/2015 | Miyake | G06F 3/0202 |
| | | | 345/174 |
| 2016/0034047 A1* | 2/2016 | Lee | G06F 3/0484 |
| | | | 345/156 |
| 2016/0054758 A1* | 2/2016 | Han | G06F 1/1652 |
| | | | 361/679.26 |
| 2016/0079329 A1* | 3/2016 | Lee | H10K 50/844 |
| | | | 257/40 |
| 2017/0102813 A1* | 4/2017 | Kuo | G06F 3/04166 |
| 2017/0329368 A1* | 11/2017 | Rho | H04M 1/0268 |
| 2018/0004322 A1* | 1/2018 | Nakanishi | H05K 9/0096 |
| 2018/0107306 A1* | 4/2018 | Hong | G06F 1/1626 |
| 2018/0121056 A1* | 5/2018 | Kyoya | G06F 1/1681 |
| 2018/0130974 A1* | 5/2018 | Koo | H10K 77/111 |
| 2020/0004295 A1* | 1/2020 | Paek | G06F 1/1652 |
| 2021/0048926 A1* | 2/2021 | Woo | G06F 3/041 |
| 2021/0343194 A1* | 11/2021 | Suga | G09F 9/301 |
| 2021/0407343 A1* | 12/2021 | Wu | H10K 59/873 |
| 2022/0291718 A1 | 9/2022 | Park | |
| 2023/0013804 A1* | 1/2023 | Kang | H04M 1/0268 |

FOREIGN PATENT DOCUMENTS

| | | |
|---|---|---|
| KR | 10-2014-0101611 A | 8/2014 |
| KR | 10-2015-0060278 A | 6/2015 |
| KR | 10-1562582 B1 | 10/2015 |
| KR | 10-2016-0087460 A | 7/2016 |
| KR | 10-2017-0008610 A | 1/2017 |
| KR | 10-2017-0010953 A | 2/2017 |
| KR | 10-2017-0025520 A | 3/2017 |
| KR | 10-2017-0069022 A | 6/2017 |
| KR | 10-2017-0074615 A | 6/2017 |
| KR | 10-2018-0026024 A | 3/2018 |
| KR | 10-1860880 B1 | 5/2018 |
| KR | 10-2069191 B1 | 1/2020 |
| KR | 10-2163740 B1 | 10/2020 |
| KR | 10-2205410 B1 | 1/2021 |
| KR | 10-2271289 B1 | 7/2021 |
| KR | 10-2022-0038048 A | 3/2022 |

OTHER PUBLICATIONS

International Search Report (PCT/ISA/210) issued from the International Searching Authority on Jan. 20, 2022 to International Application No. PCT/KR2021/014877.

Communication issued on Jan. 3, 2024 by the European Patent Office for European Patent Application No. 21892184.9.

* cited by examiner

ELECTRONIC DEVICE INCLUDING FLEXIBLE DISPLAY, AND DISPLAY METHOD USING SAME

CROSS-REFERENCE TO RELATED APPLICATION(S)

This application is a Bypass Continuation application of PCT International Application No. PCT/KR2021/014877, filed on Oct. 22, 2021, which is based on and claims priority to Korean Patent Application No. 10-2020-0152303, filed on Nov. 13, 2020 and Korean Patent Application No. 10-2021-0029936, filed on Mar. 8, 2021, both filed in the Korean Intellectual Property Office, the disclosures of which are incorporated by reference herein in their entireties.

BACKGROUND

1. Field

This disclosure relates to an electronic device including a flexible display and a display method using same.

2. Description of Related Art

An electronic device may have a limited size for portability and thus have limitation in the size of a display, as well. Accordingly, in recent years, various types of electronic devices providing more expanded screens have been developed. For example, electronic devices are designed to allow the size of a screen gradually to increase in a display having a limited size, and such that various services (or functions) are provided to users through larger screens.

An electronic device may have a new form factor, such as a rollable device and/or a slidable device. For example, an electronic device may include a flexible display or a slidable display, and at least a portion of the display may be used in rolled or unrolled states.

An electronic device including a flexible display or a slidable display may detect, by using a sensor, whether a display is drawn to an outer space of the electronic device, and/or the degree of withdrawal. However, it may be difficult to accurately determine the degree of withdrawal of a display from an electronic device to the external space of the electronic device.

An electronic device according to various embodiments of the disclosure may determine the degree of withdrawal of a flexible display, based on a capacitance value of a touch circuit included in the flexible display.

SUMMARY

Additional aspects will be set forth in part in the description which follows and, in part, will be apparent from the description, or may be learned by practice of the presented embodiments.

An electronic device according to various embodiments of the disclosure may include a housing, a touch circuit including multiple TX electrodes, and multiple RX electrodes arranged to cross over the multiple TX electrode, a flexible display including the touch circuit, which can be withdrawn from an inner space of the housing, a touch controller, and a processor connected to the touch panel, the flexible display, and the touch controller, wherein the touch controller applies a driving signal through the multiple TX electrodes of the touch circuit, acquires the driving signal through the multiple RX electrodes, identifies a capacitance value based on the acquired driving signal, and identifies information about a folded area of the flexible display based on the capacitance value, and the processor may configure an activation area with respect to an unfolded area of the flexible display based on the information about the folded area of the flexible display.

A display method of an electronic device including a flexible display according to various embodiments of the disclosure may include an operation of applying a driving signal by using multiple TX electrodes of a touch circuit included in the flexible display, an operation of acquiring the driving signal through the multiple RX electrodes of the touch circuit, an operation of identifying a capacitance value based on the acquired driving signal, an operation of identifying information about a folded area of the flexible display based on the capacitance value, and an operation of configuring an activation area with respect to an unfolded area of the flexible display based on the information about the folded area of the flexible display.

An electronic device according to various embodiments of the disclosure may accurately determine a display area according to a degree of withdrawal of a flexible display to an outer space of the electronic device, based on a capacitance value of a touch circuit included in the flexible display. Accordingly, the electronic device may deactivate an area other than the display area of the flexible display and prevent a malfunction of a touch input, which may occur in the deactivated area.

An electronic device according to various embodiments of the disclosure may activate only a display area determined based on a capacitance value of a touch circuit, among the whole area of the flexible display. Therefore, current consumption of the electronic device may be reduced.

BRIEF DESCRIPTION OF DRAWINGS

The above and other aspects and features of certain embodiments of the present disclosure will be more apparent from the following description taken in conjunction with the accompanying drawings, in which.

DETAILED DESCRIPTION

Figure 1:
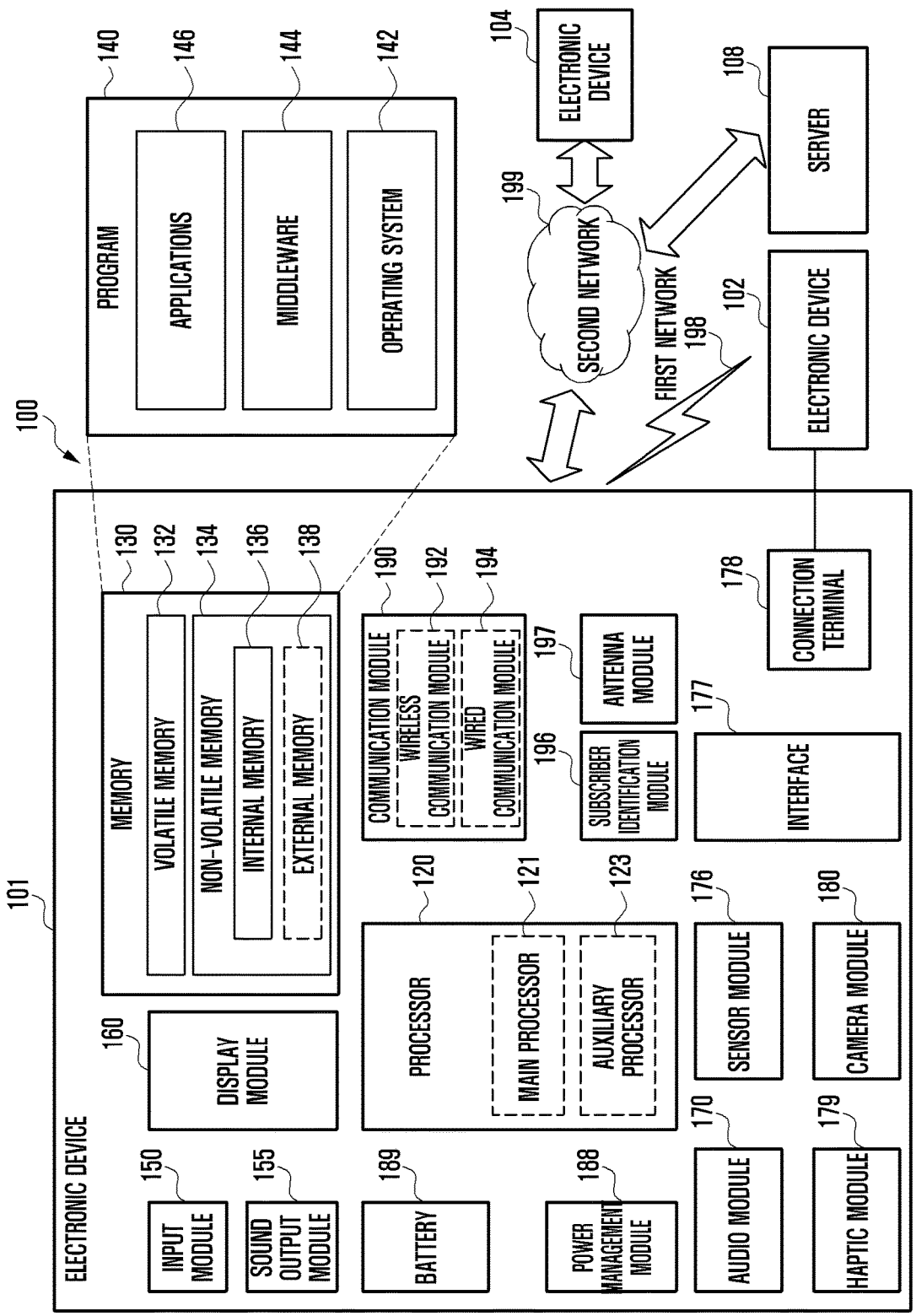
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
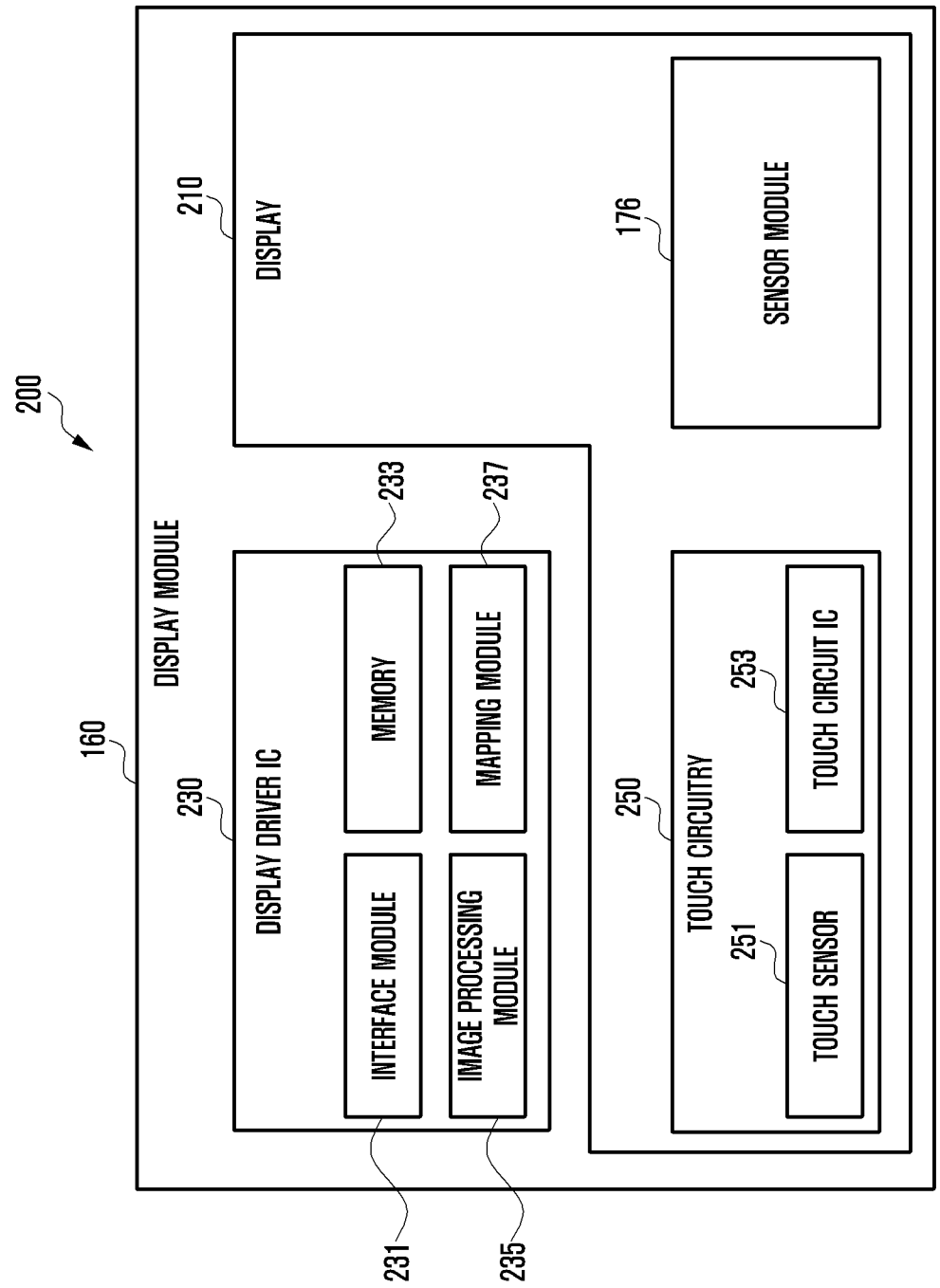
FIG. 2 is a block diagram of a display module according to various embodiments.

FIG. 2 is a block diagram 200 illustrating the display module 160 according to various embodiments.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 1250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 1250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
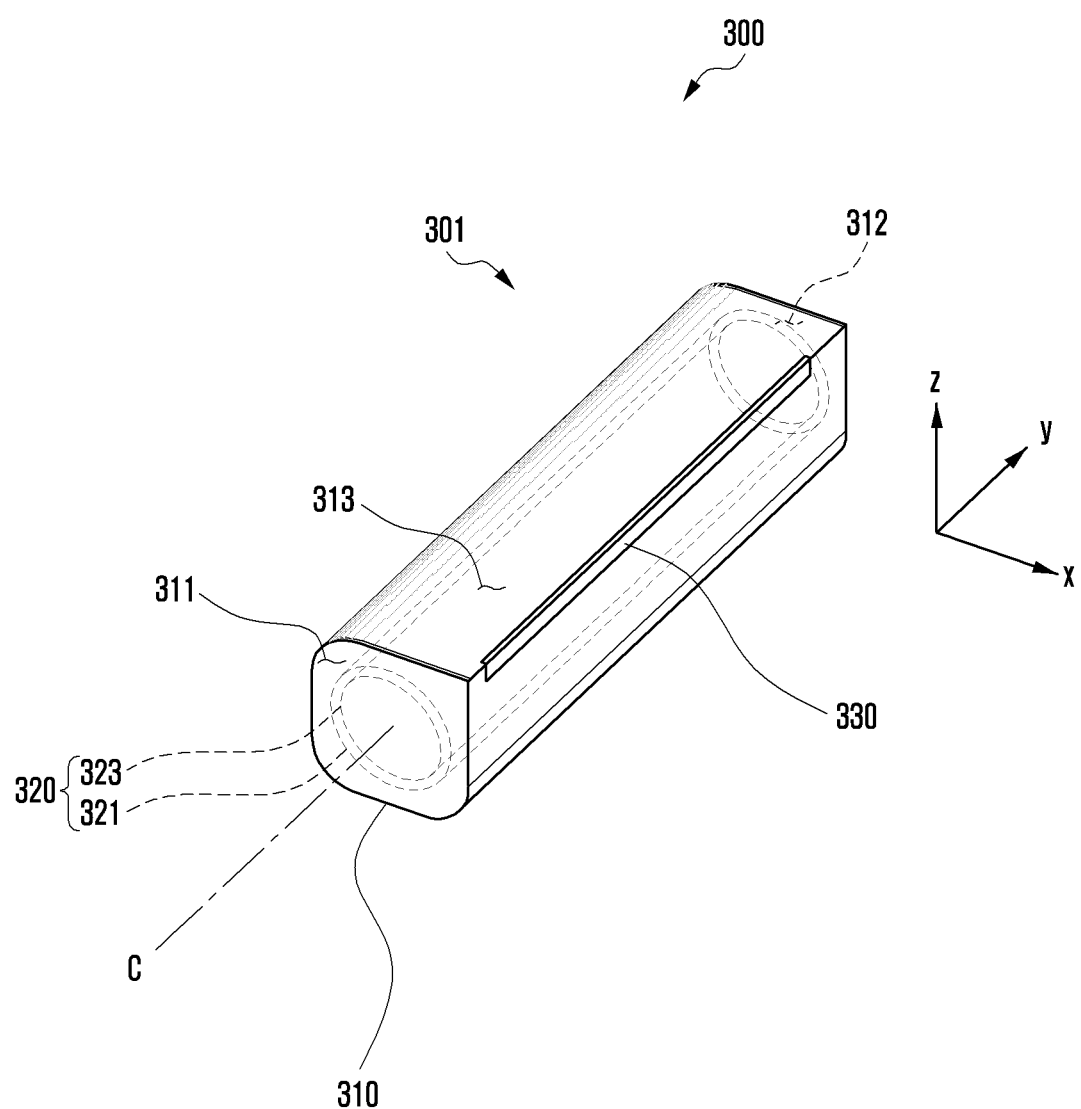
FIG. 3A is a perspective view of an electronic device in a closed state according to various embodiments.
Figure 3B:
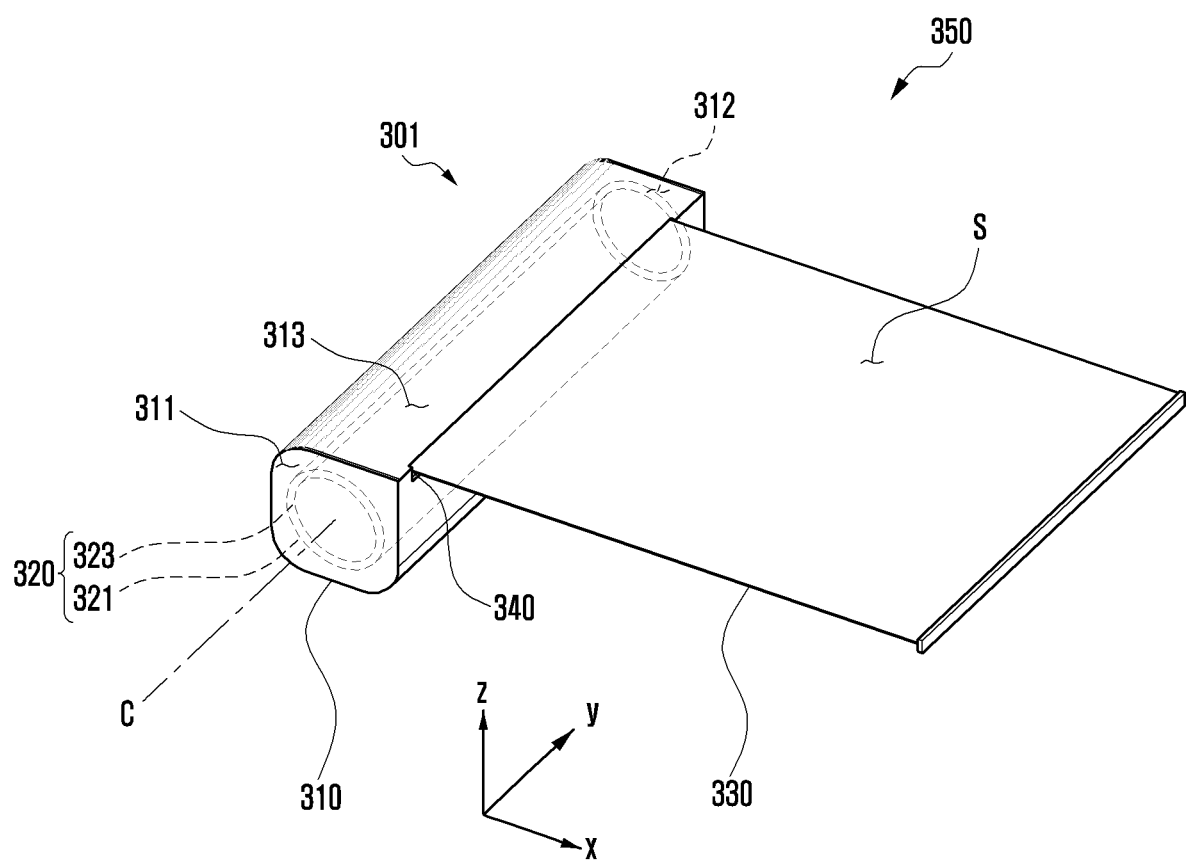
FIG. 3B is a perspective view of an electronic device in an open state according to various embodiments.

FIG. 3A is a perspective view 300 of an electronic device 301 in a closed state according to an embodiment of the disclosure. FIG. 3B is a perspective view 350 of the electronic device 301 in an open state according to an embodiment of the disclosure.

Referring to FIGS. 3A and 3B, an electronic device 301 (e.g., an electronic device 101 in FIG. 1) may include a housing (or a housing structure) 310, a flexible display 330, a cylindrical roller 321, and/or a battery 323.

According to an embodiment, at least a portion of the flexible display 330 may be accommodated in the internal space of the housing 310 in a state of being rolled in a circular shape. The flexible display 330 may be referred to as, for example, a rollable display.

The closed state of the electronic device 301 illustrated in FIG. 3A is, for example, the state in which the flexible display 330 is maximally moved such that the flexible display 330 is not introduced into the internal space of the housing 310 anymore, and may be referred to as a state in which a screen (e.g., a display area or an active area) visible to the outside is contracted. In an embodiment, the screen visible to the outside in the closed state of the electronic device 301 may not be substantially provided.

In another embodiment, although not shown, the electronic device 301 may further include a display (not shown) disposed inside the housing 310. For example, the flexible display includes a first flexible display 330 (e.g., a main display) that may be introduced into the internal space of the housing 310 and a second flexible display (not shown) disposed to correspond to the shape of the housing 310 (e.g., a sub display). When the electronic device 301 further includes a second flexible display disposed to correspond to the shape of the housing 310, the electronic device 301 may be implemented to form a screen for displaying visual information through the second flexible display in the closed state of the electronic device 301.

The open state of the electronic device 301 illustrated in FIG. 3B is, for example, the state in which the flexible display 330 is maximally moved such that the flexible display 330 is not pulled out of the housing 310 anymore, and may be referred to as the state in which the screen S is expanded. Although not illustrated, the electronic device 301 may be in an intermediate state between the closed state in FIG. 3A and the open state in FIG. 3B.

At least a portion of the flexible display 330 may be introduced into the internal space of the housing 310 while being rolled in a circle around, for example, the rotation axis C. In an embodiment, the housing 310 may include a first surface 311 and a second surface 312 located apart from each other in a direction in which the rotation axis C extends (e.g., the y-axis direction). The first surface 311 may be oriented in a first direction (e.g., the +y-axis direction), and the second surface 312 may be oriented in a second direction (e.g., the −y-axis direction) opposite to the first direction. The housing 310 may include a third surface 313 (e.g., a lateral surface or a side surface) that surrounds the space between the first surface 311 and the second surface 312. The housing 310 may include an opening 340 located in the third surface 313, and the flexible display 330 may be introduced into the interior space of the housing 310 through the opening 340 or may be pulled out to the outside of the housing 310. In some embodiments, the housing 310 may refer to a structure defining at least a portion of the first surface 311, the second surface 312, and the third surface 313.

According to an embodiment, the cylindrical roller 321 may be located inside the housing 310 to be rotatable about the rotation axis C. During the state change of the electronic device 301 (e.g., switching between the closed state in FIG. 3A and the open state in FIG. 3B), there may be switching between a movement of the flexible display 330 and a rotational motion of the cylindrical roller 321. For example, when the electronic device 301 is switched from the open state to the closed state, at least a portion of the flexible display 330 may be introduced into the internal space of the housing 310 while being rolled around the cylindrical outer surface of the cylindrical roller 321 rotating about the rotation axis C.

In an embodiment, referring to the closed state in FIG. 3A, the battery 323 may be located in the internal space in which the flexible display 330 is rolled. The cylindrical roller 321 may include a cylindrical outer surface on which the flexible display 330 may be positioned in a rolled state, and a cylindrical inner surface located opposite to the cylindrical outer surface. The cylindrical roller 321 may include, for example, a hollow extending from a first opening at one side to a second opening at the other side. In some embodiments, the electronic device 301 or the cylindrical roller 321 may further include a cover (or a cover member) configured to at least partially cover the first opening or the second opening. The cylindrical outer surface of the cylindrical roller 321 may be a circular outer peripheral surface (e.g., a cylindrical surface) spaced apart from the rotation axis C by a corresponding radius. The battery 323 may be located in the internal space (e.g., the hollow) of the cylindrical roller 321 which is a space defined by the cylindrical inner surface of the cylindrical roller 321. In some embodiments, the cylindrical roller 321 may be referred to by various other terms, such as a hollow cylinder or a cylindrical shell. The cylindrical inner surface may have a shape corresponding to the internal space of the cylindrical roller 321 in which the battery 323 is accommodated. For example, the battery 323 may have a cylindrical shape, and the cylindrical inner surface of the cylindrical roller 321 may be parallel to the cylindrical outer surface of the battery 323 or the cylindrical outer surface of the cylindrical roller 321. The cylindrical inner surface of the cylindrical roller 321 is not limited to a circular surface, and may be provided in various other shapes capable of supporting the battery 323.

According to an embodiment, during the state change of the electronic device 301 (e.g., switching between the closed state in FIG. 3A and the open state in FIG. 3B), the battery 323 may be rotated together with the cylindrical roller 321. For example, the battery 323 may be fitted into the internal space of the cylindrical roller 321, and a rotating body 320 including the cylindrical roller 321 and the battery 323 may be provided. In an embodiment, the rotating body 320 including the cylindrical roller 321 and the battery 323 may be implemented by balancing the weight about the rotation axis C. This makes it possible to suppress occurrence of vibration of the electronic device 301 when the rotating body 320 including the cylindrical roller 321 and the battery 323 is rotated about the rotation axis C during the state change (e.g., switching between the closed state in FIG. 3A and the open state in FIG. 3B) of the electronic device 301.

FIGS. 3A and 3B according to various embodiments, it is described that at least a portion of the flexible display 330 may be introduced into the internal space of the housing 310 while being rolled in a circle about the rotation axis C, but is not limited thereto. For example, according to the characteristics of the flexible display 330, it may be rolled by itself without a separate axis.

Figure 4A:
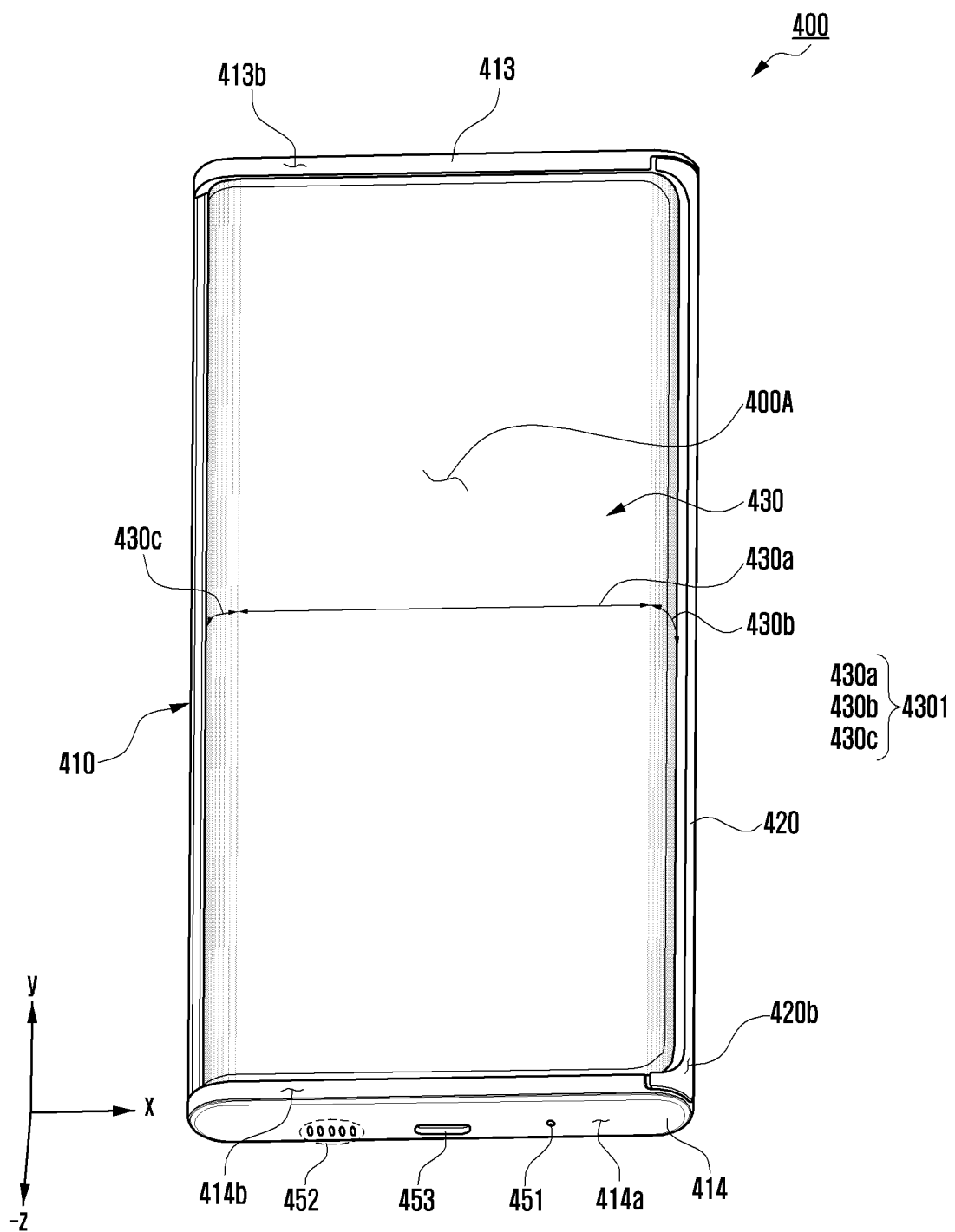
FIG. 4A is a front perspective view of an electronic device in a closed state according to various embodiments.
Figure 4B:
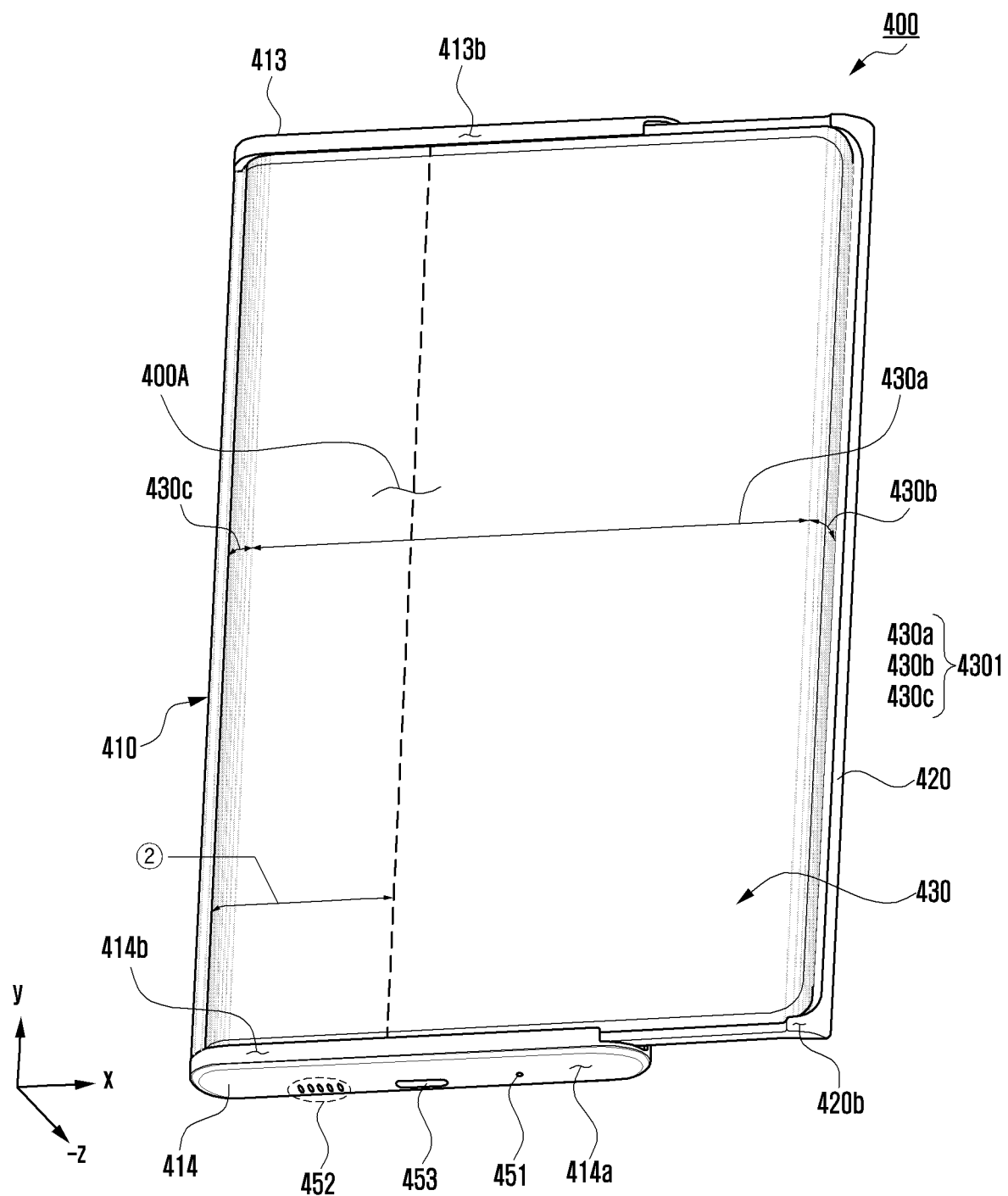
FIG. 4B is a front perspective view of an electronic device in an open state according to various embodiments.

FIG. 4A is a front perspective view illustrating an electronic device 400 in a closed state according to an embodiment. FIG. 4B is a front perspective view illustrating an electronic device 400 in an open state according to an embodiment.

According to various embodiments, the electronic device has been described as the electronic device 301 having a rollable form factor shown in FIGS. 3A and 3B, but is not limited thereto. For example, the electronic device may include the electronic device 400 of a slideable form factor as shown in FIGS. 4A and 4B.

According to various embodiments, the electronic device 400 of FIGS. 4A and 4B may include the electronic device 101 of FIG. 1.

Referring to FIGS. 4A and 4B, in an embodiment, the electronic device 400 may be implemented to expand a screen 4301 in a sliding manner. For example, the screen 4301 may be an externally visible area in the flexible display 430 (e.g., the flexible display 330 of FIGS. 3A and 3B).

FIG. 4A illustrate the electronic device 400 in a state in which the screen 4301 is not expanded, and FIG. 4B illustrate the electronic device 400 in a state in which the screen 4301 is expanded. A state in which the screen 4301 is not expanded is a state in which a sliding plate 420 for a sliding motion of the flexible display 430 is not slide-out, and may be referred to as a 'closed state' hereinafter. The expanded state of the screen 4301 is a state in which the screen 4301 is no longer expanded, i.e., is expanded to the maximum by sliding out of the sliding plate 420 and may be referred to as an 'open state' hereinafter.

According to an embodiment, slide-out may refer to at least a partial movement of the sliding plate 420 in a first direction (e.g., +x axis direction) when the electronic device 400 is switched from the closed state to the open state. According to various embodiments, the open state may be defined as a state in which the screen 4301 is expanded compared to the closed state, and screens of various sizes may be provided according to a moving position of the sliding plate 420.

According to various embodiments, the state of the electronic device 400 may include an intermediate state. The intermediated state may refer to a state between the closed state of FIG. 4B and the open state of FIG. 4A. The screen 4301 may include an active area of the flexible display 430 that can output an image by visual exposure, and the electronic device 400 may adjust the active area according to a movement of the sliding plate 420 or a movement of the flexible display 430. In the following description, the open state may indicate a state in which the screen 4301 is maximally expanded. In some embodiments, the flexible display 430 disposed to perform a sliding motion in the electronic device 400 of FIG. 4A to provide the screen 4301 may be referred to as a 'slide-out display' or an 'expandable display'.

According to an embodiment, the electronic device 400 may include a sliding structure related to the flexible display 430. For example, when the flexible display 430 is moved to a preset distance by an external force, the flexible display 430 may be switched from a closed state to an open state or from an open state to a closed state without any further external force due to an elastic structure included in the sliding structure (e.g., semi-automatic slide motion).

According to some embodiments, when a signal is generated through an input device included in the electronic device 400, the electronic device 400 may be switched from a closed state to an open state or from an open state to a closed state by a driving device such as a motor connected to the flexible display 430, For example, when a signal is generated through a hardware button or a software button provided through a screen, the electronic device 400 may be switched from a closed state to an open state or from an open state to a closed state.

According to various embodiments, when a signal is generated from various sensors such as a pressure sensor, the electronic device 400 may be switched from a closed state to an open state or from an open state to a closed state. For example, when carrying or holding the electronic device 400 by hand, a squeeze gesture in which a part of the hand (e.g., a palm or a finger of the hand) presses within a specified section of the electronic device 400 may be detected by the sensor, and the electronic device 400 may be switched from a closed state to an open state or from an open state to a closed state corresponding thereto.

According to an embodiment, the flexible display 430 may include a bendable section (②) (see FIG. 4B). When the electronic device 400 is switched from a closed state to an open state, the bendable section (②) may include an extended portion of the screen 4301. When the electronic device 400 is switched from the closed state to the open state, the bendable section (②) may be drawn from the internal space of the electronic device 400 by sliding; thus, the screen 4301 may be expanded. When the electronic device 400 is switched from the open state to the closed state, at least a portion of the bendable section (②) may be introduced into the internal space of the electronic device 400 by sliding; thus, the screen 4301 may be reduced. When the electronic device 400 is switched from the open state to the closed state, at least a portion of the bendable section (②) may be moved to the internal space of the electronic device 400 while being bent. For example, the flexible display 430 may include a flexible substrate (e.g., plastic substrate) made of a polymer material including polyimide (PI) or polyester (PET).

According to an embodiment, the electronic device 400 may include a housing 410, a sliding plate 420, or a flexible display 430.

The housing (or case) 410 may include, for example, a back cover (not illustrated), a first side cover 413, or a second side cover 414. The back cover (not illustrated), the first side cover 413, or the second side cover 414 may be connected to a support member (not illustrated) positioned inside the electronic device 400, and form at least a portion of an external shape of the electronic device 400.

The back cover (not illustrated) may form, for example, at least a portion of a rear surface (not illustrated) of the electronic device 400. In an embodiment, the back cover (not illustrated) may be substantially opaque. For example, the back cover (not illustrated) may be made of coated or tinted glass, ceramic, polymer, metal (e.g., aluminum, stainless steel (STS), or magnesium), or a combination of at least two of the above materials. According to some embodiments, in a state in which the bendable section (②) of the flexible display 430 is introduced into the inner space of the housing 410 (e.g., closed state), at least a portion of the bendable section (②) may be disposed to be visible from the outside through the back cover (not illustrated). In this case, the back cover (not illustrated) may be made of a transparent material and/or a translucent material.

According to an embodiment, the first side cover 413 and the second side cover 414 may be positioned opposite to each other. For example, the first side cover 413 and the second side cover 414 may be positioned opposite to each other with the flexible display 430 interposed therebetween in a second direction (e.g., y axis direction) orthogonal to the first direction (e.g., +x axis direction) of slide out of the sliding plate 420. The first side cover 413 may form at least a portion of the first side surface (not illustrated) of the electronic device 400, and the second side cover 414 may form at least a portion of the second side 414a of the electron device 200 facing in a direction opposite to the first side surface (not illustrated). The first side cover 413 may include a first edge portion 413b extended from an edge of the first side surface (not illustrated). For example, the first edge portion 413b may form at least a portion of one side bezel of the electronic device 400. The second side cover 414 may include a second edge portion 414b extended from an edge of the second side surface 414a. For example, the second edge portion 414b may form at least a portion of the other side bezel of the electronic device 400. According to an embodiment, in the closed state of FIG. 4A, a surface of the first edge portion 413b, a surface of the second edge portion 414b, and a surface of the sliding plate 420 may be smoothly connected to form one side curved portion (not illustrated) corresponding to the first curved portion 430b side of the screen 4301. According to various embodiments, the surface of the first edge portion 413b or the surface of the second edge portion 414b may include the other side curved portion (not illustrated) corresponding to the second curved portion 430c side of the screen 4301 positioned at the opposite side of the first curved portion 430b.

According to an embodiment, the sliding plate 420 may perform a sliding motion on a support member (not illustrated) positioned inside the electronic device 400. At least a portion of the flexible display 430 may be disposed in the sliding plate 420, and the closed state of FIG. 4A or the open state of FIG. 4B may be formed based on a position of the sliding plate 420 on the support member. According to an embodiment, the flexible display 430 may be attached to the sliding plate 420 through an adhesive member (not illustrated). According to an embodiment, the adhesive member may include a thermally responsive adhesive member, a photoreactive adhesive member, a general adhesive, and/or a double-sided tape. According to some embodiments, the flexible display 430 may be inserted into a recess formed in the sliding plate 420 in a sliding manner to be disposed at and fixed to the sliding plate 420. The sliding plate 420 may serve to support at least a portion of the flexible display 430, and be referred to as a display support structure in some embodiments.

According to an embodiment, the sliding plate 420 may include a third edge portion 420b that forms an outer surface of the electronic device 400 (e.g., a surface exposed to the outside to form an external shape of the electronic device 400). For example, the third edge portion 420b may form a bezel around the screen together with the first edge portion 413*b* and the second edge portion 414*b* in the closed state of FIG. 4A. The third edge portion 420*b* may be extended in the second direction (e.g., y-axis direction) so as to connect one end portion of the first side cover 413 and one end portion of the second side cover 414 in the closed state. For example, in the closed state of FIG. 4A, a surface of the third edge portion 420*b* may be smoothly connected to a surface of the first edge portion 413*b* and/or a surface of the second edge portion 414*b*.

According to an embodiment, due to slide out of the sliding plate 420, while at least a portion of the bendable section ② comes out from the inside of the electronic device 400, a state (e.g., open state) in which the screen 4301 is expanded may be provided, as illustrated in FIG. 4B.

According to an embodiment, in the closed state of FIG. 4A, the screen 4301 may include a flat portion 430*a* and a first curved portion 430*b* and/or a second curved portion 430*c* positioned in opposite sides with the flat portion 430*a* interposed therebetween. For example, the first curved portion 430*b* and the second curved portion 430*c* may be substantially symmetrical with the flat portion 430*a* interposed therebetween. When the electronic device 400 is switched from the closed state of FIG. 4A to the open state of FIG. 4B, the flat portion 430*a* may be expanded. For example, a partial area of the bendable section ② forming the second curved portion 430*c* in the closed state of FIG. 4A may be included in an expanded flat portion 430*a* when the electronic device 400 is switched from the closed state of FIG. 4A to the open state of FIG. 4B and be formed as another area of the bendable section ②.

According to an embodiment, the electronic device 400 may include an opening (not illustrated) for entering or withdrawing the bendable section ②, and/or a pulley (not illustrated) positioned in the opening. The pulley may be positioned to correspond to the bendable section ②, and a movement of the bendable section ② and a direction of movement thereof may be guided through a rotation of the pulley in a switch between the closed state of FIG. 4A and the open state of FIG. 4B. The first curved portion 430*b* may be formed to correspond to a curved surface formed in one surface of the sliding plate 420. The second curved portion 430*c* may be formed by a portion corresponding to the curved surface of the pulley in the bendable section ②. The first curved portion 430*b* may be positioned opposite to the second curved portion 430*c* in the closed state or the open state of the electronic device 400 to improve an aesthetic impression of the screen 4301. According to some embodiments, the flat portion 430*a* may be implemented in an expanded form without the first curved portion 430*b*.

According to an embodiment, the flexible display 430 may further include a touch sensing circuit (e.g., touch sensor). According to various embodiments (not illustrated), the flexible display 430 may be coupled to a pressure sensor capable of measuring the intensity (pressure) of a touch, and/or a digitizer that detects a magnetic field type pen input device (e.g., stylus pen) or may be disposed adjacent thereto. For example, the digitizer may include a coil member disposed on a dielectric substrate so as to detect a resonance frequency of an electromagnetic induction method applied from the pen input device.

According to an embodiment, the electronic device 400 may include a microphone hole 451 (e.g., the input module 150 of FIG. 1), a speaker hole 452 (e.g., the sound output module 155 of FIG. 1), and/or a connector hole 453 (e.g., the connection terminal 178 of FIG. 1). In some embodiments, the electronic device 400 may omit at least one of the components or additionally include other components.

The microphone hole 451 may be formed, for example, in at least a portion of the second side surface 414*a* corresponding to a microphone (not illustrated) positioned inside the electronic device 400. A position of the microphone hole 451 is not limited to the embodiment of FIG. 4A and may vary. According to some embodiments, the electronic device 400 may include a plurality of microphones capable of detecting a direction of a sound.

The speaker hole 452 may be formed, for example, in at least a portion of the second side surface 414*a* corresponding to a speaker positioned inside the electronic device 400. A position of the speaker hole 452 is not limited to the embodiment of FIG. 4A and may vary. According to various embodiments, the electronic device 400 may include a receiver hole for a call. In some embodiments, the microphone hole 451 and the speaker hole 452 may be implemented as one hole, or the speaker hole 452 may be omitted as in a piezo speaker.

The connector hole 453 may be formed, for example, in at least a portion of the second side surface 414*a* corresponding to a connector (e.g., USB connector) positioned inside the electronic device 400. The electronic device 400 may transfer and/or receive power and/or data to and/or from an external electronic device electrically connected to the connector through the connector hole 453. A position of the connector hole 453 is not limited to the embodiment of FIG. 4A and may vary.

According to various embodiments (not illustrated), the electronic device 400 may further include a camera module (e.g., front camera) that generates an image signal based on light received through one surface (e.g., a front surface 400A) of the electronic device 400 placed in a direction in which the screen 4301 faces. For example, the camera module (e.g., front camera) (not illustrated) may be aligned with an opening (e.g., through hole or notch) formed in the flexible display 430 to be positioned inside the housing 410. The camera module (e.g., front camera) (not illustrated) may receive light through the opening and a partial area of a transparent cover overlapped with the opening to generate an image signal. The transparent cover may serve to protect the flexible display 430 from the outside, and include, for example, a material such as polyimide or ultra-thin glass (UTG).

According to some embodiments, the camera module (e.g., front camera) (not illustrated) may be disposed at the bottom of at least a portion of the screen 4301 of the flexible display 430, and the camera module (e.g., front camera) (not illustrated) may perform a related function (e.g., image taking) without visually distinguishing (or exposing) a position thereof. In this case, for example, when viewed from above the screen 4301 (e.g., when viewed in a −z axis direction), the camera module (e.g., front camera) (not illustrated) may be disposed to overlap at least a portion of the screen 4301 and obtain an image of an external subject while being not exposed to the outside.

According to various embodiments (not illustrated), the electronic device 400 may further include a key input device (e.g., the input module 150 of FIG. 1). The key input device may be positioned, for example, at the first side surface (not illustrated) of the electronic device 400 formed by the first side cover 413. In some embodiments (not illustrated), the key input device may include at least one sensor module.

According to various embodiments (not illustrated), the electronic device 400 may include various sensor modules (e.g., the sensor module 176 of FIG. 1). The sensor module may generate an electrical signal or data value corresponding to an internal operating state or an external environmental state of the electronic device 400. For example (not illustrated), the sensor module may include a proximity sensor that generates a signal regarding proximity of an external object based on light received through the front surface 400A of the electronic device 400 placed in a direction in which the screen 4301 faces. For another example (not illustrated), the sensor module may include various biometric sensors such as a fingerprint sensor or a heart rate monitor (HRM) sensor for detecting biometric information based on light received through the front surface 400A or the rear surface (not illustrated) of the electronic device 400. The electronic device 400 may include various other sensor modules, for example, at least one of a gesture sensor, a gyro sensor, an atmospheric sensor, a magnetic sensor, an acceleration sensor, a grip sensor, a color sensor, an infrared (IR) sensor, a biometric sensor, a temperature sensor, a humidity sensor, or an illuminance sensor.

Figure 5A:
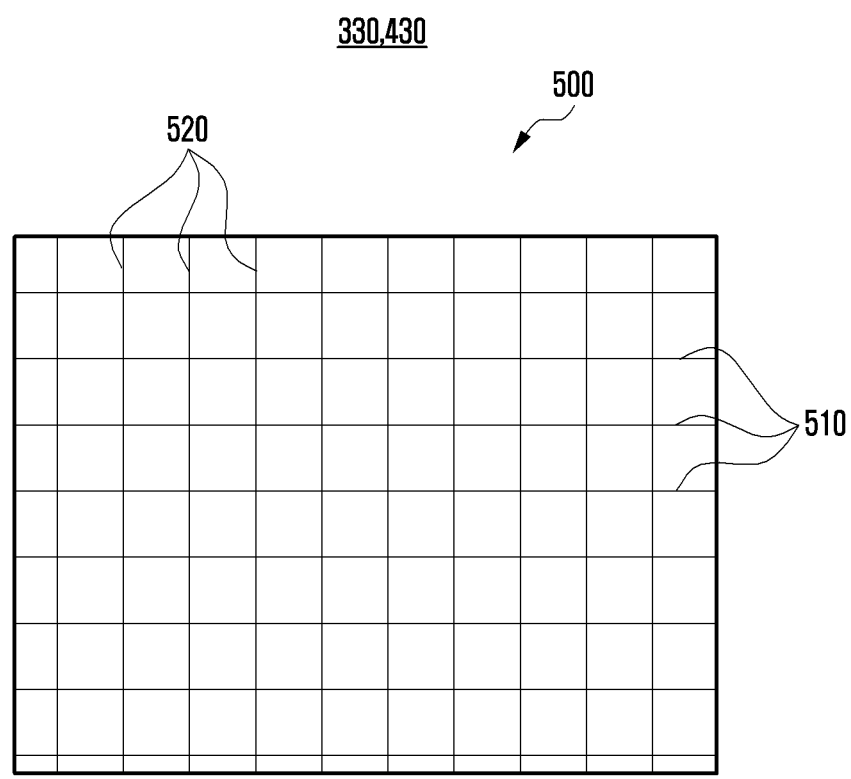
FIG. 5A is a view of multiple electrodes constituting a touch circuit included in a flexible display according to various embodiments.

FIG. 5A is a view 500 of multiple electrodes constituting a touch circuit included in a flexible display 330 or 430 according to various embodiments.

Referring to FIG. 5A, the flexible display (e.g., the flexible display 330 in FIG. 3A and FIG. 3B, or the flexible display 430 in FIG. 4A and FIG. 4B) may include a touch circuit (e.g., the touch circuit 250 in FIG. 2) (or a touch sensor circuit (e.g., the touch sensor integrated circuit (IC) 253 in FIG. 2). For example, the touch circuit 250 may include a transmitter (TX) 510 including multiple first electrode lines (e.g., multiple driving electrodes) and a receiver (RX) 520 including multiple second electrode lines (e.g., multiple reception electrodes).

In an embodiment, an electronic device (e.g., the electronic device 301 in FIG. 3A and FIG. 3B, or the electronic device 400 in FIG. 4A and FIG. 4B) may apply a driving signal through the multiple first electrode lines (e.g., the multiple driving electrodes) constituting the touch circuit 250 and receive the applied driving signal through the multiple second electrode lines (e.g., the multiple reception electrodes).

In an embodiment, the electronic device 301 or 400 may identify a capacitance value based on the driving signal received through the multiple first electrode lines. The electronic device 301 or 400 may determine a folded area (e.g., a bending area) of the flexible display 330 or 430 based on the capacitance value. The electronic device 301 or 400 may determine (e.g., configure or set) an activation area of the flexible display 330 or 430 based on the determined folded area (e.g., a bending area). For example, the electronic device 301 or 400 may determine (e.g., configure or set) the configured folded area (e.g., a bending area) as a deactivation area. The electronic device 301 or 400 may determine (e.g., configure or set) an area other than the configured deactivation area of the display area of the flexible display 330 or 430 as an activation area. For another example, the electronic device 301 or 400 may additionally determine (e.g., configure or set) an area inserted into the housing 310 or 410 or covered by the housing 310 or 410 other than the configured folded area of the display area as a deactivation area. The electronic device 301 or 400 may determine an area excluding the deactivation area of the display area as an activation area. For example, the area inserted into the housing 310 or 410 may be determined based on a configuration value (e.g., a specified distance value from one end of the folded area) stored in a memory (e.g., the memory 130 in FIG. 1) of the electronic device 301 or 400 and/or a state (e.g., an intermediate state) of the electronic device 301 or 400 detected through a sensor (e.g., a Hall sensor).

In various embodiments, the configuration of the deactivation area may be performed by turning off an area of the flexible display 330 or 430 configured as the deactivation area or may be performed to prevent malfunction of a touch input by ignoring a touch coordinate occurring in an area of the flexible display 330 or 430 configured as the deactivation area.

Figure 5B:
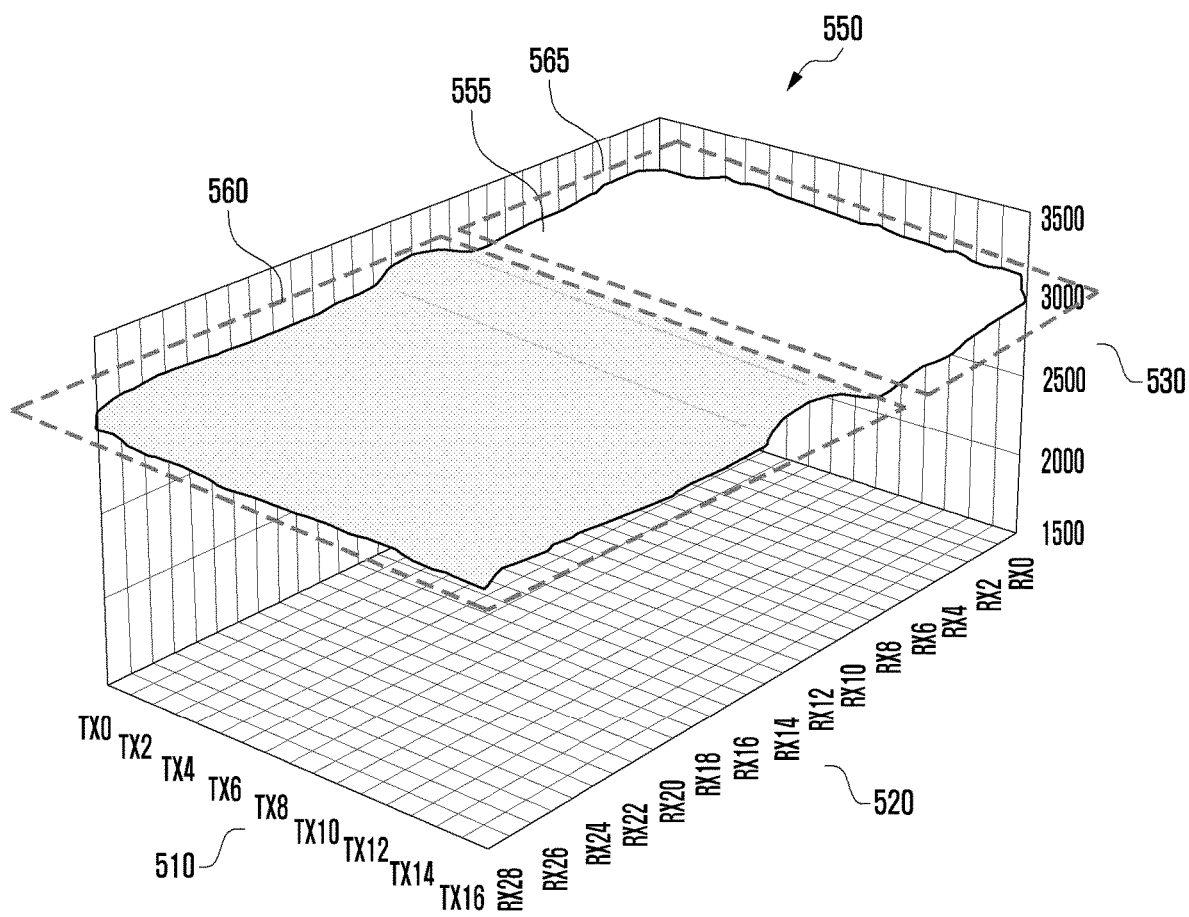
FIG. 5B is a view illustrating an image formed based on raw data for a capacitance value of a flexible display of an electronic device according to various embodiments.

FIG. 5B a view 550 illustrating an image formed based on raw data for a capacitance value of a flexible display 330 of an electronic device 301 according to various embodiments.

FIG. 5B according to various embodiments is a view 550 explaining a method for identifying a capacitance value based on raw data of the flexible display 330 in the electronic device 301 having a form factor of a rollable form shown in FIG. 3A and FIG. 3B.

In FIG. 5B according to various embodiments, the x-axis 520 may indicate the receiver (RX) 520 including the multiple second electrode lines (e.g., the multiple reception electrodes), y-axis 510 may indicate the transmitter (TX) 510 including the multiple first electrode lines (e.g., the multiple driving electrodes), and z-axis 530 may indicate a capacitance for each of the multiple first electrode lines and the multiple second electrode lines.

Referring to FIG. 5B, the electronic device 301 may identify a capacitance based on raw data for the display area of the flexible display 330. For example, the electronic device 301 may analyze raw data for the display area and identify an area in which a capacitance change is detected, based on the analyzed raw data. In an embodiment the electronic device 301 may perform preprocessing (e.g., filtering and/or normalization) raw data.

In another embodiment, the electronic device 301 may perform image-processing for raw data for the display area of the flexible display 330. The electronic device 301 may identify an area in which a capacitance is detected, based on the processed image.

In various embodiments below, it will be described that raw data for the display area of the flexible display 330 is image-processed and an area in which a capacitance is detected is identified based thereon. However, the disclosure is not limited thereto.

In an embodiment, the electronic device 301 may identify a capacitance change based on an image 555 with respect to raw data generated by performing image processing. By way of example, at least a portion of the flexible display 330 including a touch circuit may be overlappingly rolled into the inner space of the housing 310, and the electronic device 301 may identify an area in which a capacitance change due to interference between overlapped touch panels is detected.

In an embodiment, the electronic device 301 may identify a folded area (e.g., a bending area) 560 of the flexible display 330 based on the image 555 with respect to the generated raw data and determine (e.g., configure or set) a deactivation area based on the identified folded area (e.g., a bending area) 560. In an embodiment, the electronic device 301 may additionally determine (e.g., configure or set) an area of the display area of the flexible display 330, which is not the folded area (e.g., a bending area) 560 but is inserted into the housing 310, as a deactivation area.

In an embodiment, the electronic device 301 may determine (e.g., configure or set) an unfolded area 565 of the display area of the flexible display 330 excluding the deactivation area as an activation area.

In an embodiment, as shown in FIG. 5B, the capacitance of the folded area 560 may have a value larger than that of the unfolded area 565. For example, interference caused as at least a portion of the flexible display 330 is overlappingly rolled into the inner space of the housing 310 may allow the capacitance of the folded area 560 to have a value lager than that of the unfolded area 565. By way of example, a charge amount acquired when the driving signal applied through the multiple first electrode lines (e.g., the multiple driving electrodes) of the transmitter 510 is received through the multiple second electrode lines constituting the folded area 560 may be more than a charge amount acquired when the driving signal is received through the multiple second electrode lines constituting the unfolded area.

Figure 5C:
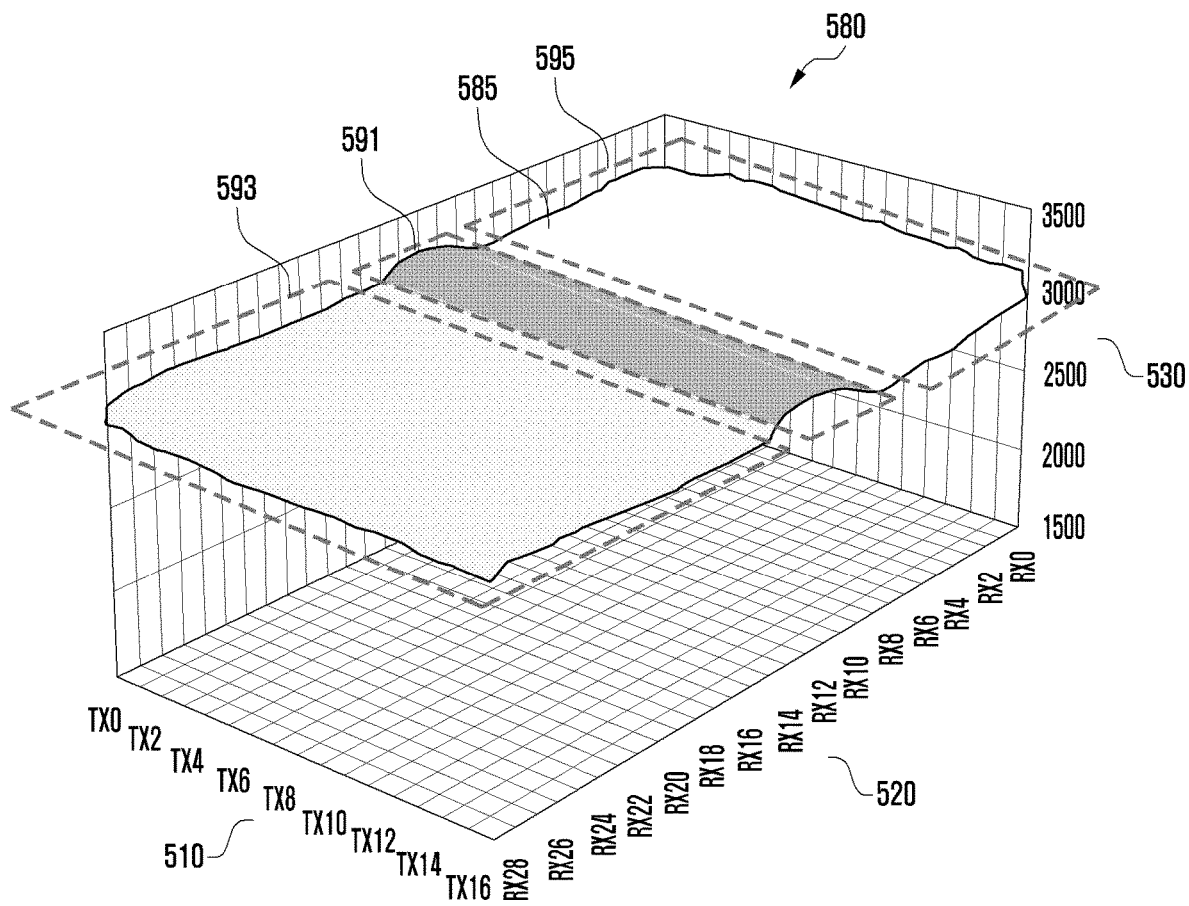
FIG. 5C is a view illustrating an image formed based on raw data for a capacitance value of a flexible display of an electronic device according to various embodiments.

FIG. 5C is a view 580 illustrating an image formed based on raw data for a capacitance value of a flexible display 430 of an electronic device 400 according to various embodiments.

FIG. 5C according to various embodiments is a view 580 explaining a method for identifying a capacitance value based on raw data of the flexible display 430 in the electronic device 400 having a form factor of a slidable form shown in FIG. 4A and FIG. 4B.

In FIG. 5C according to various embodiments, the x-axis 520 may indicate the receiver (RX) 520 including the multiple second electrode lines (e.g., the multiple reception electrodes), y-axis 510 may indicate the transmitter (TX) 510 including the multiple first electrode lines (e.g., the multiple driving electrodes), and z-axis 530 may indicate a capacitance for each of the multiple first electrode lines and the multiple second electrode lines.

Referring to FIG. 5C, the electronic device 400 may identify a capacitance based on raw data for the display area of the flexible display 430. For example, the electronic device 400 may analyze raw data for the display area and identify an area in which a capacitance change is detected, based on the analyzed raw data.

In another embodiment, the electronic device 400 may perform image-processing for raw data for the display area of the flexible display 430.

In various embodiments below, it will be described that raw data for the display area of the flexible display 430 is image-processed and an area in which a capacitance is detected is identified based thereon. However, the disclosure is not limited thereto.

In an embodiment, the electronic device 400 may identify a capacitance change based on an image 585 with respect to raw data generated by performing image processing. For example, at least a portion of the flexible display 430 including a touch circuit may be inserted into the inner space of the electronic device 400. The electronic device 400 may detect a capacitance change due to interference between touch circuits in an overlapping area as at least a portion of the flexible display 430 is inserted into the inner space of the electronic device 400.

In an embodiment, the electronic device 400 may identify a folded area (e.g., a bending area) of the flexible display 430 based on the image 585 with respect to the generated raw data and determine (e.g., configure or set) an activation area based on the identified folded area (e.g., a bending area). For example, the electronic device 400 may determine (e.g., configure or set) the identified folded area 591 (e.g., a bending area) as a deactivation area. The electronic device 400 may additionally determine (e.g., configure or set) an area of the display area of the flexible display 330, which is not the folded area 591 (e.g., a bending area) but is an area 593 inserted into the housing 410, as a deactivation area. The electronic device 400 may determine (e.g., configure or set) an area 595 (e.g., an area of the flexible display 430 withdrawn to the outside of the electronic device 400) of the display area of the flexible display 430 excluding the deactivation area as an activation area.

In an embodiment, as shown in FIG. 5C, the capacitance of the folded area 591 may have a value higher than those of an area 593 inserted into the inner space of the housing 410 and an area 595 of the flexible display 430 withdrawn to the outside of the electronic device 400. For example, as at least a portion of the flexible display 330 is inserted into the inner space of the electronic device 400, at least some areas 591 of the flexible display 430 may overlap each other, causing interference with each other. Accordingly, the capacitance of the at least some overlapping areas 591 of the flexible display 430 may have a value higher than those of an area 593 inserted into the housing 410 and the unfolded area 565 (e.g., an area of the flexible display 430 withdrawn to the outside of the electronic device 400). By way of example, a charge amount acquired when the driving signal applied through the multiple first electrode lines (e.g., the multiple driving electrodes) of the transmitter 510 is received through the multiple second electrode lines constituting the folded area 591 may be more than a charge amount received through the multiple second electrode lines constituting the area 593 inserted into the housing 410 and a charge amount received through the multiple second electrode lines constituting the unfolded area 595 (e.g., an area of the flexible display 430 withdrawn to the outside of the electronic device 400.

Figure 6A:
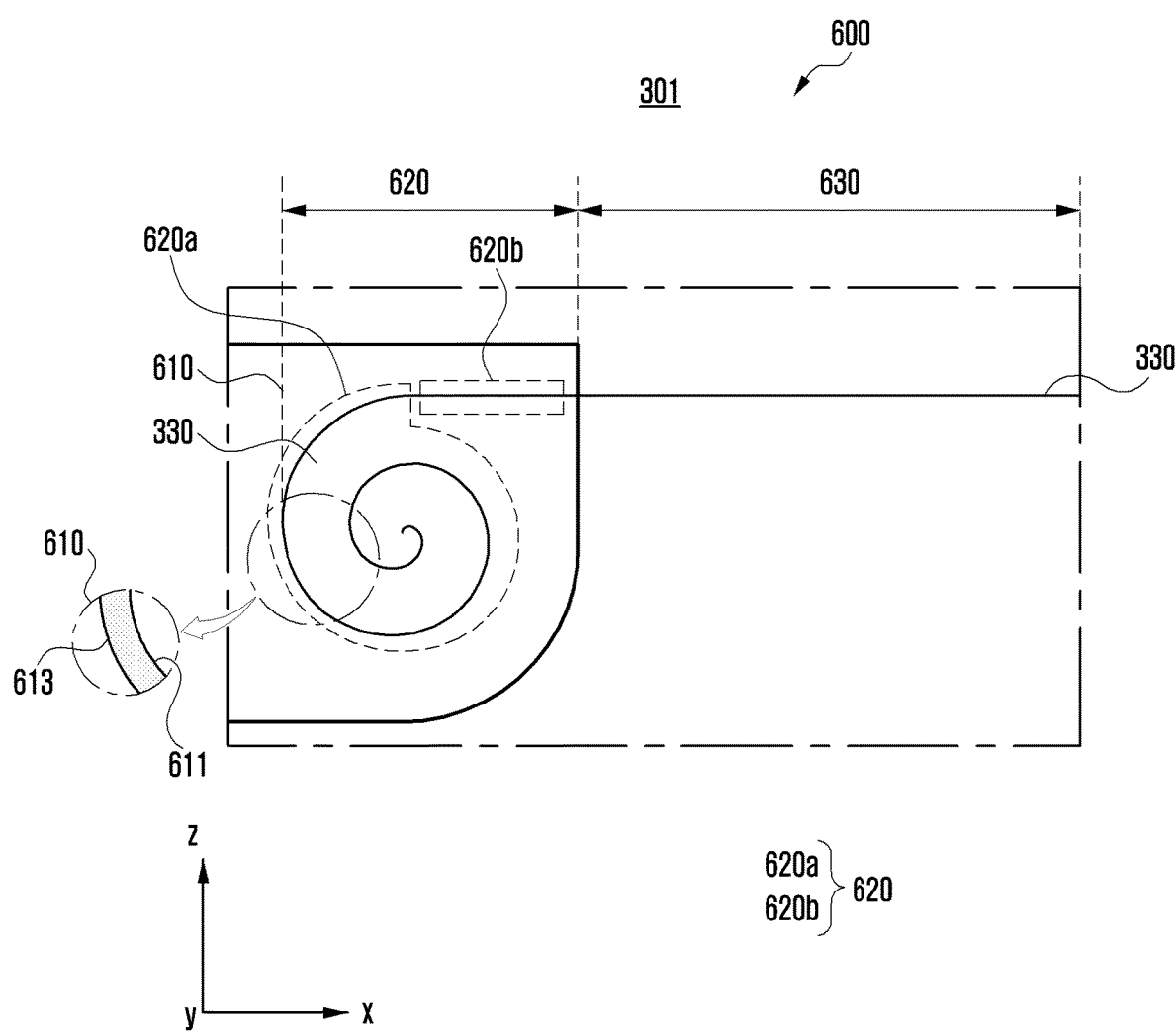
FIG. 6A is a front view of an electronic device viewed from one side according to various embodiments.
Figure 6B:
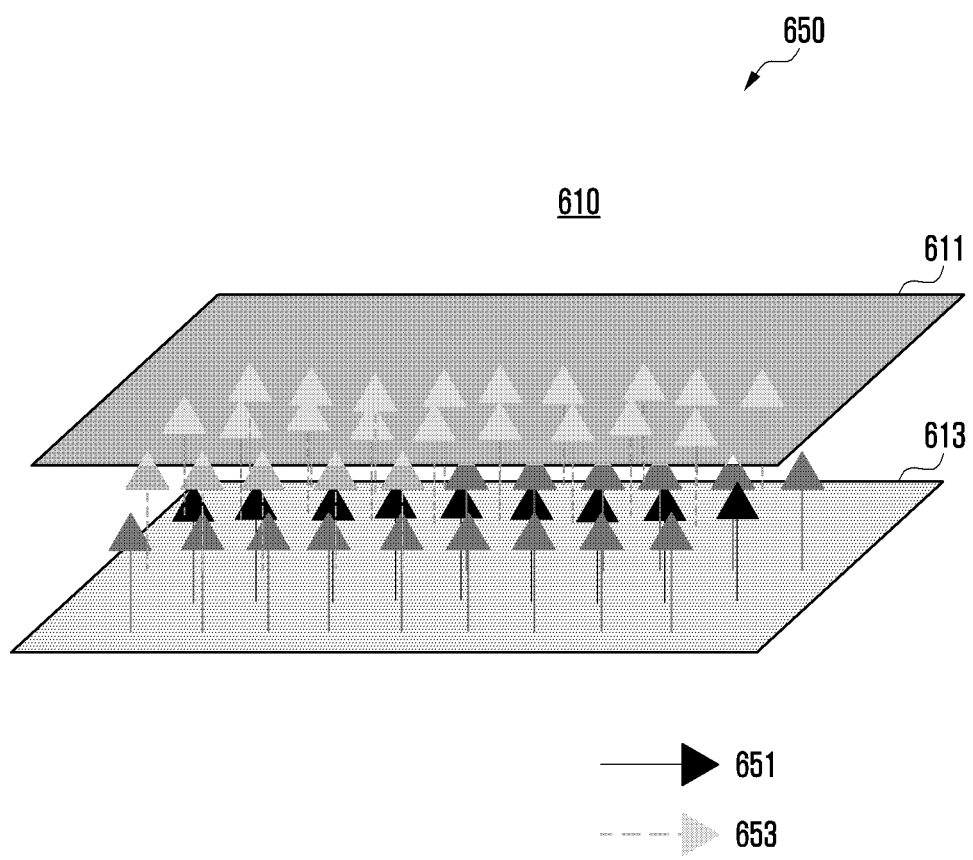
FIG. 6B is an enlarged view of a specific area of the flexible display of FIG. 6A according to various embodiments.

FIG. 6A is a front view 600 of an electronic device 301 viewed from one side according to various embodiments. FIG. 6B is an enlarged view 650 of a specific area 610 of the flexible display 330 of FIG. 6A according to various embodiments.

According to various embodiments, FIG. 6A may be a view illustrating the electronic device 301 viewed from the −y-axis direction to the +y-axis direction with reference to FIG. 3A and FIG. 3B.

Referring to FIG. 6A, at least a portion 620 of the flexible display 330 (e.g., the flexible display 330 in FIG. 3A and FIG. 3B) of the electronic device 301 (e.g., the electronic device 301 in FIG. 3A and FIG. 3B) may be inserted into the inner space of the housing 310 (e.g., the housing 310 in FIG. 3A and FIG. 3B) while being rolled in a circle around a rotation axis (e.g., the rotation axis C in FIG. 3A and FIG. 3B), and at least another portion 630 of the flexible display 330 may be in a state of being withdrawn from the inner space of the housing 310. In an embodiment, the area 620 of the flexible display 330 inserted into the inner space of the housing 310 may include an area 620a rolled in a circle around the rotation axis C and an area 620b which is not rolled in a circle but inserted into the housing 310.

In an embodiment, the flexible display 330 may include a touch circuit (e.g., the touch circuit 250 in FIG. 2). For example, the touch circuit may include a transmitter (TX) (e.g., the transmitter 510 in FIG. 5A) including multiple first electrode lines (e.g., multiple driving electrodes) and a receiver (RX) (e.g., the receiver 520 in FIG. 5A) including multiple second electrode lines (e.g., multiple reception electrodes).

In an embodiment, the electronic device 301 may apply a driving signal through the transmitter 510 (e.g., the multiple first electrode lines) constituting a touch panel included in the flexible display 330. The electronic device 301 may acquire a driving signal applied from the transmitter 510 through the receiver 520 (e.g., the multiple second electrode lines) constituting the touch panel.

Referring to FIG. 6B with respect to the specific area 610 of the at least a portion 620 of the flexible display 330 inserted into the inner space of the housing 310 according to various embodiments, a driving signal 651 applied through the transmitter 510 included in a first area 611 of the specific area 610 of the flexible display 330 may be received 653 through the receiver 520 included in a second area 613. Depending on a degree by which the flexible display 330 is rolled into the inner space of the housing 310, at least some areas 620 of the flexible display 330 may be rolled overlapping each other around a rotation axis (e.g., the rotation axis C in FIG. 3A and FIG. 3B). A capacitance value of the at least some areas 620 of the display area of the flexible display 330, which are rolled overlapping each other may be larger than that of an area 630 (e.g., a display area of the flexible display 330 withdrawn to the outside of the housing 310) which is not overlappingly rolled.

For example, due to interference caused as at least a portion of the flexible display 330 is overlappingly rolled into the inner space of the housing 310, a capacitance value of the at least some overlappingly rolled areas 620a may be higher than those of an area 620b which is not rolled in circle but inserted into the housing 310 and the unfolded area 630. For another example, a charge amount acquired when the driving signal applied through the multiple first electrode lines (e.g., the multiple driving electrodes) of the transmitter 510 is received through the multiple second electrode lines constituting the overlappingly rolled area 620a may be more than a charge amount acquired when the driving signal is received through the multiple second electrode lines constituting the area 620b which is not rolled in circle but inserted into the housing 310 and the unfolded area 630.

In various embodiments, the electronic device 301 may determine an area 620 having a high capacitance value in the display area of the flexible display 330 as a folded area or a bending area. The electronic device 301 may determine an area 630 excluding the folded area (or a bending area) of the flexible display 330 as an activation area. In case that there is an area in a deactivation state in at least a portion of the determined activation area, the electronic device 301 may activate the corresponding area. The electronic device 301 may display visual information (e.g., a text, an image, and/or an icon) on the activation area of the flexible display 330.

In an embodiment, the area 620 of the flexible display 330 may include an area 620b inserted into the housing 310 in addition to an area 620a rolled in a circle around the rotation axis C. The electronic device 301 may additionally determine (e.g., configure or set) the area 620b inserted into the housing 310 as a deactivation area. By way of example, the area 620b inserted into the housing 310 may be determined based on a configuration value (e.g., a specified distance value from one end of the folded area) stored in a memory (e.g., the memory 130 in FIG. 1) of the electronic device 301 and/or a state (e.g., an intermediate state) of the electronic device 301 detected through a sensor (e.g., a Hall sensor).

In another embodiment, the electronic device 301 may identify a capacitance value based on raw data with respect to a capacitance value of the flexible display 330. For example, the electronic device 301 may analyze raw data for the display area and identify an area in which a capacitance change is detected, based on the analyzed raw data. In an embodiment the electronic device 301 may perform preprocessing (e.g., filtering and/or normalization) raw data. However, without limitation thereto, the electronic device 301 may image-process raw data for the display area of the flexible display 330 and identify an area in which a capacitance change is detected, based on the processed image. Based on information of the display area in which a capacitance change is detected, the electronic device 301 may identify an operation state (e.g., a state of being withdrawn from the inner space of the housing 310 (e.g., a state of withdrawing to the outer space of the housing 310) or a state of being inserted into the inner space of the housing 310) of the flexible display 330 and/or the folded area of the flexible display 330 in real time.

Without limitation thereto, the electronic device 301 may analyze the raw data through machine learning. For example, the electronic device 301 may analyze a raw data change through machine learning and based on the raw data change, may identify an operation state (e.g., a state of being withdrawn from the inner space of the housing 310 (e.g., a state of withdrawing to the outer space of the housing 310) or a state of being inserted into the inner space of the housing 310) of the flexible display 330 and/or the folded area of the flexible display 330 in real time.

With respect to the configuration for determining an area of the flexible display 330 as a bending area based on a capacitance value according to various embodiments, various embodiments will be described with reference to FIG. 9 to FIG. 14 below.

Figure 7:
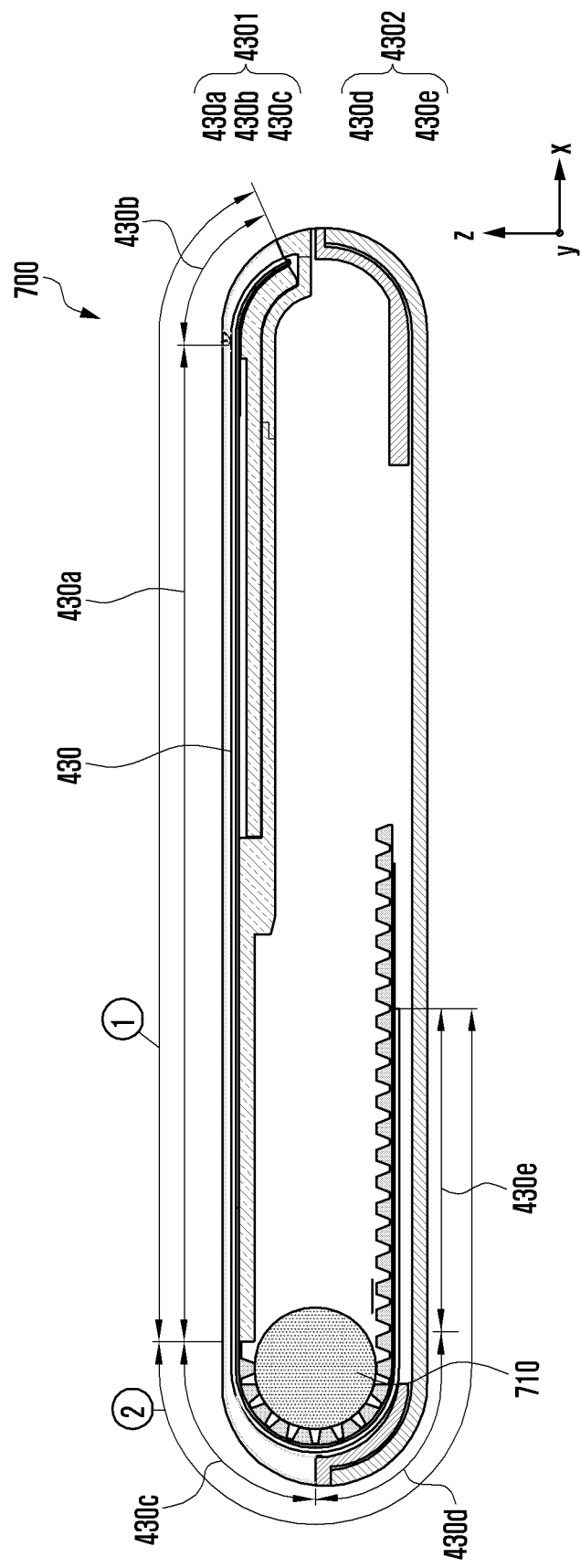
FIG. 7 is a front view of an electronic device viewed from one side according to various embodiments.

FIG. 7 is a front view 700 of an electronic device 400 viewed from one side according to various embodiments.

According to various embodiments, FIG. 7 may be a view illustrating the electronic device 400 viewed from the −y-axis direction to the +y-axis direction with reference to FIG. 4A and FIG. 4B.

Referring to FIG. 7, the flexible display 430 (e.g., the flexible display 430 in FIG. 4A and FIG. 4B) of the electronic device 400 (e.g., the electronic device 400 in FIG. 4A and FIG. 4B) may include a bendable section ②. The bendable section ② may include an extended portion of a screen 4301 when the electronic device 400 is converted from a closed state (e.g., the state of FIG. 4A) into an open state (e.g., the state of FIG. 4B). In case that the electronic device 400 is converted from the closed state into the open state, the bendable section ② may be slidably withdrawn to the outside of the electronic device 400 and as such, the screen 4301 may extend. In case that the electronic device 400 is converted from the open state into the closed state, at least a portion of the bendable section ② may be slidably inserted into the inner space of the electronic device 400 and as such, the screen 4301 may be reduced. In this case, at least another portion of the bendable section ②, for example, a second curved portion 430c, may be exposed to the outside.

In an embodiment, the electronic device 400 may include a pulley 710 disposed in the housing 410 to correspond to the bendable section ②. In case that the bendable section ② is inserted into the electronic device 400, at least a portion 4302 of the bendable section ② may include a planar area 430e and a curved area 430d corresponding to the pulley 710.

In an embodiment, the flexible display 430 may include a touch circuit (e.g., the touch circuit 250 in FIG. 2). For example, the touch circuit may include a transmitter (TX) (e.g., the transmitter 510 in FIG. 5A) including multiple first electrode lines (e.g., multiple driving electrodes) and a receiver (RX) (e.g., the receiver 520 in FIG. 5A) including multiple second electrode lines (e.g., multiple reception electrodes).

In an embodiment, the electronic device 400 may apply a driving signal through the transmitter 510 (e.g., the multiple first electrode lines) constituting a touch circuit included in the flexible display 430. The electronic device 400 may acquire a driving signal applied from the transmitter 510 through the receiver 520 (e.g., the multiple second electrode lines) constituting the touch circuit.

A driving signal applied through at least a portion of the flexible display 430 inserted into the inner space of the electronic device 400 according to various embodiments, for example, the transmitter 510 included in the bendable section ② may be received through the receiver 520 included in the bendable section ②.

In an embodiment, in case that at least a portion of the flexible display 430 is inserted into the inner space of the electronic device 400, a capacitance value of a partial area 430c or 430d of the bendable section ② may be different from those of an area 430a or 430b of the flexible display 430 not inserted into the inner space of the electronic device 400 and an area 430e which is inserted into the inner space of the electronic device 400 but does not form a curved surface.

In an embodiment, based on that the capacitance value of the partial area 430c or 430d of the bendable section ② of the flexible display 430 inserted into the inner space of the electronic device 400 is different from those of the area 430a or 430b of the flexible display 430 not inserted into the inner space of the electronic device 400 and the area 430e which is inserted into the inner space of the electronic device 400 but does not form a curved surface, the electronic device 400 may recognize that each area 430a, 430b, 430c, 430d, or 430e of the flexible display 430 is in a different state (e.g., a rolled state or unfolded state). That is, based on that each area 430a, 430b, 430c, 430d, or 430e of the flexible display has a different capacitance value, the electronic device 400 may distinguish a folded area and a planar area.

For example, due to interference as at least a portion of the flexible display 430 is inserted into the inner space of the electronic device 400, a capacitance of at least some areas 430c and 430d overlapping each other may be different from those of an area 430a or 430b of the flexible display 430 not inserted into the inner space of the electronic device 400 and an area 430e which is inserted into the inner space of the electronic device 400 but does not form a curved surface. For example, a charge amount acquired when the driving signal applied through the multiple first electrode lines (e.g., the multiple driving electrodes) of the transmitter 510 is received through the multiple second electrode lines constituting the at least some areas 430c and 430d overlapping each other may be different from a charge amount received through the multiple second electrode lines constituting the area 430a or 430b of the flexible display 430 not inserted into the inner space of the electronic device 400 and the area 430e which is inserted into the inner space of the electronic device 400 but does not form a curved surface.

Figure 8:
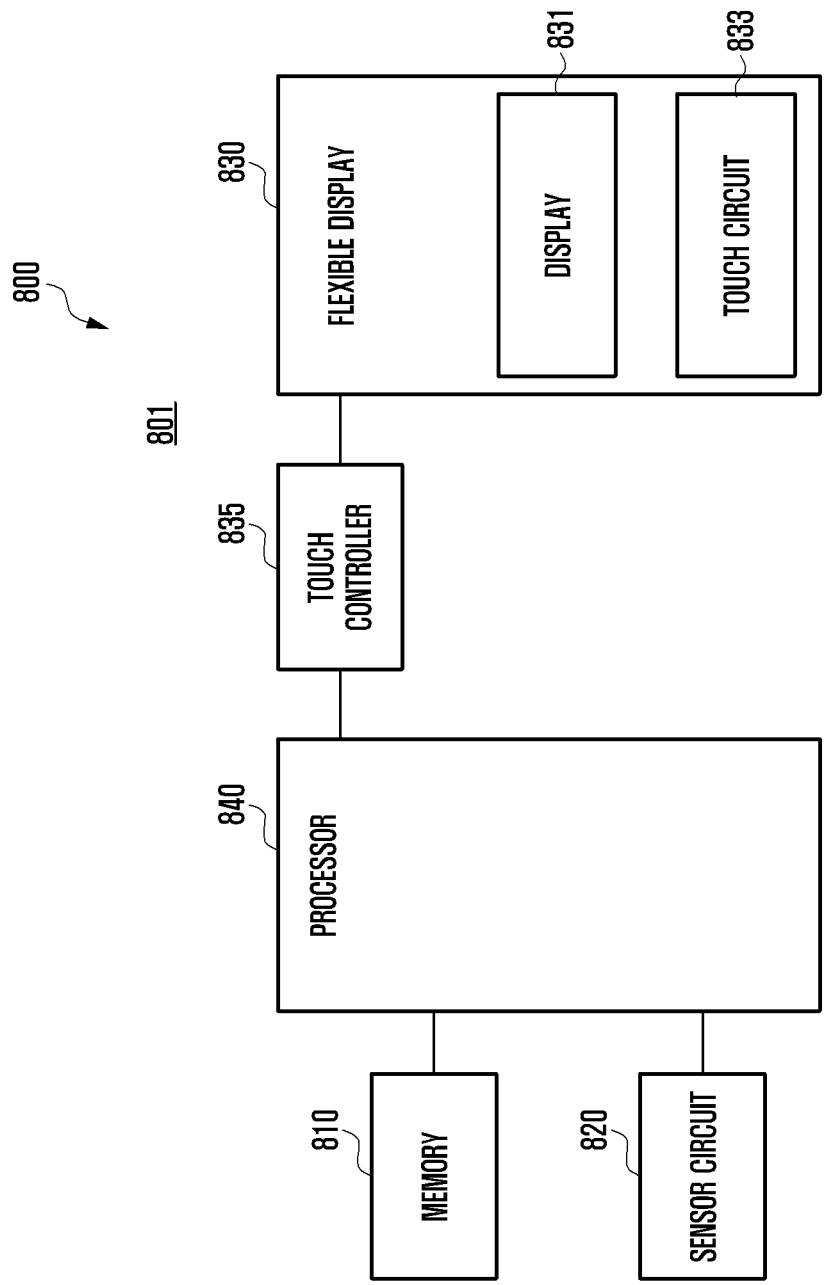
FIG. 8 is a block diagram illustrating an electronic device according to various embodiments.

FIG. 8 is a block diagram 800 illustrating an electronic device 801 according to various embodiments.

Referring to FIG. 8, the electronic device 801 (e.g., the electronic device 101 in FIG. 1, the electronic device 301 in FIG. 3A and FIG. 3B, or the electronic device 400 in FIG. 4A and FIG. 4B) may include a memory 810 (e.g., the memory 130 in FIG. 1), a sensor circuit 820 (e.g., the sensor module 176 in FIG. 1), a flexible display 830 (e.g., the display module 160 in FIG. 1, the flexible display 330 in FIG. 3A and FIG. 3B, or the flexible display 430 in FIG. 4A and FIG. 4B), a touch controller 835, and/or a processor 840 (e.g., the processor 120 in FIG. 1).

According to various embodiments of the disclosure, the memory 810 (e.g., the memory 130 in FIG. 1) may store instructions for identifying a state (e.g., a closed state, an open state, or an intermediate state) and/or state conversion (e.g., initiation of an opening operation or initiation of a closing operation) of the electronic device 801. For example, the memory 810 may store instructions configured to identify the closed state, the open state, or conversion between the closed state and the open state of the electronic device 801 by using at least one sensor included in the sensor circuit 820. For another example, the memory may store instructions configured to identify the closed state, the open state, or conversion between the closed state and the open state of the electronic device 801 by using the touch circuit 833 included in the flexible display 830 and there is no limitation to a method for identifying the state and/or the state conversion of the electronic device 801.

In another embodiment, the memory 810 may store instructions for identifying a capacitance value with respect to the display area of the flexible display 830. For example, a driving signal applied through the multiple TX electrodes of the touch circuit 833 may be acquired through the multiple RX electrodes of the touch circuit 833 and based thereon, the memory may store instructions for identifying a capacitance value.

In an embodiment, the memory 810 may store instructions for determining (e.g., configure or set) a deactivation area and an activation area of the display area of the flexible display 830 based on the capacitance value. For example, the memory 810 may store instructions for determining (e.g., configure or set) a folded area corresponding to the deactivation area of the display area and/or an area inserted into the housing 310 or 410 (e.g., the electronic device 801).

According to various embodiments of the disclosure, the sensor circuit 820 (e.g., the sensor module 176 in FIG. 1) may measure a physical quantity or detect an operation state of the electronic device 801 and generate an electrical signal or a data value corresponding thereto. In an embodiment, the sensor circuit 820 may identify a closed state, an open state, or conversion (e.g., initiation of an opening operation or initiation of a closing operation) between the closed state and the open state of the electronic device 801 by using a magnetic sensor (or a Hall IC).

According to various embodiments of the disclosure, the flexible display 830 (e.g., the display module 160 in FIG. 1, the flexible display 330 in FIG. 3A and FIG. 3B, or the flexible display 430 in FIG. 4A and FIG. 4B) may be configured to have an integrated form including a display 831 and the touch circuit 833 (e.g., the touch circuit 250 in FIG. 2).

At least a portion of the flexible display 830 according to various embodiments may be realized to be withdrawable from the inner space of the housing 310 or 410 of the electronic device 801. For example, in case that the electronic device 801 is converted from the closed state into the open state, at least a portion of the flexible display 830 may be exposed to the outer space of the housing 310 or 410 and thus a screen (e.g., the activation area) may extend. In case that the electronic device 801 is converted from the open state into the closed state, at least a portion of the flexible display 830 may be inserted into the inner space of the housing 310 or 410 and thus a screen may be reduced.

In an embodiment, the touch circuit 833 may include a transmitter (TX) (e.g., the transmitter 510 in FIG. 5A) including multiple first electrode lines (e.g., multiple driving electrodes) and a receiver (RX) (e.g., the receiver 520 in FIG. 5A) including multiple second electrode lines (e.g., multiple reception electrodes).

According to various embodiments of the disclosure, the touch controller 835 may be electrically connected to the flexible display 830. The touch controller 835 may detect a physical quantity from the touch circuit 833 and calculate a user input, for example, data (e.g., coordinate data (X, Y) of a position at which a touch is performed) with respect to a touch based on a change of the physical quantity (e.g., a voltage, a light quantity, a resistance, a charge quantity, or a capacitance). The touch controller 835 may transfer the data with respect to a touch to the processor 840. The processor 840 may acquire the data with respect to a touch as an event regarding the user input.

In various embodiments, the touch controller 835 may detect a state change of the flexible display 830. For example, the touch controller 835 may detect conversion of the flexible display 830 from the open state (or including the intermediate state) into the closed state or conversion of the flexible display 830 from the closed state into the open state. The touch controller 835 may apply a driving signal through the multiple TX electrodes of the touch circuit 833. The touch controller 835 may acquire a driving signal through the multiple RX electrodes of the touch circuit 833. The processor 840 may identify a capacitance value based on the acquired driving signal. For example, at least a portion of the flexible display 830 may be inserted into the inner space of the housing 310 or 410 or withdrawn to the outside of the housing 310 or 410. Depending on a degree by which the flexible display 830 is inserted into the inner space of the housing 310 or 410, at least some areas of the flexible display 830 may overlap each other. For example, the at least some areas overlapping each other of the display area of the flexible display 830 may have interference occurring thereon due to display areas overlapping each other and thus may have a capacitance value different from that of the flexible display 830. The touch controller 835 may identify information on the folded area of the flexible display 830 based on the capacitance value and transfer the information to the processor 840.

In various embodiments, the touch controller 835 may include a touchscreen panel (TSP) IC.

In various embodiments, the touch controller 835 is described as a separate module from the processor 840 and the flexible display 830, but is not limited thereto. For example, the touch controller 835 may be included in one module, chip, or package together with the processor 840 or the flexible display 830. Alternatively, it may be obvious to a person in the art that the touch controller 835 may be omitted in case that the processor 840 or the flexible display 830 performs an operation of the touch controller 835.

According to various embodiments of the disclosure, the processor 840 (e.g., the processor 120 in FIG. 1) may include a micro controller unit (MCU) and may drive an operating system (OS) or an embedded software program to control multiple hardware components connected to the processor 840. The processor 840 may control multiple hardware components according to instructions (e.g., the program 140 in FIG. 1) stored in the memory 810.

In an embodiment, the processor 840 may identify the folded area of the flexible display 830 received from the touch controller 835 and determine (e.g., configure or set) the folded area as a deactivation area. The processor 840 may determine (e.g., configure or set) an area other than the deactivation area of the flexible display 830 as an activation area.

In various embodiments, the electronic device 801 may include, a housing (e.g., the housing 310 in FIG. 3A and FIG. 3B or the housing 410 in FIG. 4A and FIG. 4B), a touch circuit 833 including multiple TX electrodes and multiple RX electrodes arranged to cross over the multiple TX electrode, a flexible display 830 including the touch circuit 833 which can be withdrawn from an inner space of the housing 310 or 410, a touch controller 835, and a processor 840 connected to the touch circuit 833, the flexible display 830, and the touch controller 835, wherein the touch controller 835 applies a driving signal through the multiple TX electrodes of the touch circuit 833, acquires the driving signal through the multiple RX electrodes, identifies a capacitance value based on the acquired driving signal, and identifies information about a folded area of the flexible display 830 based on the capacitance value, and the processor 840 may determine (e.g., configure or set) an activation area with respect to an unfolded area of the flexible display 830 based on the information about the folded area of the flexible display 830.

In various embodiments, the processor 840 may determine (e.g., configure or set) an area of the display area of the flexible display 830, which is inserted into the inner space of the housing 310 or 410 and formed to be a planar area, as a deactivation area.

In various embodiments, the processor 840 may be configured to determine an area of the display area of the flexible display 830 excluding the folded area and the area inserted into the inner space of the housing 310 or 410 and formed to be a planar area, as the unfolded area.

In various embodiments, after the activation area with respect to the unfolded area of the flexible display 830 is determined, the touch controller 835 may be configured to identify whether a state change of the flexible display 830 is detected and identify the capacitance value based on the driving signal acquired through the multiple RX electrodes as applied through the multiple TX electrodes based on the detection of the state change of the flexible display 830.

In various embodiments, after the activation area with respect to the unfolded area of the flexible display 830 is determined, the touch controller 835 may be configured to identify the capacitance value based on the driving signal acquired through the multiple RX electrodes as applied through the multiple TX electrodes at a designated time interval.

In various embodiments, the processor 840 may be configured to detect movement of the folded area based on the capacitance value and adjust the activation area based on the detected movement of the folded area.

In various embodiments, the processor 840 may be configured to adjust a ratio of a screen to be displayed on the adjusted activation area and/or reconfigure the screen based on rearrangement, and output the reconfigured screen through the adjusted activation area.

In various embodiments, the electronic device 801 may further include a semicircular conductor (e.g., the semicircular conductor 1401 in FIG. 14A or the semicircular conductor 1610 in FIG. 16A) disposed in the inner space of the housing 310 or 410.

In various embodiments, the touch controller 835 may be configured to apply the driving signal by using the semicircular conductor 1401 or 1610 based on the detection of a state change of the flexible display 830.

In various embodiments, the state change of the flexible display 830 may include a change into a state in which the flexible display 830 is withdrawn from the inner space of the housing 310 or 410 of the electronic device 801 or inserted into the inner space of the housing 310 or 410.

Figure 9:
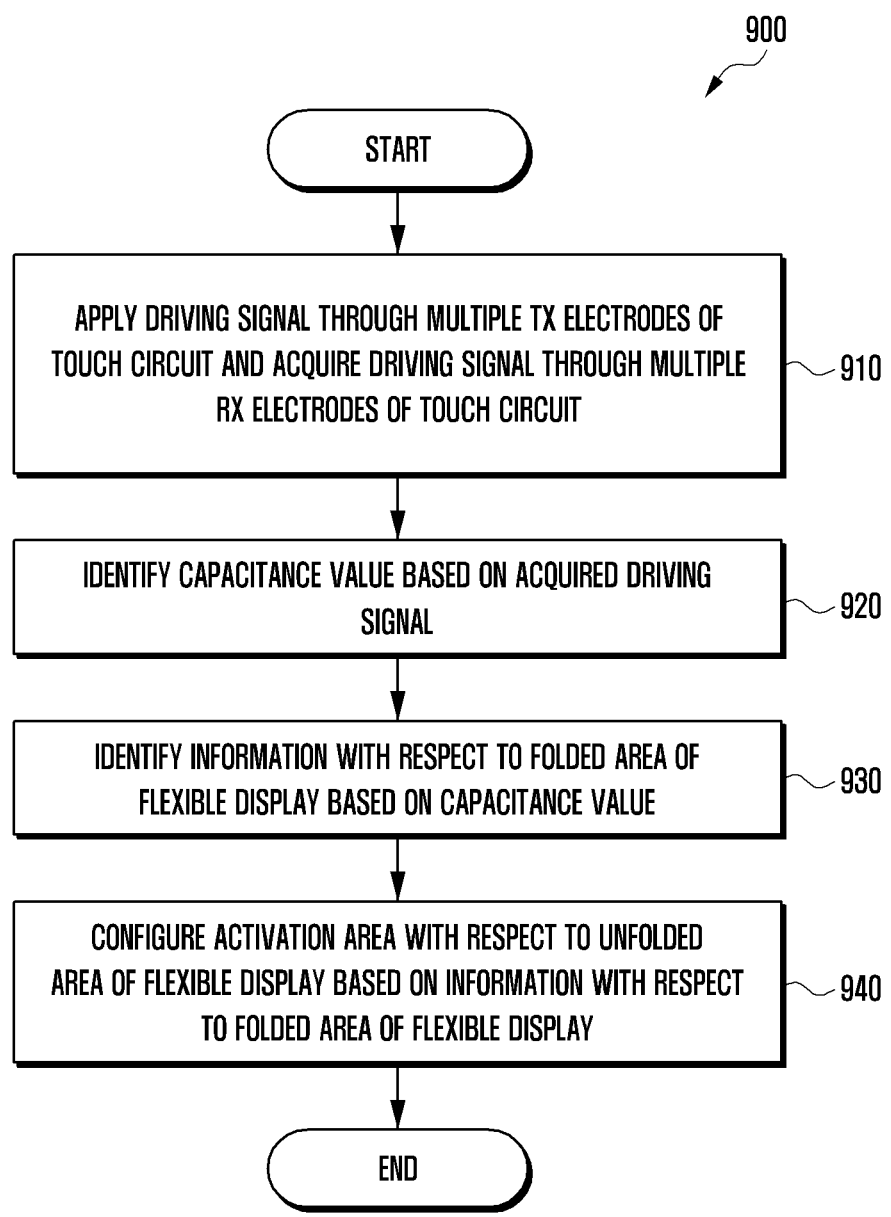
FIG. 9 is a flowchart explaining a method for determining an activation area of a flexible display according to various embodiments.

FIG. 9 is a flowchart 900 explaining a method for determining an activation area of a flexible display 830 according to various embodiments.

Referring to FIG. 9, in operation 910, a touch controller (e.g., the touch controller 835 in FIG. 8) of the electronic device (e.g., the electronic device 801 in FIG. 8) may apply a driving signal through multiple TX electrodes of a touch circuit (e.g., the touch circuit 833 in FIG. 8) and acquire a driving signal through multiple RX electrodes.

In various embodiments, the flexible display 830 may include a touch circuit 833. The touch circuit 833 may include a transmitter (TX) (e.g., the transmitter 510 in FIG. 5A) including multiple first electrode lines (e.g., multiple driving electrodes) and a receiver (RX) (e.g., the receiver 520 in FIG. 5A) including multiple second electrode lines (e.g., multiple reception electrodes).

In an embodiment, the touch controller 835 may apply a driving signal through the transmitter 510 (e.g., multiple first electrode lines) constituting the touch circuit 833. A driving signal as applied through the transmitter 510 may be acquired through the receiver 520 (e.g., multiple second electrode lines) constituting the touch circuit 833.

In an embodiment, in operation 920, the touch controller 835 may identify a capacitance value based on the acquired driving signal.

For example, in case that the electronic device 801 is configured by a form factor of a rollable form shown in FIG. 3A and FIG. 3B, at least a portion of a flexible display (e.g., the flexible display 330 in FIG. 3A and FIG. 3B) may be rolled to be inserted into the inner space of the housing 310 or withdrawn to the outside of the housing 310. Depending on a degree by which the flexible display 330 is rolled into the inner space of the housing 310, at least some areas of the flexible display 330 may be rolled overlapping each other around a rotation axis (e.g., the rotation axis C in FIG. 3A and FIG. 3B).

In an embodiment, a capacitance value of the at least some areas of the display area of the flexible display 330, which are rolled overlapping each other may be different from that of an area (e.g., a display area of the flexible display 330 withdrawn to the outside of the housing 310) which is not overlappingly rolled. For example, a capacitance value of the at least some areas of the display area of the flexible display 330, which are rolled overlapping each other, may have interference caused by the overlapping display area and accordingly may have a capacitance value different from that of an area (e.g., a display area of the flexible display 330 withdrawn to the outside of the housing 310) which is not overlappingly rolled. A capacitance value of an area (e.g., a display area of the flexible display 330 withdrawn from the inner space of the housing 310) of the display area of the flexible display 330, which is not overlappingly rolled may not be changed.

In an embodiment, based on that a capacitance value of the at least some areas of the display area of the flexible display 330, which are rolled overlapping each other is different from that of an area (e.g., a display area of the flexible display 330 withdrawn to the outside of the housing 310) which is not overlappingly rolled, the electronic device 801 may distinguish the folded area and the planar area of the flexible display 330.

For another example, in case that the electronic device 801 is configured by a form factor of the slidable form shown in FIG. 4A and FIG. 4B, the flexible display 430 (e.g., the flexible display 430 in FIG. 4A and FIG. 4B) may include a bendable section ②. The bendable section ② may include an extended portion of a screen 4301 when the electronic device 801 is converted from a closed state (e.g., the state of FIG. 4A) into an open state (e.g., the state of FIG. 4B). In case that the electronic device 801 is converted from the closed state into the open state, the bendable section ② may be slidably withdrawn to the outside of the electronic device 801 and as such, the screen 4301 may extend. In case that the electronic device 801 is converted from the open state into the closed state, at least a part of the bendable section ② may be slidably inserted into the inner space of the electronic device 801 and as such, the screen 4301 may be reduced. In this case, at least another portion of the bendable section ②, for example, a second curved portion 430c may be exposed to the outside.

In an embodiment, the electronic device 801 may include a pulley 710 disposed in the housing 410 to correspond to the bendable section ②. In case that the bendable section ② is inserted into the electronic device 801, at least a portion 4302 of the bendable section ② may include a planar area 430e and a curved area 430d corresponding to the pulley 710.

In an embodiment, in case that at least a portion of the flexible display 430 is inserted into the inner space of the electronic device 400, a capacitance value of a partial area 430c or 430d of the bendable section ② of the flexible display 430 may be different from those of an area 430a or 430b of the flexible display 430 not inserted into the inner space of the electronic device 801 and an area 430e which is inserted into the inner space of the electronic device 400 but does not form a curved surface.

In an embodiment, based on that the capacitance value of the partial area 430c or 430d of the bendable section ② of the flexible display 430 is different from those of the area 430a or 430b of the flexible display 430 not inserted into the inner space of the electronic device 801 and the area 430e which is inserted into the inner space of the electronic device 400 but does not form a curved surface, the electronic device 801 may distinguish the folded area and the planar area of the flexible display 430.

For example, due to interference as at least a portion of the flexible display 430 is inserted into the inner space of the electronic device 801, a capacitance value of at least some areas 430c and 430d overlapping each other may be different from those of an area 430a or 430b of the flexible display 430 not inserted into the inner space of the electronic device 801 and an area 430e which is inserted into the inner space of the electronic device 801 but does not form a curved surface. For example, a charge amount acquired when the driving signal applied through the multiple first electrode lines (e.g., the multiple driving electrodes) of the transmitter 510 is received through the multiple second electrode lines constituting the at least some areas 430c and 430d overlapping each other may be different from a charge amount received through the multiple second electrode lines constituting the area 430a or 430b of the flexible display 430 not inserted into the inner space of the electronic device 801 and the area 430e which is inserted into the inner space of the electronic device 801 but does not form a curved surface.

In an embodiment, in operation 930, the touch controller 835 may identify information on the folded area of the flexible display 830 based on the capacitance value. The touch controller 835 may transfer the information on the folded area of the flexible display 830 to the processor 840.

In an embodiment, in operation 940, the processor 840 may determine (e.g., configure or set) an activation area with respect to the unfolded area of the flexible display 830 based on the information about the folded area of the flexible display 830. For example, the processor 840 may identify the folded area of the flexible display 830 received from the touch controller 835 and determine (e.g., configure or set) the folded area as a deactivation area. In an embodiment, the processor 840 may further determine (e.g., configure or set) an area which is inserted into the inner space of the electronic device 801 but does not form a curved surface as a deactivation area.

In an embodiment, the processor 840 may determine (e.g., configure or set) an area other than the deactivation area of the flexible display 830 as an activation area.

In operation 910 according to various embodiments, it is described that a capacitance value is identified based on the acquired driving signal, but is not limited thereto. For example, based on detection of a state change of the flexible display 830, the touch controller 835 may acquire raw data with respect to a capacitance value of the entire display area of the flexible display 830.

By way of example, the raw data may include a value indicating an electrostatic charge characteristic state formed in all or some channels of the touch circuit 833. For another example, the raw data may include large amount of overall image information about touch sensitivity of the display area of the flexible display 830. For still another example, the raw data may include raw data with respect to a peripheral area including at least a portion of flexible display 830 of the electronic device 801, for example, a bending area and/or a rolled area. The raw data may be acquired in a form of a table, a matrix, or a string.

In various embodiments, the touch controller 835 may transfer the data to be acquired to the processor 840.

In various embodiments, the processor 840 may analyze the raw data received from the touch controller 835 and identify a capacitance value based on the analyzed raw data. In another embodiment, the processor 840 may image-process the raw data received from the touch controller 835 and identify a capacitance value based on the processed raw data. Based on the capacitance value, the processor 840 may identify an operation state (e.g., a state of being withdrawn from the inner space of the housing 310 or 410 (e.g., a state of withdrawing to the outer space of the housing 310 or 410) or a state of being inserted into the inner space of the housing 310 or 410) of the flexible display 830 and/or the folded area of the flexible display 830 in real time. In another embodiment, the processor 840 may analyze the raw data received from the touch controller 835 through machine learning, and, based on a raw data change, identify an operation state (e.g., a state of being withdrawn from the inner space of the housing 310 or 410 (e.g., a state of withdrawing to the outer space of the housing 310 or 410) or a state of being inserted into the inner space of the housing 310 or 410) of the flexible display 830 and/or the folded area of the flexible display 830 in real time.

In various embodiments, it is described that the processor 840 performs the operations, but is not limited thereto. For example, the touch controller 835 may generate raw data, directly analyze the raw data, and identify an operation state of the flexible display 830 and/or the folded area of the flexible display 830 in real time. In case of detecting an event with respect to the folded area of the flexible display 830 and/or an operation state of the flexible display 830, the touch controller 835 may transfer to the processor 840 a signal indicating that an event (e.g., a bending event) is detected.

In another words, the touch controller 835 may transfer raw data to the processor 840 in case of detecting a change of a predetermined degree. The processor 840 may identify whether the change of a predetermined degree includes an operation state of the flexible display 830, for example, a closed state, an open state, an intermediate state, and/or state conversion (e.g., initiation of an opening operation or initiation of a closing operation).

In various embodiments, raw data analysis and event detection with respect to the folded area may be performed by the touch controller 835 and thus by transferring the same to the processor 840 in case of detecting a bending event, an operation of the processor 840 may be minimized.

In various embodiments, it is described that the raw data is received by the processor 840 or the touch controller 835, but is not limited thereto. By way of example, the raw data may be configured to be acquired by a service layer, a hardware abstraction layer (HAL), or a driver layer included in software module layers, or firmware of a touch controller (not shown).

In various embodiments, although not shown, in case that the flexible display 830 maintains rolled to a specific size and a state change of the flexible display 830 is detected, the touch controller 835 may acquire raw data. Without limitation thereto, in case that the state change of the flexible display 830 is not detected, the touch controller 835 may acquire raw data with respect to the flexible display 830 at a predetermined period. Alternatively, in case that the electronic device 801 is a low-end electronic device 801, raw data may be acquired only when necessary, in order to reduce load on the electronic device 801.

In various embodiments, although not shown, an operation of performing image-processing based on raw data may include an operation of dividing the display area of the flexible display 830 into an activation area and a deactivation area, visualizing the same, and performing mapping the same to resolution reference coordinate values of the flexible display 830, based on the raw data with respect to the folded area of the flexible display 830, which is transferred at a specific time point. In various embodiments, based on information with respect to the previously determined activation area and deactivation area and/or a pattern, in case that a capacitance change more than or equal to a predetermined value is detected, update with respect to the activation area of the flexible display 830 may be performed to minimize processing load.

In various embodiments, although not shown, in a state in which the flexible display 830 is withdrawn from the inner space of the housing 310 or 410, in case that an input is not detected for a designated time, the electronic device 801 may enter a sleep mode (e.g., a low-power mode). The electronic device 801 may generate a wake-up signal and the electronic device 801 may be controlled to operate in a wake-up mode through a wake-up signal.

In another embodiment, in case of a state in which the electronic device 801 is woken up in an idle state to display visual information on the flexible display 830, the electronic device 801 may generate a sliding operation signal and control to notify the sliding operation of the electronic device 801 in real time through the sliding operation signal.

The wake-up signal and the sliding operation signal described above according to various embodiments may be used as a signal to wake the electronic device 801 in a state in which the electronic device 801 operates in a sleep mode or low-power mode to reduce current consumption after a predetermined time has elapsed.

In various embodiments, operation 910 to operation 940 described above may be performed in case that series of operations (e.g., a state change of the flexible display 330) is detected. Without limitation thereto, operation 910 to operation 940 described above may be performed at designated time intervals.

In various embodiments, a display method of an electronic device 801 including a flexible display 830 may include an operation of applying a driving signal by using multiple TX electrodes of a touch circuit 833 included in the flexible display 830, an operation of acquiring the driving signal through the multiple RX electrodes of the touch circuit 833, an operation of identifying a capacitance value based on the acquired driving signal, an operation of identifying information about a folded area of the flexible display 830 based on the capacitance value, and an operation of determining (e.g., configure or set) an activation area with respect to an unfolded area of the flexible display 830 based on the information about the folded area of the flexible display 830.

In various embodiments, the operation of configuring the activation area with respect to the unfolded area of the flexible display 830 may include an operation of configuring an area of the display area of the flexible display 830, which is inserted into the inner space of the housing 310 or 410 and formed to be a planar area, as a deactivation area.

In various embodiments, the operation of determining (e.g., configure or set) the activation area with respect to the unfolded area of the flexible display 830 may include an operation of determining an area excluding the folded area and an area of the display area of the flexible display 830, which is inserted into the inner space of the housing 310 or 410 and formed to be a planar area, as the unfolded area.

In various embodiments, the display method of the electronic device 801 including the flexible display 830 may further include an operation of identifying, after the activation area with respect to the unfolded area of the flexible display 830 is determined, whether a state change of the flexible display 830 is detected and an operation of identifying the capacitance value based on the driving signal acquired through the multiple RX electrodes as applied through the multiple TX electrodes based on the detection of the state change of the flexible display 830.

In various embodiments, the display method of the electronic device 801 including the flexible display 830 may further include an operation of identifying, after the activation area with respect to the unfolded area of the flexible display 830 is determined, the capacitance value at designated time intervals based on the driving signal acquired through the multiple RX electrodes as applied through the multiple TX electrodes.

In various embodiments, the display method of the electronic device 801 including the flexible display 830 may further include an operation of detecting movement of the folded area based on the capacitance value and an operation of adjusting the activation area based on the detected movement of the folded area.

In various embodiments, the display method of the electronic device 801 including the flexible display 830 may further include an operation of adjusting a ratio of a screen to be displayed on the adjusted activation area and/or reconfiguring the screen based on rearrangement, and an operation of outputting the reconfigured screen through the adjusted activation area.

In various embodiments, the electronic device 801 may further include a semicircular conductor (e.g., the semicircular conductor 1401 in FIG. 14A or the semicircular conductor 1610 in FIG. 16A) disposed in the inner space of the housing 310 or 410 of the electronic device 801.

In various embodiments, the display method of the electronic device 801 including the flexible display 830 may further include an operation of applying the driving signal by using the semicircular conductor 1401 or 1610 based on the detection of a state change of the flexible display 830.

In various embodiments, the state change of the flexible display 830 may include that the flexible display 830 is changed to be in a state of being withdrawn from the inner space of the housing 310 or 410 of the electronic device 801 or in a state of being inserted into the inner space of the housing 310 or 410.

Figure 10A:
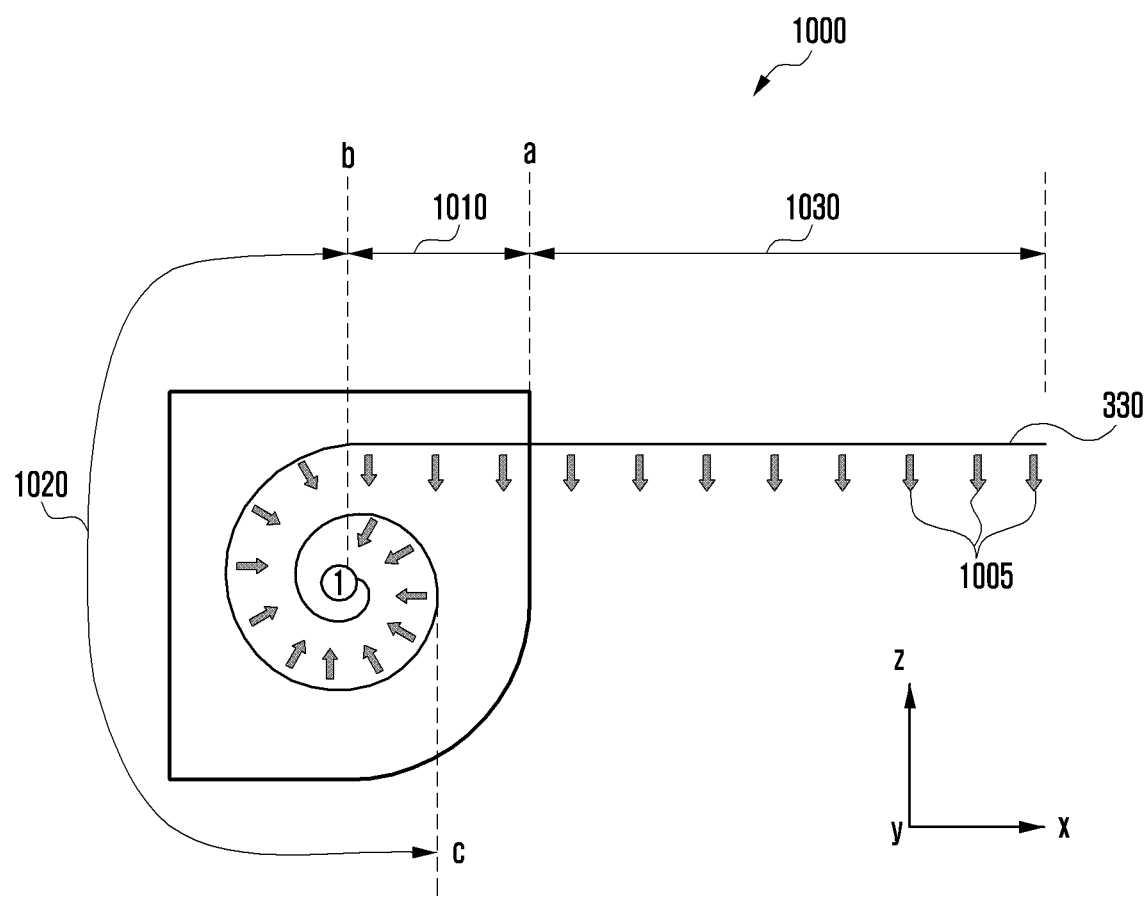
FIG. 10A is a view explaining a method for applying a driving signal from a transmitter including multiple first electrode lines constituting a touch circuit of a flexible display according to various embodiments.
Figure 10B:
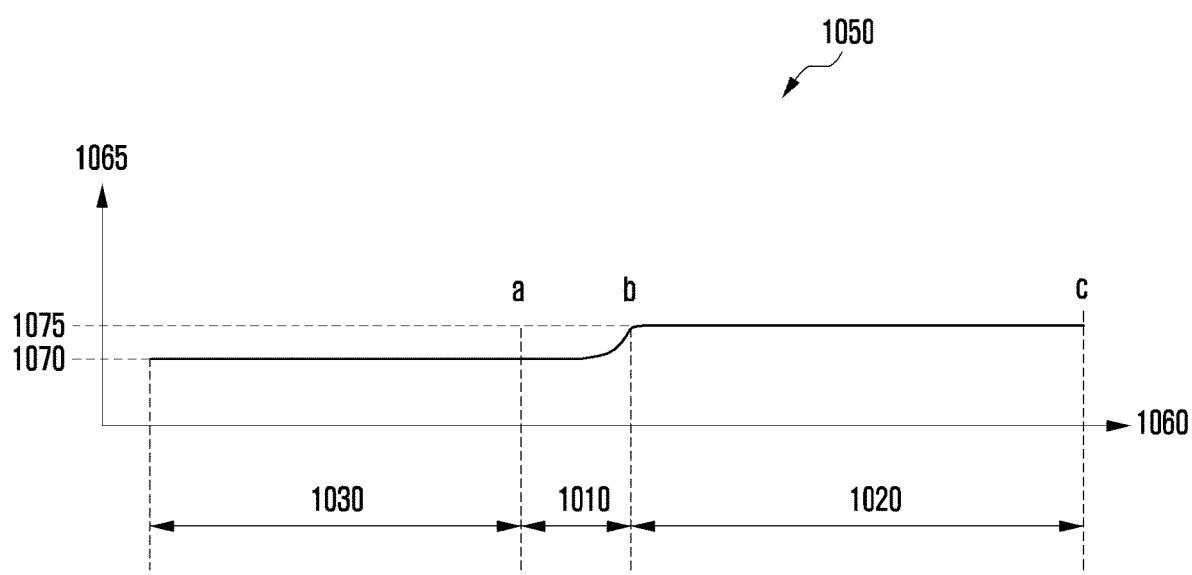
FIG. 10B is a view explaining a method for identifying a capacitance value based on acquisition of a driving signal through a receiver including multiple second electrode lines constituting a touch circuit of a flexible display according to various embodiments.

FIG. 10A is a view 1000 explaining a method for applying a driving signal from a transmitter including multiple first electrode lines constituting a touch circuit 833 of a flexible display 330 according to various embodiments. FIG. 10B is a view 1050 explaining a method for identifying a capacitance value based on acquisition of a driving signal through a receiver including multiple second electrode lines constituting a touch circuit 833 of a flexible display 330 according to various embodiments.

FIG. 10A according to various embodiments is a front view of an electronic device (e.g., the electronic device 801 in FIG. 8) viewed from one side in a state in which at least a portion of a flexible display (e.g., the flexible display 330 in FIG. 3A and FIG. 3B) is inserted into an inner space of a housing (e.g., the housing 310 in FIG. 3A and FIG. 3B) and at least another portion of the flexible display 330 is withdrawn to an outer space of the housing 310. For example, FIG. 10A according to various embodiments may be a view illustrating the electronic device 801 viewed from the −y-axis direction to the +y-axis direction with reference to FIG. 3A and FIG. 3B.

FIG. 10A according to various embodiments illustrates a case that a driving signal is applied from a transmitter (e.g., the transmitter 510 in FIG. 5A) (e.g., multiple first electrode lines) in an inward direction (e.g., direction ①) of the flexible display 330.

Referring to FIG. 10A, as the flexible display 330 is rolled in a circle around a rotation axis (e.g., the rotation axis C in FIG. 3A and FIG. 3B) (e.g., as inserted into the inner space of the housing (e.g., the housing 310 in FIG. 3A and FIG. 3B), an area 1010 or 1020 including a first section (e.g., a) to a third section (e.g., c) of the display area of the flexible display 330 may be disposed in the inner space of the housing 310. For example, a partial area 1010 (e.g., an area including the first section (e.g., a) to a second section (e.g., b)) of the first section (e.g., a) to the third section (e.g., c) of the display area may be inserted into the inner space of the housing 310 and formed to be a planar area. Another area 1020 (e.g., an area including the second section (e.g., b) to the third section (e.g., c) of the display area may be rolled in a circle around the rotation axis C. An area 1030 of the display area excluding the area 1020 including the first section (e.g., a) to the third section (e.g., c) may be exposed to the outside of the housing 310 and formed to be a planar area.

In an embodiment, a capacitance value with respect to the area 1020 including the second section (e.g., b) to the third section (e.g., c) of the display area of the flexible display 330 rolled into the inner space of the housing 310 of the flexible display 330 in FIG. 10A may be different from that of the display areas 1010 and 1030 of the flexible display 430 corresponding to the planar area.

In FIG. 10B according to various embodiments, the x-axis indicates an area 1060 of the unfolded flexible display 330 and the y-axis shows a capacitance value 1065 of the flexible display 330.

For example, referring to 10B, in case that a driving signal is applied from the transmitter (e.g., the transmitter 510 in FIG. 5A) (e.g., the multiple first electrode lines) in an inward direction (e.g., direction ①) of the flexible display 330, an area 1020 rolled in a circle may cause a potentiating effect in a portion corresponding to the inside (e.g., direction ①) of the area 1020 rolled in a circle due to interference from the surroundings. Accordingly, the rolled area 1020 of the flexible display 330 may have a second capacitance value 1075 different from a first capacitance value 1070 of the display area 1010 or 1030 corresponding to the planar area.

In an embodiment, based on that the rolled area 1020 of the flexible display 330 has the second capacitance value 1075 different from the first capacitance value 1070 of the display area 1010 or 1030 corresponding to the planar area, the electronic device 801 may recognize that each area 1010, 1020, or 1030 of the flexible display 330 is in a different state (e.g., a rolled state or an unfolded state). That is, based on that each area 1010, 1020, or 1030 of the flexible display 330 has a different capacitance value, the electronic device 801 may distinguish a folded area and a planar area.

For example, an electrostatic charge applied by the transmitter 510 is introduced to the receiver 520 in the rolled area 1020 of the flexible display 330, and due to an electrostatic charge applied by the transmitter 510 of a physically adjacent line (e.g., due to interference of a transmission signal), a capacitance received by the receiver 520 of the rolled area 1020 may be larger than a capacitance received by the receiver 520 of the display area 1010 or 1030. However, the disclosure is not limited thereto.

In an embodiment, based on a capacitance value of the area 1020 corresponding to the rolled area (e.g., the area including the second section (e.g., b) to the third section (e.g., c)) of the flexible display 330, the electronic device 801 may determine the area 1020 including the second section (e.g., b) to the third section (e.g., c) of the flexible display 830 as a bending area, for example, a folded area. Based on the area 1020 including the second section (e.g., b) to the third section (e.g., c) of the flexible display 330, which is determined as the folded area, the electronic device 801 may determine a deactivation area of the flexible display 330. The electronic device 801 may determine an area 1030 excluding the deactivation area with respect to the folded area of the flexible display 330 as an activation area.

In an embodiment, the electronic device 801 may further determine an area 1010 (e.g., an area including the first section (e.g., a) to the second section (e.g., b)) formed by a planar area of the display area of the flexible display 330, which is inserted into the housing 310 as a deactivation area. For example, based on a configuration value (e.g., a specific distance value from an end of the folded area) stored in a memory (e.g., the memory 130 in FIG. 1), the electronic device 801 may determine an area (e.g., an area including the first section (e.g., a) to the second section (e.g., b)) formed by a planar area inserted into the housing 310.

In various embodiments, the electronic device 801 may generate raw data for the display area of the flexible display 330 based on a capacitance value. The electronic device 801 may perform image processing based on the raw data for the display area. Based on an image (e.g., the image 555 in FIG. 5B) generated through image processing, the electronic device 801 may detect a rectangular image with respect to the display area of the flexible display 330. For example, the raw data of the area 1020 (e.g., 560 in FIG. 5B) including the second section (e.g., b) to the third section (e.g., c) may be large compared to the raw data with respect to the planar area 1030 (e.g., 565 in FIG. 5B). Based on that the raw data of the area 1020 including the second section (e.g., b) to the third section (e.g., c) is larger, a rectangular image with respect to an area having large raw data may be detected. The electronic device 801 may determine the area of the flexible display 330 corresponding to the rectangular image detected from an image generated through image processing as a bending area.

In FIG. 10A and FIG. 10B according to various embodiments, the application a driving signal by the transmitter 510 of the flexible display 330 in an inward direction (e.g., direction ①) of the flexible display 330 is merely an embodiment and is not limited thereto. For example, in various embodiments, the transmitter 510 of the flexible display 330 may apply a driving signal in an outward direction (e.g., direction ②) different from the inward direction (e.g., direction ①) of the flexible display 330. In this regard, description will be made with reference to FIG. 11A and FIG. 11B.

Figure 11A:
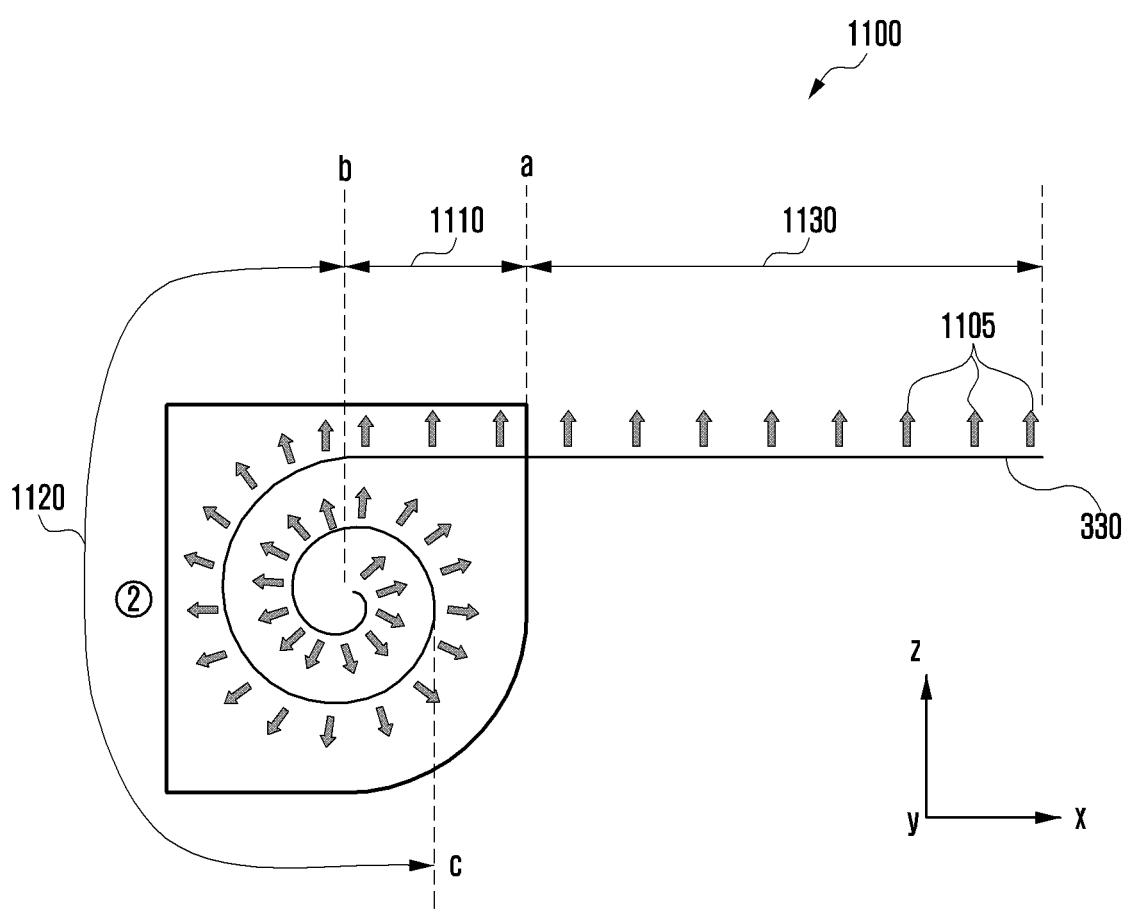
FIG. 11A is a view explaining a method for applying a driving signal from a transmitter including multiple first electrode lines constituting a touch circuit of a flexible display according to various embodiments.
Figure 11B:
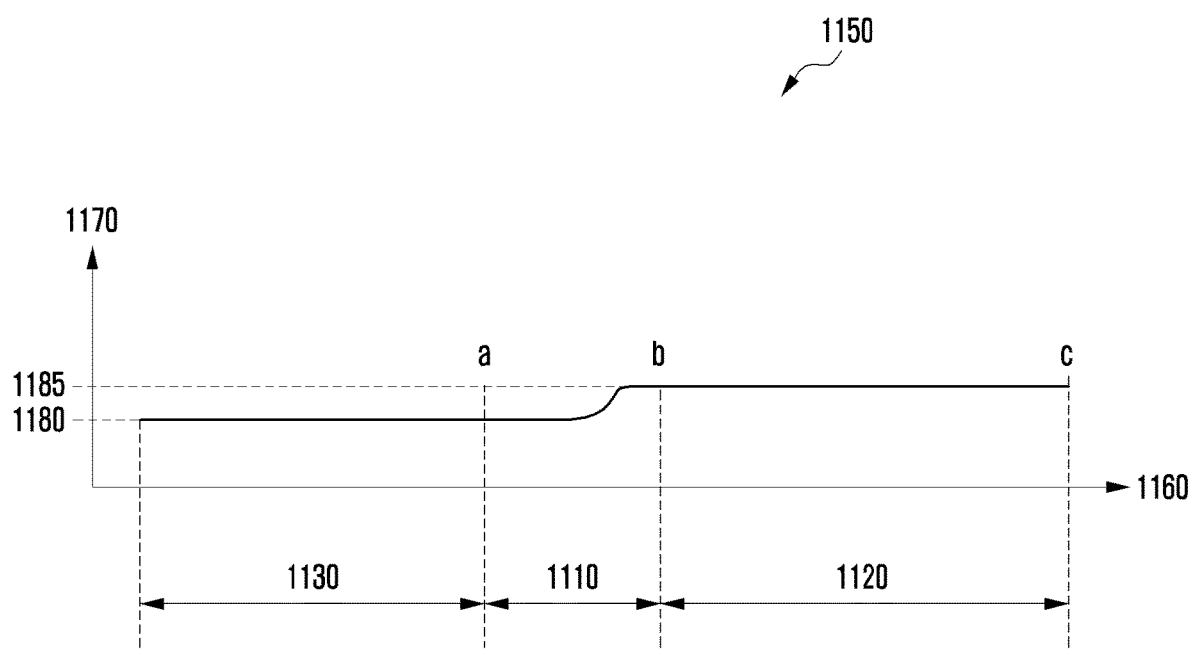
FIG. 11B is a view explaining a method for identifying a capacitance value based on acquisition of a driving signal through a receiver including multiple second electrode lines constituting a touch circuit of a flexible display according to various embodiments.

FIG. 11A is a view 1100 explaining a method for applying a driving signal from a transmitter including multiple first electrode lines constituting a touch circuit 833 of a flexible display 330 according to various embodiments. FIG. 11B is a view 1150 explaining a method for identifying a capacitance value based on acquisition of a driving signal through a receiver including multiple second electrode lines constituting a touch panel 833 of a flexible display 330 according to various embodiments.

FIG. 11A according to various embodiments is a front view of an electronic device (e.g., the electronic device 801 in FIG. 8) viewed from one side in a state in which at least a portion of a flexible display (e.g., the flexible display 330 in FIG. 3A and FIG. 3B) is inserted into an inner space of a housing (e.g., the housing 310 in FIG. 3A and FIG. 3B) and at least another portion of the flexible display 330 is withdrawn from an inner space of the housing 310. For example, FIG. 11A according to various embodiments may be a view illustrating the electronic device 801 viewed from the −y-axis direction to the +y-axis direction with reference to FIG. 3A and FIG. 3B.

FIG. 11A according to various embodiments illustrates a case that a driving signal is applied from a transmitter (e.g., the transmitter 510 in FIG. 5A) (e.g., multiple first electrode lines) in an outward direction (e.g., direction ②) of the flexible display 330.

Referring to FIG. 11A, as the flexible display 330 is rolled in a circle around a rotation axis (e.g., the rotation axis C in FIG. 3A and FIG. 3B), an area 1120 including a first section (e.g., a) to a third section (e.g., c) of the display area of the flexible display 330 may be disposed in the inner space of the housing 310. For example, a partial area 1110 (e.g., an area including the first section (e.g., a) to a second section (e.g., b)) of the first section (e.g., a) to the third section (e.g., c) of the display area may be inserted into the inner space of the housing 310 and formed to be a planar area. Another area 1120 (e.g., an area including the second section (e.g., b) to the third section (e.g., c) of the display area may be rolled in a circle around the rotation axis C. An area 1130 of the display area excluding the area 1110 or 1120 including the first section (e.g., a) to the third section (e.g., c) may be exposed to the outside of the housing 310 and formed to be a planar area.

In an embodiment, a capacitance value with respect to the area 1120 including the second section (e.g., b) to the third section (e.g., c) of the display area of the flexible display 330 rolled into the inner space of the housing 310 of the flexible display 330 in FIG. 11A may be different from that of the display areas 1110 and 1130 of the flexible display 430 corresponding to the planar area.

In FIG. 11B according to various embodiments, the x-axis indicates an area 1160 of the unfolded flexible display 330 and the y-axis shows a capacitance value 1170 of the flexible display 330.

For example, referring to 11B, in case that a driving signal is applied from the transmitter (e.g., the transmitter 510 in FIG. 5A) (e.g., the multiple first electrode lines) in an outward direction (e.g., direction ②) of the flexible display 330, an area 1120 rolled in a circle may have a capacitance value different from that of the display area 1110 or 1130 corresponding to the planar area due to interference from the surroundings. By way example, in case of scanning a capacitance at a predetermined time interval (e.g., once every 8 ms), the electronic device 801 may generate an image with a curve by image processing a value indicating a charge amount. The electronic device 801 may determine, as a bending area, an area having a shape significantly lower or higher than surroundings in the generated image. Since the scanning is performed at a predetermined time interval, the raw data may be regarded as an image for video playback being changed in real time and accordingly, a folded area of the flexible display 830 may be identified in real time.

In an embodiment, a capacitance value of the area 1120 corresponding to the rolled area of the flexible display 330 may have a second capacitance value 1180 different from a first capacitance value 1185 of the display area 1110 or 1130 corresponding to the planar area.

For example, the second capacitance value 1180 of the area 1120 corresponding to the rolled area of the flexible display 330 may be larger than the first capacitance value 1185 of the display area 1110 or 1130 corresponding to the planar area. However, the disclosure is not limited thereto.

In various embodiments, as described above, a charge amount of the bending area 1120 and a charge amount of the planar area 1110 or 1130 may be different and by performing image-processing thereon, the folded area of the flexible display 830 may be identified in real time.

In an embodiment, based on that the capacitance value of the area 1120 including the second section (e.g., b) to the third section (e.g., c) of the flexible display 330 and the capacitance value of the display area 1110 or 1130 of the flexible display 430 are different, the electronic device 801 may recognize that each area 1110, 1120, or 1130 of the flexible display 330 is in a different state (e.g., a rolled state or an unfolded state). That is, based on that each area 1110, 1120, or 1130 of the flexible display 330 has a different capacitance value, the electronic device 801 may distinguish a folded area and a planar area. For example, based on the capacitance value of the area 1120 including the second section (e.g., b) to the third section (e.g., c) of the flexible display 330, the electronic device 801 may determine the area 1120 including the second section (e.g., b) to the third section (e.g., c) of the flexible display 330 as a bending area, for example, a folded area. Based on the area 1120 including the second section (e.g., b) to the third section (e.g., c) of the flexible display 330, which is determined as the folded area, the electronic device 801 may determine a deactivation area of the flexible display 330. The electronic device 801 may determine an area 1030 excluding the deactivation area with respect to the folded area of the flexible display 330 as an activation area.

In an embodiment, the electronic device 801 may further determine an area 1110 (e.g., an area including the first section (e.g., a) to the second section (e.g., b)) formed by a planar area of the display area of the flexible display 330, which is inserted into the inner space the housing 310 as a deactivation area.

The activation area according to various embodiments may be an area on which visual information (e.g., a text, an image, and/or an icon) is displayed. However, without limitation thereto, the activation area may correspond to an area for processing only touch coordinates occurring in the activation area as valid coordinates. Accordingly, touch coordinates detected from the deactivation area of the flexible display 330 inserted into the inner space of the housing 310 may be configured not to be processed. In another embodiment, in case that the flexible display 330 is rolled to the outside of the housing 310, for example, the outside of a back cover of the electronic device 801, an area rolled to the outside of the back cover may be configured as a deactivation area and touch coordinates detected from the deactivation area may be configured not to be processed. Accordingly, a malfunction which may occur in the deactivation area may be prevented.

Figure 12A:
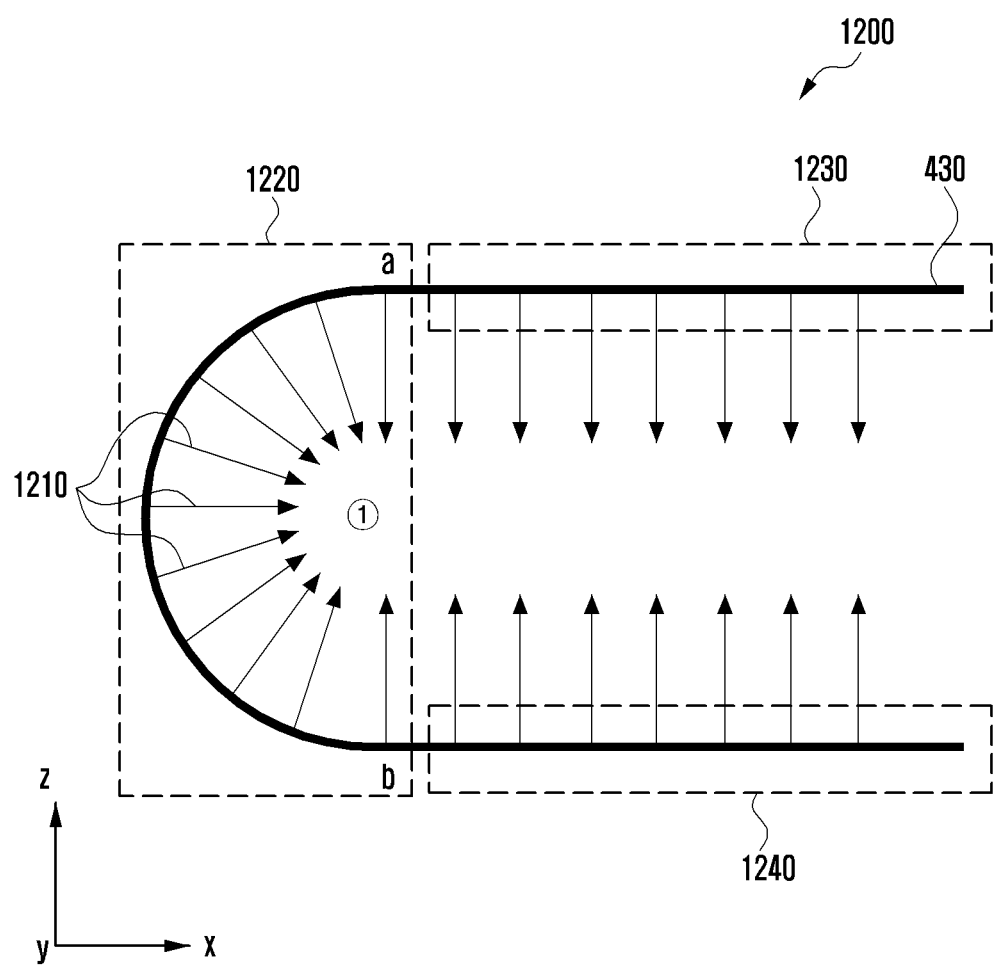
FIG. 12A is a view explaining a method for applying a driving signal from a transmitter including multiple first electrode lines constituting a touch circuit of a flexible display according to various embodiments.
Figure 12B:
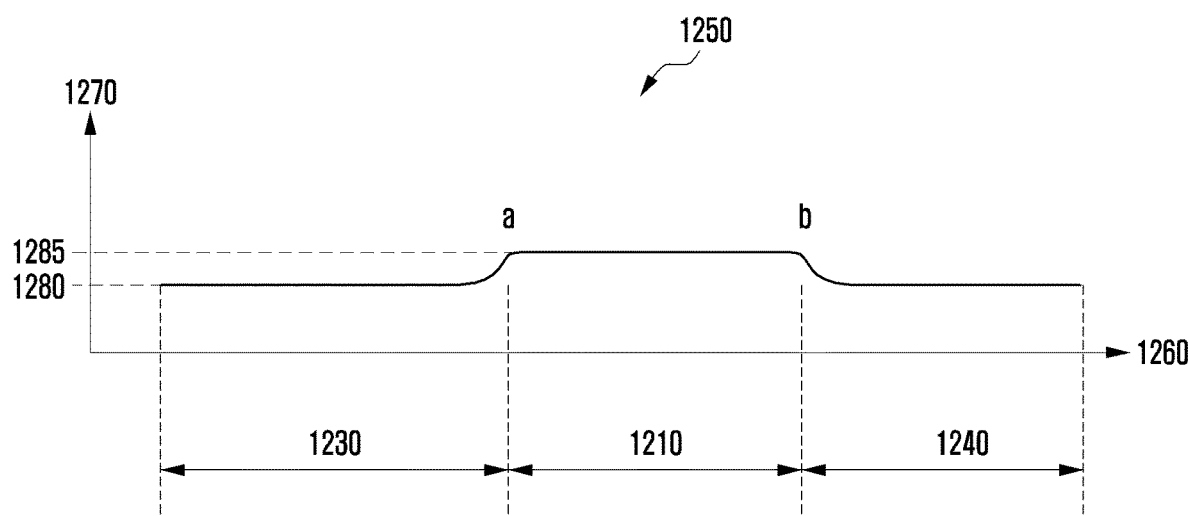
FIG. 12B is a view explaining a method for detecting a capacitance change based on acquisition of a driving signal through a receiver including multiple second electrode lines constituting a touch circuit of a flexible display according to various embodiments.

FIG. 12A is a view 1200 explaining a method for applying a driving signal from a transmitter including multiple first electrode lines constituting a touch circuit 833 of a flexible display 430 according to various embodiments. FIG. 12B is a view 1250 explaining a method for detecting a capacitance change based on acquisition of a driving signal through a receiver including multiple second electrode lines constituting a touch circuit 833 of a flexible display 430 according to various embodiments.

FIG. 12A according to various embodiments is a front view of the electronic device 400 viewed from one side in a state in which at least a portion of a flexible display (e.g., the flexible display 430 in FIG. 4A and FIG. 4B) is inserted into an inner space of a housing (e.g., the housing 410 in FIG. 4A and FIG. 4B) and at least another portion of the flexible display 430 is withdrawn to an outer space of the housing 410. For example, FIG. 12A according to various embodiments may be a view illustrating the electronic device (e.g., the electronic device 801 in FIG. 8) viewed from the −y-axis direction to the +y-axis direction with reference to FIG. 4A and FIG. 4B.

Referring to FIG. 12A, as the flexible display 430 is inserted into the inner space of the housing 410 (or the electronic device 801), a curved area may be formed based on an area 1220 including the first section (e.g., a) to the second section (e.g., b) of the display area of the flexible display 430, and an area 1230 or 1240 excluding an area including the first section (e.g., a) to the second section (e.g., b) may be configured as a planar area.

Figure 13A:
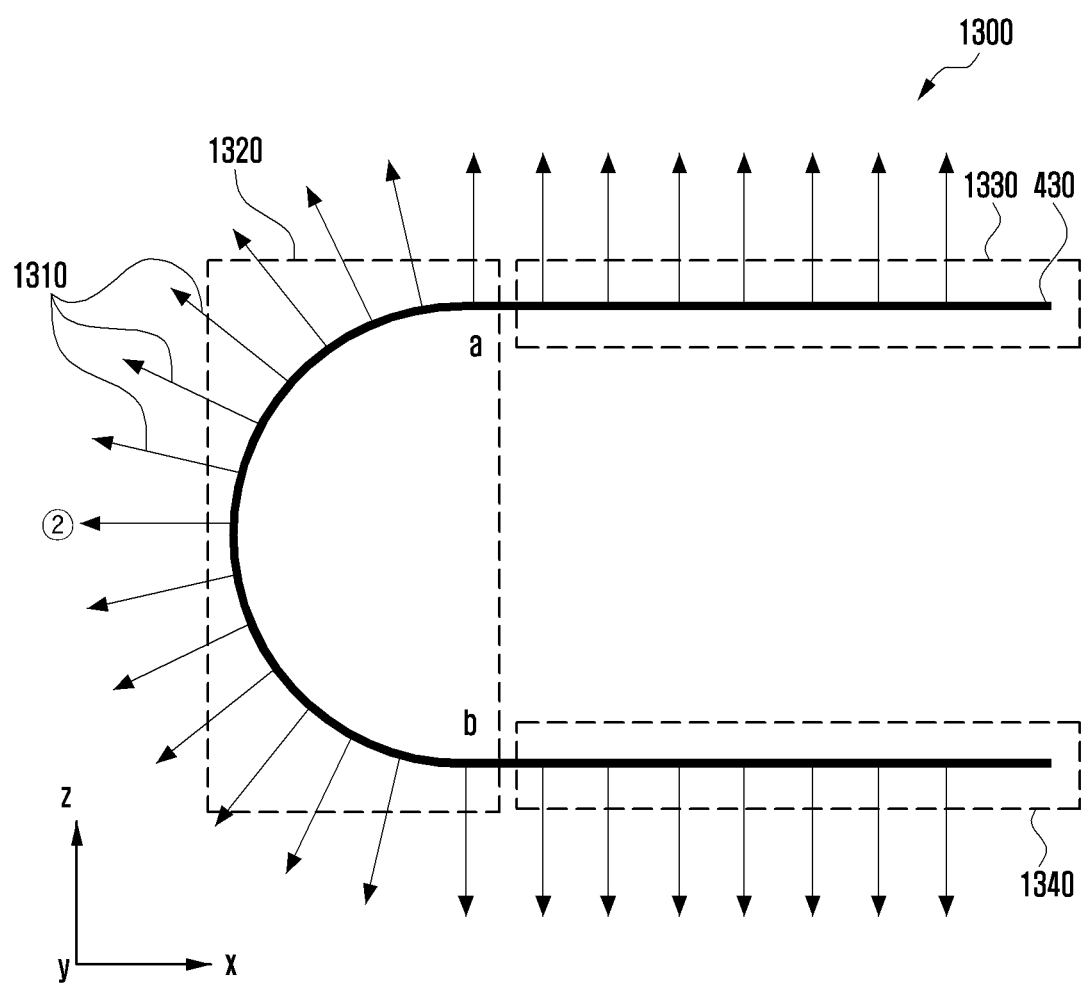
FIG. 13A is a view explaining a method for applying a driving signal from a transmitter including multiple first electrode lines constituting a touch circuit of a flexible display according to various embodiments.

In an embodiment, a capacitance with respect to the area 1220 inserted in the inner space of the housing 410 of the flexible display 430 to correspond to a curved surface of a pulley (e.g., the pulley 710 in FIG. 7) in FIG. 13A may be different from a capacitance with respect to the display area 1230 or 1240 of the flexible display 430 corresponding to the planar area.

In FIG. 12B according to various embodiments, the x-axis indicates an area 1260 of the unfolded flexible display 430 and the y-axis shows a capacitance value 1270 of the unfolded flexible display 430.

For example, referring to 12B, in case that a driving signal 1210 is applied from a transmitter (e.g., the transmitter 510 in FIG. 5A) (e.g., the multiple first electrode lines) in an inward direction (e.g., direction ①) of the flexible display 430, the area 1220 corresponding to a curved surface of a pulley (e.g., the pulley 710 in FIG. 7) may cause a potentiating effect in a portion corresponding to the inside (e.g., direction ①) of the area corresponding to the curved surface due to interference from the surroundings. Accordingly, the capacitance of the area 1220 corresponding to the curved surface of the flexible display 430 may be changed. For example, the area 1220 corresponding to the curved surface of the flexible display 430 may have a second capacitance value 1285 different from a first capacitance value 1280 of the display area 1230 or 1240 corresponding to the planar area.

For example, an electrostatic charge applied by the transmitter 510 is introduced to the receiver 520 in the area 1220 corresponding to the curved surface of the flexible display 430, and due to an electrostatic charge applied by the transmitter 510 of a physically adjacent line (e.g., due to interference of a transmission signal), a capacitance received by the receiver 520 of the area 1220 corresponding to the curved surface may be larger than a capacitance received by the receiver 520 of the display area 1230 or 1240. However, the disclosure is not limited thereto.

In an embodiment, based on that the capacitance value of the area 1220 corresponding to the curved surface of the flexible display 430 and the capacitance value of the display area 1230 or 1240 corresponding to the planar area of the flexible display 430 are different, the electronic device 801 may recognize that each area 1220, 1230, or 1240 of the flexible display 330 is in a different state (e.g., a rolled state or an unfolded state). That is, based on that each area 1220, 1230, or 1240 of the flexible display 330 has a different capacitance value, the electronic device 801 may distinguish a folded area and a planar area.

For example, based on the capacitance value of the flexible display 430, the electronic device 810 may determine an area including the first section (e.g., a) to the second section (e.g., b) of the flexible display 430 having the relatively large second capacitance value 1285 as a bending area, for example, a folded area. Based on the area 1220 including the first section (e.g., a) to the second section (e.g., b) of the flexible display 430, which is determined as the folded area, the electronic device 801 may determine a deactivation area of the flexible display 430. The electronic device 801 may determine an area 1230 excluding the deactivation area with respect to the folded area of the flexible display 430 as an activation area.

In various embodiments, the electronic device 801 may determine, as an activation area, an area exposed to the outside of the electronic device 801, for example, a second curved portion (e.g., the second curved portion 430c in FIG. 4A) of the area determined as the bending area of the flexible display 430.

In various embodiments, the electronic device 801 may further determine an area 1240 formed by the planar area of the display area of the flexible display 430, which is inserted into the housing 410, as a deactivation area. For example, based on a configuration value (e.g., a specific distance value from an end of the folded area) stored in a memory (e.g., the memory 130 in FIG. 1), the electronic device 801 may determine an area 1240 formed by a planar area inserted into the housing 410.

In FIG. 12A and FIG. 12B, the application a driving signal by the transmitter 510 of the flexible display 430 in an inward direction (e.g., direction ①) of the flexible display 430 is merely an embodiment and is not limited thereto. For example, in various embodiments, the transmitter 510 of the flexible display 430 may apply a driving signal in an outward direction (e.g., direction ②) different from the inward direction (e.g., direction ①) of the flexible display 430. In this regard, description will be made with reference to FIG. 13A and FIG. 13B.

Figure 13B:
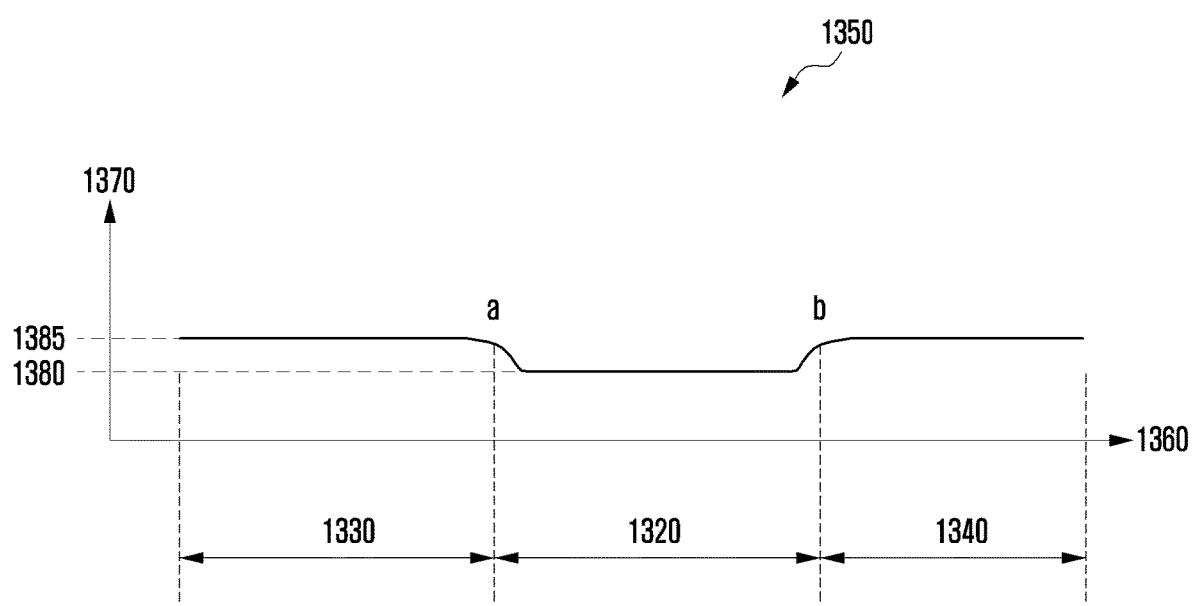
FIG. 13B is a view explaining a method for detecting a capacitance value based on acquisition of a driving signal through a receiver including multiple second electrode lines constituting a touch circuit of a flexible display according to various embodiments.

FIG. 13A is a view 1300 explaining a method for applying a driving signal from a transmitter including multiple first electrode lines constituting a touch circuit 833 of a flexible display 430 according to various embodiments. FIG. 13B is a view 1350 explaining a method for detecting a capacitance value based on acquisition of a driving signal through a receiver including multiple second electrode lines constituting a touch circuit 833 of a flexible display 430 according to various embodiments.

FIG. 13A according to various embodiments is a front view of an electronic device (e.g., the electronic device 400 in FIG. 4A and FIG. 4B) viewed from one side in a state in which at least a portion of a flexible display (e.g., the flexible display 430 in FIG. 4A and FIG. 4B) is inserted into an inner space of a housing (e.g., the housing 410 in FIG. 4A and FIG. 4B) and at least another portion of the flexible display 430 is withdrawn from the inner space of the housing 410. For example, according to various embodiments, FIG. 13A may be a view illustrating the electronic device 400 viewed from the −y-axis direction to the +y-axis direction with reference to FIG. 4A and FIG. 4B.

FIG. 13A according to various embodiments illustrates a case that a driving signal is applied from a transmitter (e.g., the transmitter 510 in FIG. 5A) (e.g., multiple first electrode lines) in an outward direction (e.g., direction ②) of the flexible display 430.

Referring to FIG. 13A, as the flexible display 430 is inserted into the inner space of the housing 410 (or the electronic device 400), a curved area may be formed based on an area 1320 including the first section (e.g., a) to the second section (e.g., b) of the display area of the flexible display 430, and an area 1330 or 1340 excluding an area 1320 including the first section (e.g., a) to the second section (e.g., b) may be configured as a planar area.

In an embodiment, a capacitance with respect to the area 1320 inserted in the inner space of the housing 410 of the flexible display 430 to correspond to a curved surface of a pulley (e.g., the pulley 710 in FIG. 7) in FIG. 13A may be different from a capacitance with respect to the display area 1330 or 1340 of the flexible display 430 corresponding to the planar area.

In FIG. 13B according to an embodiment, the x-axis indicates an area 1360 of the unfolded flexible display 430 and the y-axis shows a capacitance value 1370 of the unfolded flexible display 430.

For example, referring to 13B, in case that a driving signal 1310 is applied from a transmitter (e.g., the transmitter 510 in FIG. 5A) (e.g., the multiple first electrode lines) in an outward direction (e.g., direction ②) of the flexible display 430, the area 1320 corresponding to a curved surface of a pulley (e.g., the pulley 710 in FIG. 7) may cause a potentiating effect in a portion corresponding to the outside (e.g., direction ②) of the area corresponding to the curved surface due to interference from the surroundings. Accordingly, the capacitance of the area 1320 corresponding to the curved surface of the flexible display 430 may be changed. For example, the area 1320 corresponding to the curved surface of the flexible display 430 may have a second capacitance value 1380 different from a first capacitance value 1385 of the display area 1330 or 1340 corresponding to the planar area.

For example, an electrostatic charge applied by the transmitter 510 is introduced to the receiver 520 in the area 1320 corresponding to the curved surface of the flexible display 430, and due to an electrostatic charge applied by the transmitter 510 of a physically adjacent line (e.g., due to interference of a transmission signal), a capacitance received by the receiver 520 of the area 1320 corresponding to the curved surface may be smaller than a capacitance received by the receiver 520 of the display area 1330 or 1340. However, the disclosure is not limited thereto.

In an embodiment, based on a capacitance value of each area 1320, 1330, or 1340 of the flexible display 430, the electronic device 810 may determine an area 1320 including the first section (e.g., a) to the second section (e.g., b) of the flexible display 430 having the relatively small second capacitance value 1380 as a bending area, for example, a folded area. Based on the area 1320 including the first section (e.g., a) to the second section (e.g., b) of the flexible display 430, which is determined as the folded area, the electronic device 801 may determine a deactivation area of the flexible display 430. The electronic device 801 may determine an area 1330 excluding the deactivation area with respect to the folded area of the flexible display 430 as an activation area.

In various embodiments, the electronic device 801 may determine, as an activation area, an area exposed to the outside of the electronic device 801, for example, a second curved portion (e.g., the second curved portion 430c in FIG. 4A) of the area determined as the bending area of the flexible display 430.

In various embodiments, the electronic device 801 may further determine an area 1340 formed by the planar area of the display area of the flexible display 430, which is inserted into the housing 410, as a deactivation area. For example, based on a configuration value (e.g., a specific distance value from an end of the folded area) stored in a memory (e.g., the memory 130 in FIG. 1), the electronic device 801 may determine an area 1340 formed by a planar area inserted into the housing 410.

Figure 14A:
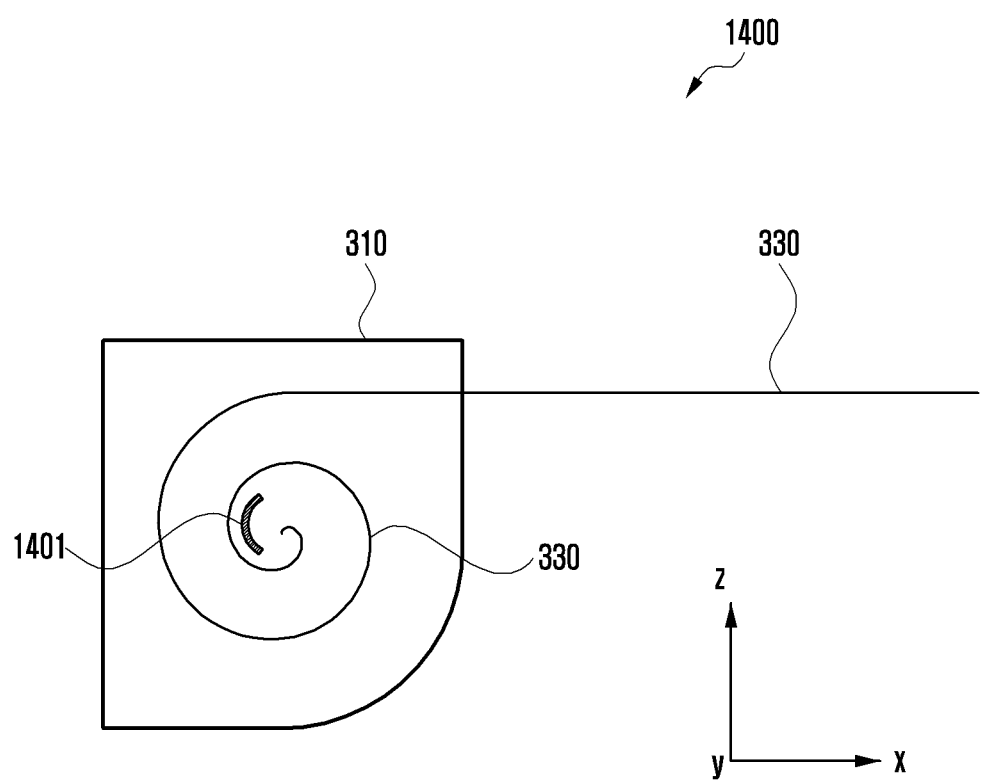
FIG. 14A is a view illustrating a semicircular conductor disposed in an inner space of a housing of an electronic device according to various embodiments.
Figure 14B:
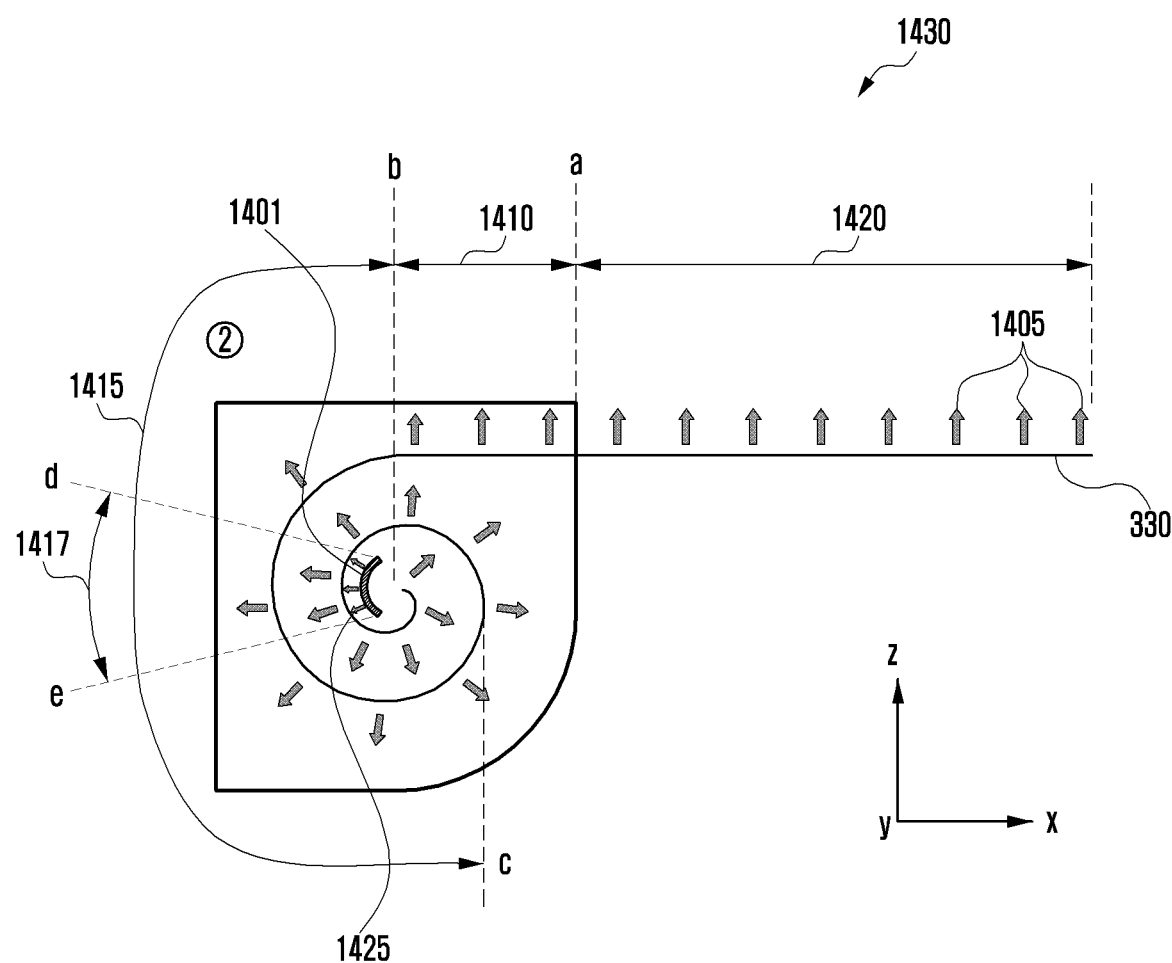
FIG. 14B is a view explaining a method for applying a driving signal from a transmitter including multiple first electrode lines constituting a touch circuit of a flexible display according to various embodiments.
Figure 14C:
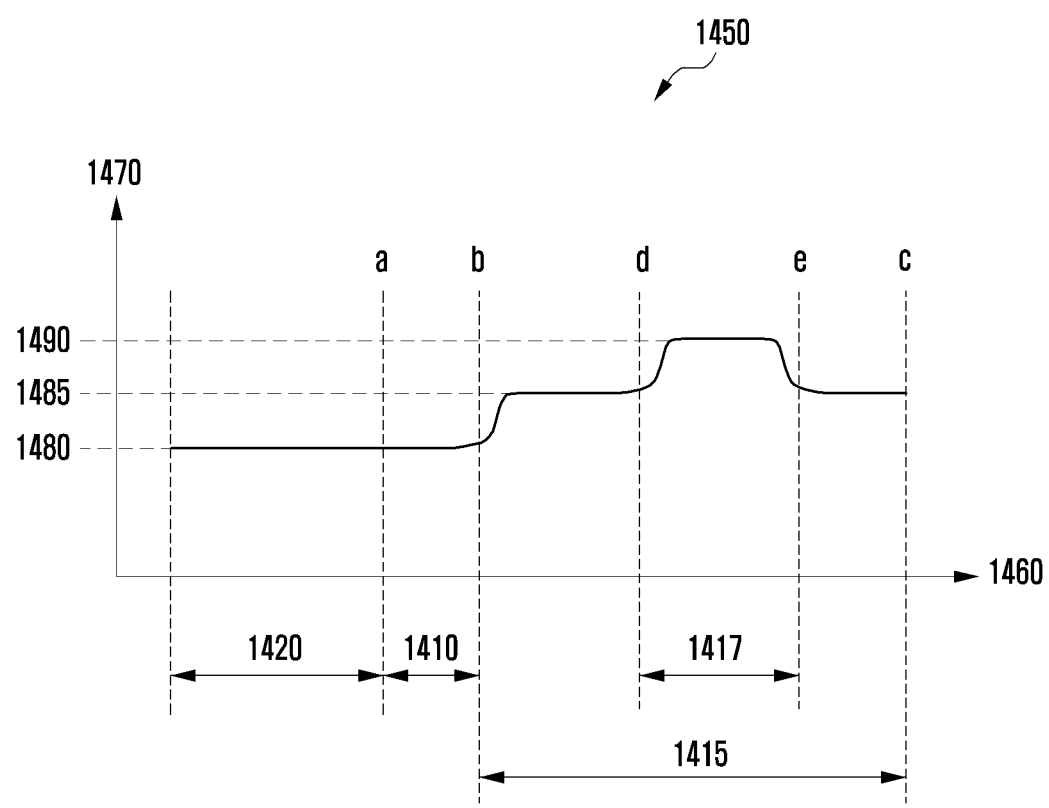
FIG. 14C is a view explaining a method for identifying a capacitance value based on acquisition of a driving signal through a receiver including multiple second electrode lines constituting a touch circuit of a flexible display according to various embodiments.

FIG. 14A is a view 1400 illustrating a semicircular conductor 1401 disposed in an inner space of a housing 310 of an electronic device 801 according to various embodiments. FIG. 14B is a view 1430 explaining a method for applying a driving signal from a transmitter including multiple first electrode lines constituting a touch circuit 833 of a flexible display 330 according to various embodiments. FIG. 14C is a view 1450 explaining a method for identifying a capacitance value based on acquisition of a driving signal through a receiver including multiple second electrode lines constituting a touch circuit 833 of a flexible display 330 according to various embodiments.

Referring to FIG. 14A, at least a portion of the flexible display 330 (e.g., the flexible display 330 in FIG. 3A and FIG. 3B) of the electronic device (e.g., the electronic device 801 in FIG. 8) may be inserted into the inner space of the housing 310 (e.g., the housing 310 in FIG. 3A and FIG. 3B) while being rolled in a circle around a rotation axis (e.g., the rotation axis C in FIG. 3A and FIG. 3B), and at least another portion of the flexible display 330 may be in a state of being withdrawn to the outer space of the housing 310.

In an embodiment, the electronic device 801 may further include a semicircular conductor 1401 disposed in the inner space of the housing 310.

In an embodiment of FIG. 14A according to various embodiments, compared to the embodiment of FIG. 11A, as the semicircular conductor 1401 is disposed in the inner space of the housing 310, a capacitance value with respect to the display area of the flexible display 330 corresponding to a curved bending area of the flexible display 330 in FIG. 14A may be smaller than a capacitance value with respect to the display area 1120 of the flexible display 330 corresponding to a curved bending area of the flexible display 330 in FIG. 11A.

For example, referring to FIG. 14B, as the flexible display 330 is rolled, an area 1410 or 1415 including the first section (e.g., a) to the third section (e.g., c) of the display area of the flexible display 330 may be disposed in the inner space of the housing 310. For example, a partial area 1410 (e.g., an area including the first section (e.g., a) to a second section (e.g., b)) of the first section (e.g., a) to the third section (e.g., c) of the display area may be inserted into the inner space of the housing 310 and formed to be a planar area. Another area 1415 (e.g., an area including the second section (e.g., b) to the third section (e.g., c)) of the display area may be rolled in a circle around the rotation axis C. An area 1420 of the display area excluding the area 1410 or 1415 including the first section (e.g., a) to the third section (e.g., c) may be exposed to the outside of the housing 310 and formed to be a planar area.

In an embodiment, as the electronic device 301 further includes the semicircular conductor 1401 in the inner space of the housing 310, a driving signal 1405 may be applied through the transmitter 410 of the flexible display 330 and a driving signal 1425 may be applied through the semicircular conductor 1401.

In an embodiment, the driving signals 1405 and 1425 applied through the transmitter 410 of the flexible display 330 and the semicircular conductor 1401 may be acquired through a receiver (e.g., the receiver 420 in FIG. 4A) (e.g., the multiple second electrode lines) of the flexible display 330.

In FIG. 14C according to various embodiments, the x-axis indicates an area 1460 of the unfolded flexible display 330 and the y-axis shows a capacitance value 1470 of the flexible display 330.

For example, referring to FIG. 14C, in a structure in which the semicircular conductor 1401 according to the embodiments of FIG. 14A and FIG. 14B, an area 1417 including a fourth section (e.g., d) to a fifth section (e.g., e) may have a third capacitance value 1480 different from a first capacitance value 1490 of the display area 1410 or 1420 of the display area corresponding to the planar area and a second capacitance value 1485 of an area 1415 including the second section (e.g., b) to the third section (e.g., c) excluding an the area 1417 including the fourth section (e.g., d) to the fifth section (e.g., e).

By further including the semicircular conductor 1401 in FIG. 14A and FIG. 14B according to various embodiments, based on that a capacitance value (e.g., the third capacitance value 1480) of the area 1415 including the second section (e.g., b) to the third section (e.g., c) is different from capacitance values (e.g., the first capacitance value 1490 and the second capacitance value 1485) of other areas (e.g., based on that the capacitance value is relatively small), the bending area of the flexible display 330 may be accurately detected.

In an embodiment, based on a capacitance value (e.g., the third capacitance value 1480) of the area 1417 including the fourth section (e.g., d) to the fifth section (e.g., e) of the flexible display 330, the electronic device 801 may determine the area 1417 including the fourth section (e.g., d) to the fifth section (e.g., e) of the flexible display 330 as a bending area, for example, a folded area. In an embodiment, the electronic device 801 may determine an area (e.g., an area including the second section (e.g., b) to the fourth section (e.g., d) and an area including the fifth section (e.g., e) to the third section (e.g., c)) having the second capacitance value 1485, in addition to the area 1417 including the fourth section (e.g., d) to the fifth section (e.g., e), as a bending area. Based on the area 1415 including the second section (e.g., b) to the third section (e.g., c) of the flexible display 330, which is determined as the folded area, a deactivation area may be determined. The electronic device 801 may determine an area 1420 excluding the deactivation area with respect to the folded area of the flexible display 330 as an activation area.

In an embodiment, the electronic device 801 may further determine an area 1410 (e.g., an area including the first section (e.g., a) to the second section (e.g., b)) formed by a planar area of the display area of the flexible display 330, which is inserted into the housing 310 as a deactivation area.

Figure 15:
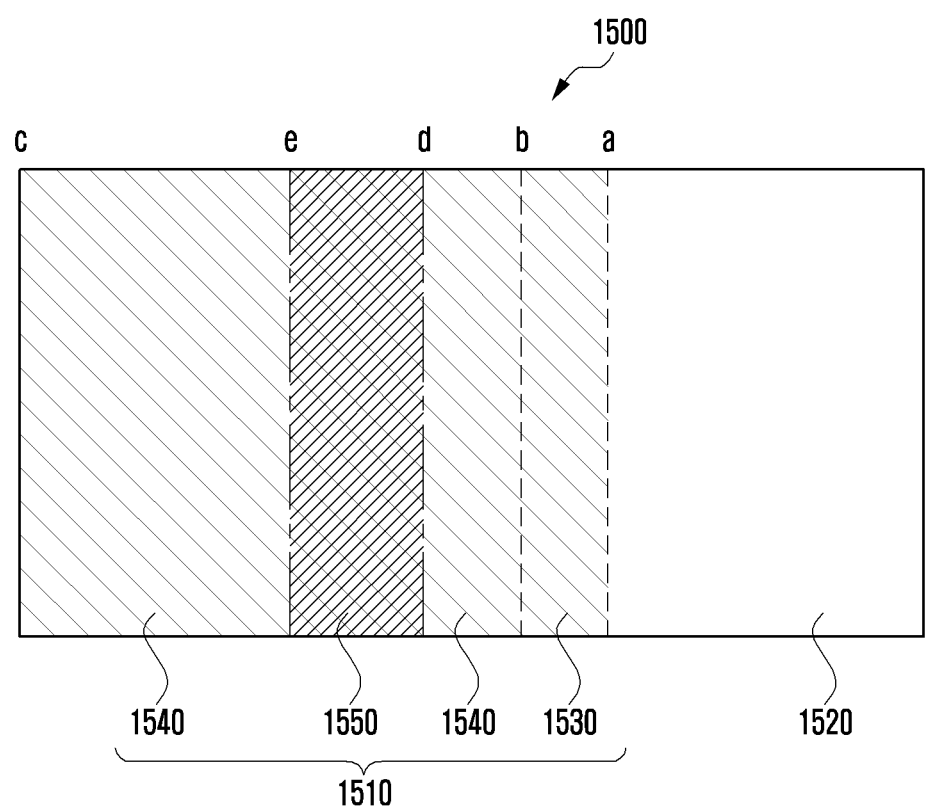
FIG. 15 is a view explaining a method for determining an activation area of a flexible display according to various embodiments.

FIG. 15 is a view 1500 explaining a method for determining an activation area of a flexible display 330 according to various embodiments.

Referring to FIG. 15, in a structure in which the semicircular conductor 1401 according to the embodiment of FIG. 14A and FIG. 14B described above, of the display area of the flexible display 330, an area 1550 (e.g., the area having a capacitance value (e.g., the third capacitance value 1480 in FIG. 14B) different from other areas 1520, 1530, and 1540) including the fourth section (e.g., d) to the fifth section (e.g., e) of the flexible display 330 may be determined as a folded area. However, without limitation thereto, the electronic device 801 may determine an area (e.g., an area 1540 including the second section (e.g., b) to the fourth section (e.g., d) and an area 1540 including the fifth section (e.g., e) to the third section (e.g., c)) having a second capacitance value (e.g., the second capacitance value 1485 in FIG. 14B) different from a first capacitance value (e.g., the first capacitance value 1490 in FIG. 14B), in addition to the area 1417 including the fourth section (e.g., d) to the fifth section (e.g., e), as a bending area. The electronic device 801 may further determine an area 1530 (e.g., an area including the first section (e.g.) to the second section (e.g., b)) formed by a planar area of the display area of the flexible display 330, which is inserted into the housing 310 as a deactivation area.

In an embodiment, the electronic device 801 may determine the area 1520 excluding deactivation areas 1530, 1540, and 1550 of the flexible display 330 as an activation area.

Figure 16A:
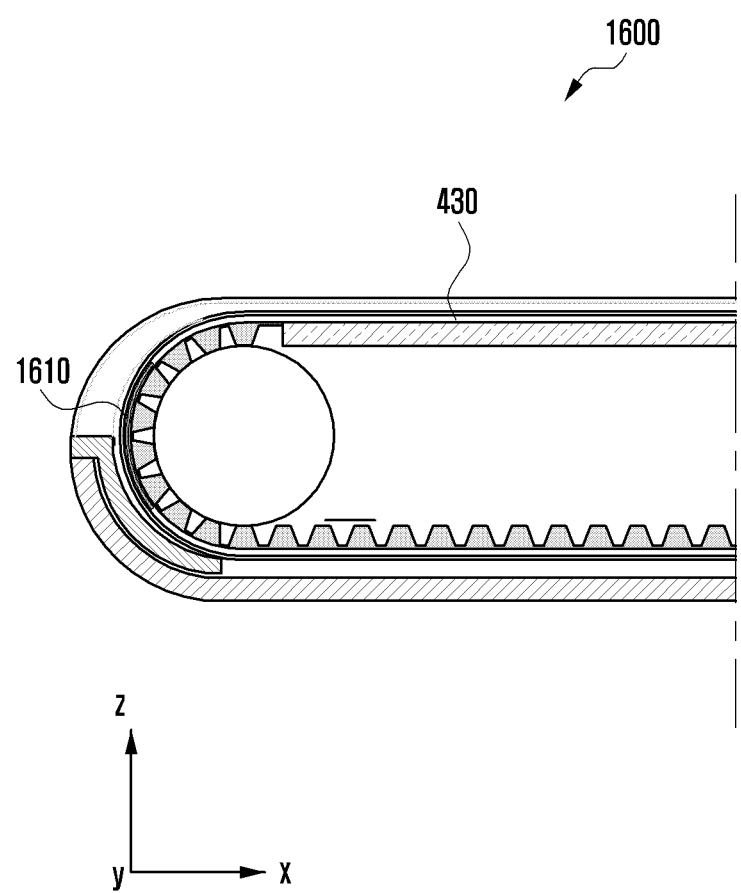
FIG. 16A is a view illustrating a semicircular conductor disposed in an inner space of a housing of an electronic device according to various embodiments.
Figure 16B:
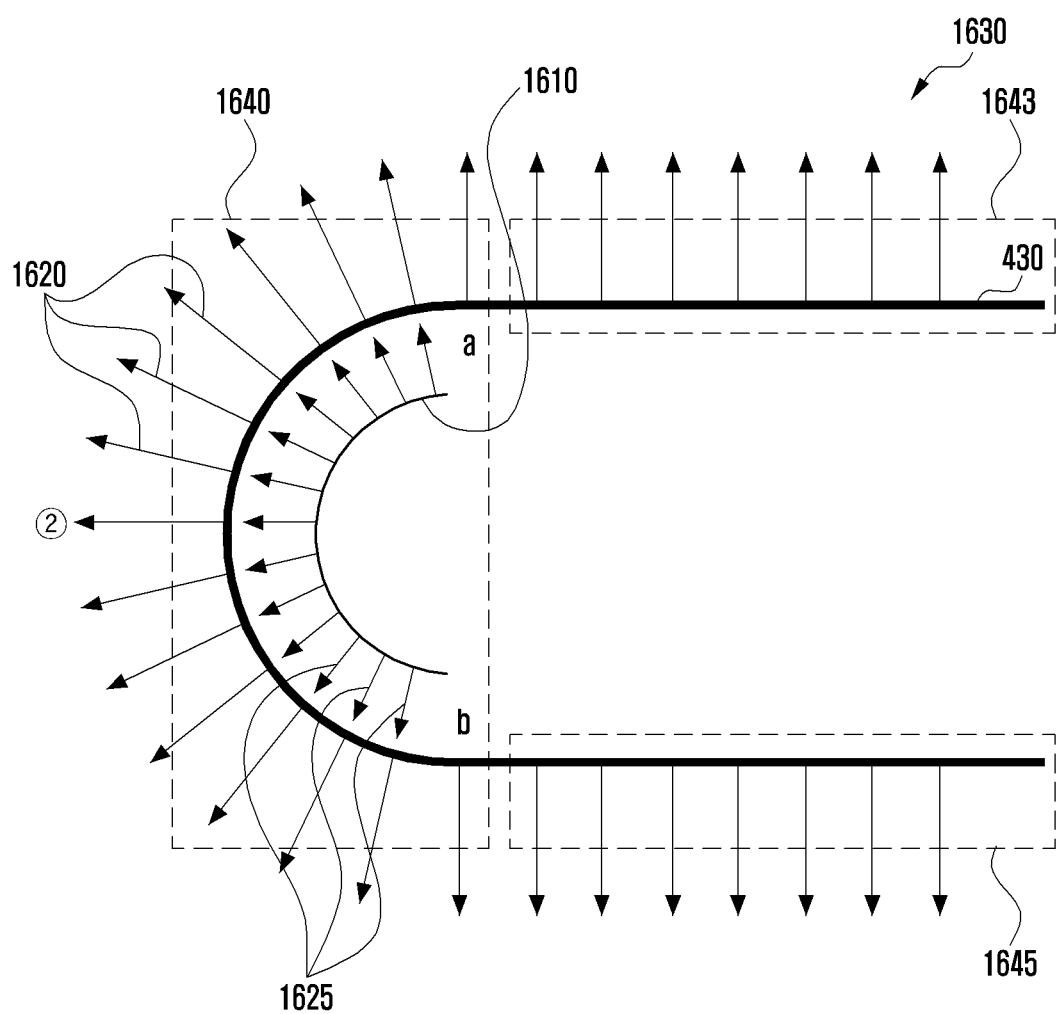
FIG. 16B is a flowchart explaining a method for applying a driving signal from a transmitter including multiple first electrode lines constituting a touch circuit of a flexible display according to various embodiments.
Figure 16C:
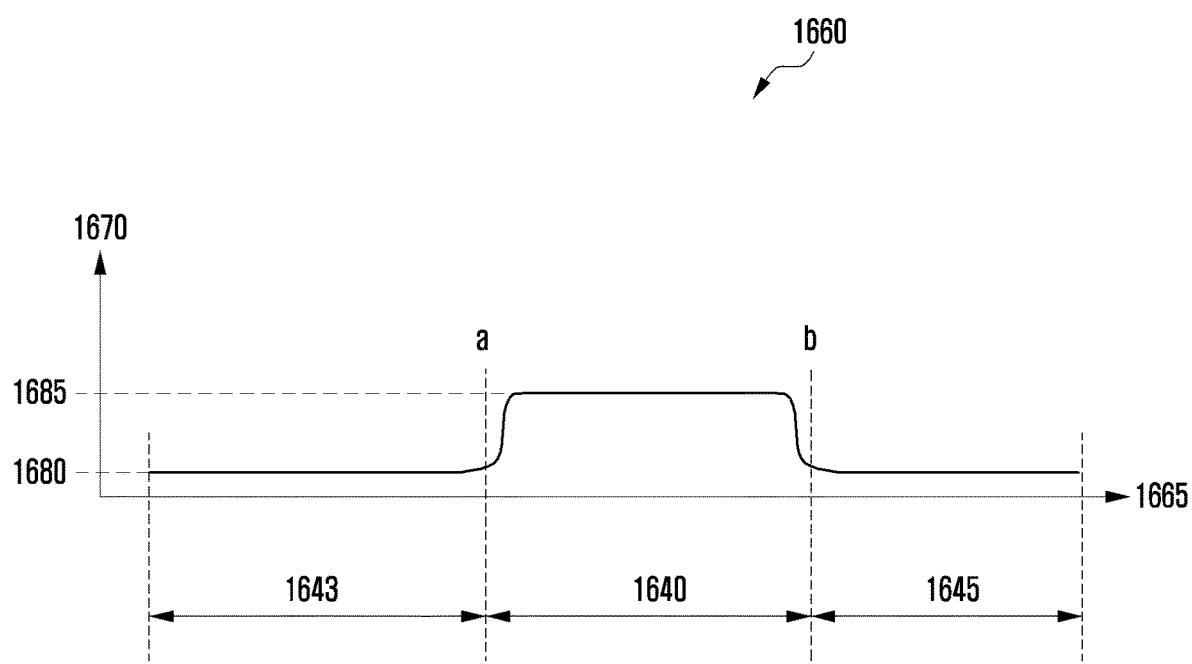
FIG. 16C is a flowchart explaining a method for detecting a capacitance value based on acquisition of a driving signal through a receiver including multiple second electrode lines constituting a touch circuit of a flexible display according to various embodiments.

FIG. 16A is a view 1600 illustrating a semicircular conductor 1610 disposed in an inner space of a housing 310 of an electronic device 801 according to various embodiments. FIG. 16B is a view 1630 explaining a method for applying a driving signal from a transmitter including multiple first electrode lines constituting a touch circuit 833 of a flexible display 430 according to various embodiments. FIG. 16C is a view 1660 explaining a method for detecting a capacitance value based on acquisition of a driving signal through a receiver including multiple second electrode lines constituting a touch circuit 833 of a flexible display 430 according to various embodiments.

Referring to FIG. 16A, at least a portion of the flexible display 430 (e.g., the flexible display 430 in FIG. 3A and FIG. 3B) of the electronic device (e.g., the electronic device 801 in FIG. 8) may be inserted into the inner space of the housing 410 (e.g., the housing 410 in FIG. 4A and FIG. 4B), and at least another portion of the flexible display 430 may be in a state of being withdrawn to the outside of the housing 410.

In an embodiment, the electronic device 801 may further include a semicircular conductor 1610 disposed in the inner space of the housing 410.

In an embodiment of FIG. 16A according to various embodiments, compared to the embodiment of FIG. 13A, as the semicircular conductor 1610 is disposed in the inner space of the housing 410, a capacitance value with respect to the display area of the flexible display 430 corresponding to a curved bending area of the flexible display 430 in FIG. 16A may be different from a capacitance value with respect to the display area 1320 of the flexible display 430 corresponding to a curved bending area of the flexible display 430 in FIG. 13A.

For example, referring to FIG. 16B, as the flexible display 430 is inserted into the inner space of the housing 410, an area 1640 including the first section (e.g., a) to the second section (e.g., b) of the display area of the flexible display 430 may be disposed in the inner space of the housing 410. For example, a partial area 1640 (e.g., an area including the first section (e.g., a) to a second section (e.g., b)) of the first section (e.g., a) to the third section (e.g., c) of the display area may be inserted into the inner space of the housing 410 and areas 1643 and 1645 excluding the area 1640 including the first section (e.g., a) to the second section (e.g., b) may be formed as a planar area.

In an embodiment, as the electronic device 801 further includes the semicircular conductor 1610 in the inner space of the housing 410, a driving signal 1620 may be applied through the transmitter 410 of the flexible display 330 and a driving signal 1625 may be applied through the semicircular conductor 1610.

In an embodiment, the driving signals 1620 and 1625 applied through the transmitter 410 of the flexible display 330 and the semicircular conductor 1610 may be acquired through a receiver (e.g., the receiver 420 in FIG. 4A) (e.g., the multiple second electrode lines) of the flexible display 430. The electronic device 301 may identify a capacitance value based on a driving signal to be acquired.

In FIG. 16C according to various embodiments, the x-axis indicates an area 1165 of the unfolded flexible display 430 and the y-axis shows a capacitance value 1670 of the flexible display 430.

Referring to FIG. 16C, a difference between a second capacitance value 1685 of the area 1640 including the first section (e.g., a) to the second section (e.g., b) and a first capacitance value 1680 of the areas 1643 and 1645 excluding the area 1640 including the first section (e.g., a) to the second section (e.g., b) in a structure including the semicircular conductor 1610 according to the embodiment of FIG. 16A may be relatively larger than a difference between the second capacitance value 1380 of the area 1320 including the first section (e.g., a) to the second section (e.g., b) and the first capacitance value 1385 of the areas 1330 and 1340 excluding the area 1320 including the first section (e.g., a) to the second section (e.g., b) in a structure not including the semicircular conductor 1610 according to the embodiment of FIG. 13A.

In FIG. 16A according to various embodiments, as a driving signal 1620 is applied from the transmitter 510 (e.g., the multiple first electrode lines) in an outward direction (e.g., direction ②) of the flexible display 430 and a driving signal 1625 is applied through the semicircular conductor 1610, the first capacitance value 1680 of the area 1640 including the first section (e.g., a) to the second section (e.g., b) may have a relatively large difference from the second capacitance value 1685 with respect the display area 1643 or 1645 of the flexible display 430 corresponding to the planar area.

In an embodiment, the electronic device 801 may determine the area 1640 including the first section (e.g., a) to the second section (e.g., b) of the flexible display 430 having the first capacitance value 1680 different from the second capacitance value 1685 as a bending area, for example, a folded area. Based on the area 1640 including the first section (e.g., a) to the second section (e.g., b) of the flexible display 430, which is determined as the folded area, a deactivation area may be determined. The electronic device 801 may determine an area 1630 excluding the deactivation area with respect to the folded area of the flexible display 430 as an activation area.

In various embodiments, the electronic device 801 may determine, as an activation area, an area exposed to the outside of the electronic device 801, for example, a second curved portion (e.g., the second curved portion 430c in FIG. 4A) of the area determined as the bending area of the flexible display 430.

In various embodiments, the electronic device 801 may further determine an area 1645 formed by the planar area of the display area of the flexible display 430, which is inserted into the housing 410, as a deactivation area.

Figure 17:
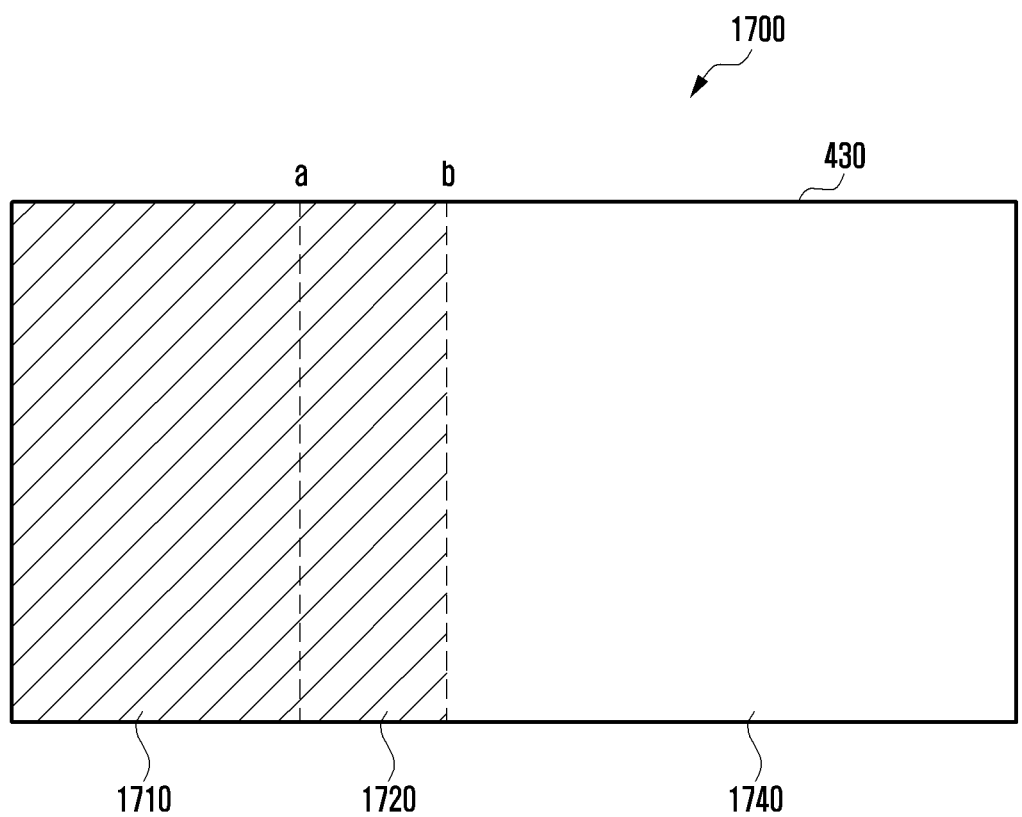
FIG. 17 is a view explaining a method for determining an activation area of a flexible display according to various embodiments.

FIG. 17 is a view 1700 explaining a method for determining an activation area of a flexible display 430 according to various embodiments.

Referring to FIG. 17, according to the embodiment of FIG. 16A to FIG. 16C described above, an electronic device (e.g., the electronic device 801 in FIG. 8) may determine an area 1720 including the first section (e.g., a) to the second section (e.g., b) of the whole display area of the flexible display 430 (e.g., the flexible display 430 in FIG. 4A and FIG. 4B) as a folded area.

For example, as shown in FIG. 16A to FIG. 16C described above, the electronic device 801 may determine the area 1720 including the first section (e.g., a) to the second section (e.g., b) as a folded area based on a capacitance value detected from the area 1720 (e.g., 1640 in FIG. 16C) including the first section (e.g., a) to the second section (e.g., b). In an embodiment, the electronic device 801 may further determine an area 1710 formed by the planar area of the display area of the flexible display 430, which is inserted into the housing 410, as a deactivation area. By way of example, the area 1710 inserted into the housing 410 may be determined based on a configuration value (e.g., a specified distance value from one end of the folded area) stored in a memory (e.g., the memory 130 in FIG. 1) of the electronic device 801 and/or a state (e.g., an intermediate state) of the electronic device 801 detected through a sensor (e.g., a Hall sensor).

In various embodiments, configuration of the deactivation area may correspond to turning off a display of a partial area 1710 or 1720 of the flexible display 430 or ignoring touch coordinates occurring in the partial area 1710 or 1720 of the flexible display 430 so as to prevent malfunction of a touch input, which may occur in the deactivated area 1710 or 1720.

In an embodiment, the electronic device 801 may determine, as an activation area, the area 1740 of the flexible display 430 excluding the area 1710 or 1720 having been determined as the deactivation area.

Figure 18A:
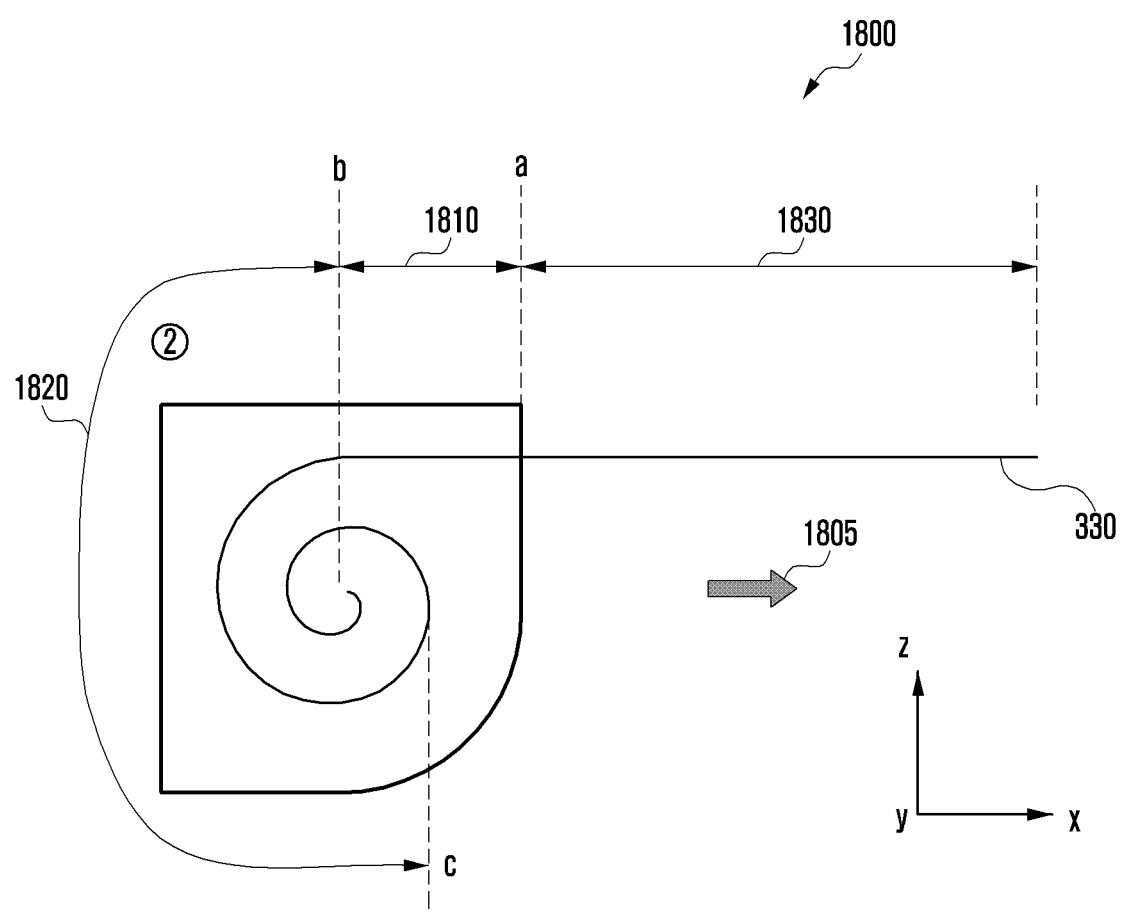
FIG. 18A and FIG. 18B views explaining a method for changing an activation area of a flexible display based on detection of a state change of the flexible display according to various embodiments.
Figure 18B:
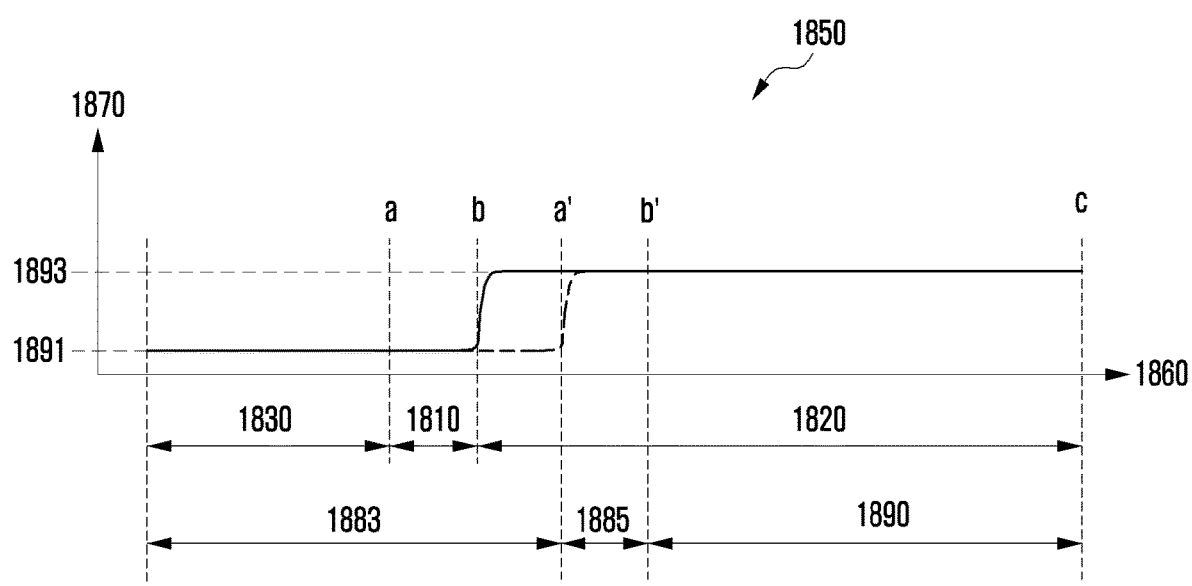

FIG. 18A and FIG. 18B views 1800 and 1850 explaining a method for changing an activation area of a flexible display 330 based on detection of a state change of the flexible display 330 according to various embodiments.

Referring to FIG. 18A, an electronic device (e.g., the electronic device 801 in FIG. 8) may detect a state change in which a flexible display (e.g., the flexible display 330 in FIG. 3A and FIG. 3B) is withdrawn 1805 to an outer space of a housing (e.g., the housing 310 in FIG. 3A and FIG. 3B). Without limitation thereto, although not shown, the state change may include a state change in which the flexible display 330 is inserted into an inner space of the housing 310.

In an embodiment, based on detecting of the state change in which the flexible display 330 is withdrawn 1805 to the outer space of the housing 310, a predetermined folded area of the flexible display 330 may be changed. For example, in case that the flexible display 330 is withdrawn 1805 to the outer space of the housing 310, a folded area of the flexible display 330 may be changed as well. For example, based on detecting of the state change in which the flexible display 330 is withdrawn from the inner space of the housing 310, the electronic device 301 may acquire, through the receiver 420, a driving signal which has been applied through the transmitter 410 constituting a touch circuit (e.g., the touch panel 833 in FIG. 8) included in the flexible display 330. The electronic device 301 may identify a capacitance value based on the capacitance value to be acquired and determine a folded area (e.g., a bending area) of the flexible display 330.

In FIG. 18B according to an embodiment, the x-axis indicates an area 160 of the unfolded flexible display 330 and the y-axis shows a capacitance value 1870 of the unfolded flexible display 330.

Referring to FIG. 18B, before detecting the state change in which the flexible display 330 is withdrawn 1805 to the outer space of the housing 310, a capacitance value of an area 1820 including the second section (e.g., b) and the third section (e.g., c) of the flexible display 330 is a second capacitance value 1893 which may be different from a first capacitance value 1891 of an activation area 1830 of the flexible display 330 and an area 1810 which is inserted into an inner space of the electronic device 801 but does not form a curved surface.

In an embodiment, based on detecting of the state change in which the flexible display 330 is withdrawn 1805 to the outer space of the housing 310, an area 1890 including the second section (e.g., b') and the third section (e.g., c) of the flexible display 330 may have a second capacitance value 1893 and based thereon, the electronic device 801 may determine the 1890 including the second section (e.g., b') and the third section (e.g., c) of the flexible display 330 having the second capacitance value 1893 as a folded area.

In an embodiment, the electronic device 801 may configure the area 1890 including the second section (e.g., b') and the third section (e.g., c) of the flexible display 330, which has been determined as the folded area, as a deactivation area. In an embodiment, an area 1885 inserted into the housing 310 to be formed to be the planar area of the display area of the flexible display 330 may be further configured as a deactivation area.

In an embodiment, as the folded area of the flexible display 330 is changed, the activation area of the flexible display 430 may be changed as well. For example, based on detecting of the state change in which the flexible display 330 is withdrawn 1805 to the outer space of the housing 310, the activation area 1830 of the flexible display 430 may be changed into an area 1883.

Figure 19:
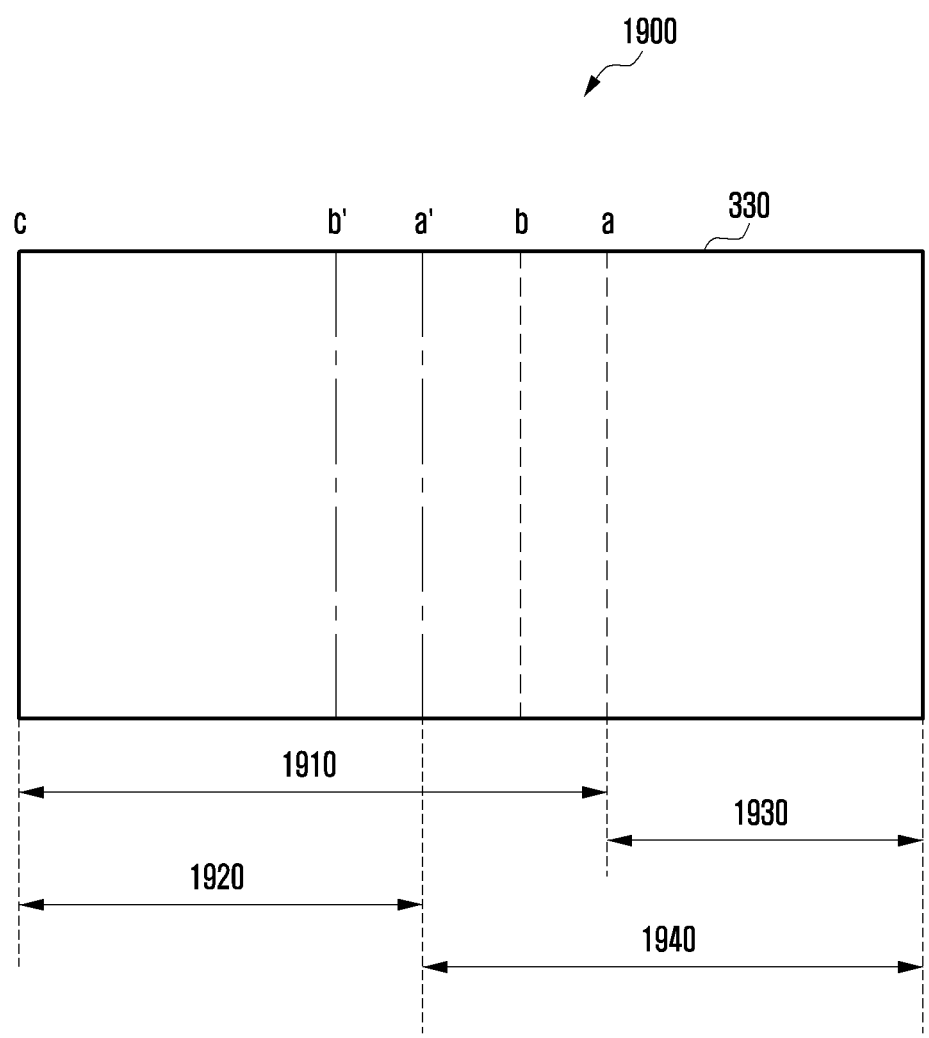
FIG. 19 a view explaining a method for changing an activation area of a flexible display based on detection of a state change of the flexible display according to various embodiments.

FIG. 19 a view 1900 explaining a method for changing an activation area of a flexible display 330 based on detection of a state change of the flexible display 330 according to various embodiments.

Referring to FIG. 19, in a state in which an area including the second section (e.g., b) and the third section (e.g., c) of the whole display area of the flexible display 330 (e.g., the flexible display 330 in FIG. 3A and FIG. 3B) is determined as a folded area, an electronic device (e.g., the electronic device 801 in FIG. 8) may detect a state change of the flexible display 330. The state change may include a change to a state in which the flexible display 330 is withdrawn to the outside of the housing 310 or inserted into the inner space of the housing 310. In case that a state change of the flexible display 330 is detected, the deactivation area and the activation area of the display area of the flexible display 330 may be changed as well.

In an embodiment, in a state in which the flexible display 330 is rolled, the electronic device 301 may determine a first area 1930 of the whole display area of the flexible display 330 as an activation area and determine a second area 1910 as a deactivation area. After determining the first area 1930 as an activation area, the electronic device 801 may determine a valid touch area as the first area 1930.

In an embodiment, in case of detecting a state change of the flexible display 330, the deactivation area of the flexible display 330 may be changed from the second area 1910 to a third area 1920, and accordingly, the activation area of the flexible display 330 may be changed from the first area 1930 to a fourth area 1940.

In various embodiments, although not shown, in case of detecting a state change of the flexible display 330, based on that the deactivation area and the activation area of the display area of the flexible display 330 are changed, the electronic device 801 may reconfigure a screen to rearrange and/or adjust a ratio of visual information to be displayed on the flexible display 330 so as to correspond to the changed activation area. The electronic device 801 may display the screen reconfigured to correspond to the changed activation area through the activation area of the flexible display 330.

Figure 20A:
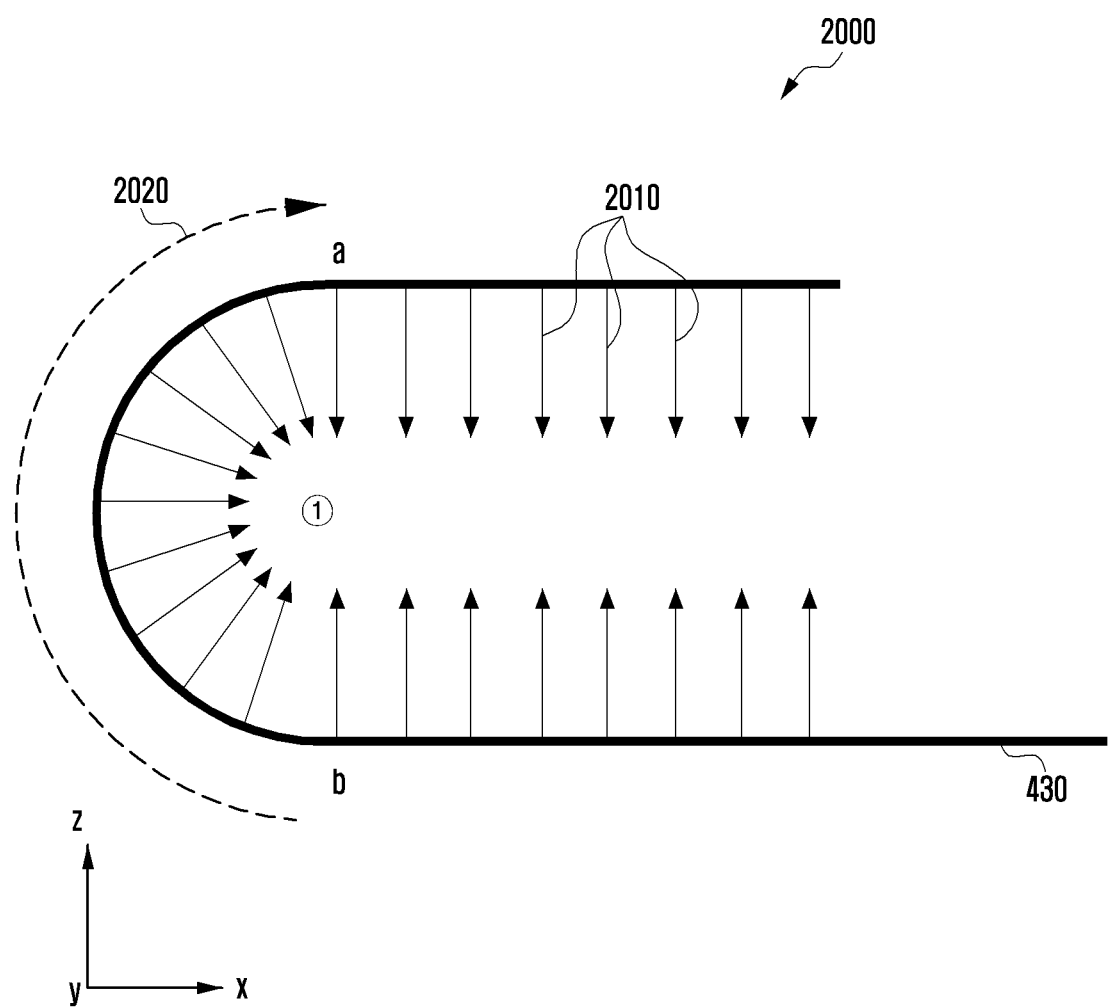
FIG. 20A and FIG. 20B views explaining a method for changing an activation area of a flexible display based on detection of a state change of the flexible display according to various embodiments.
Figure 20B:
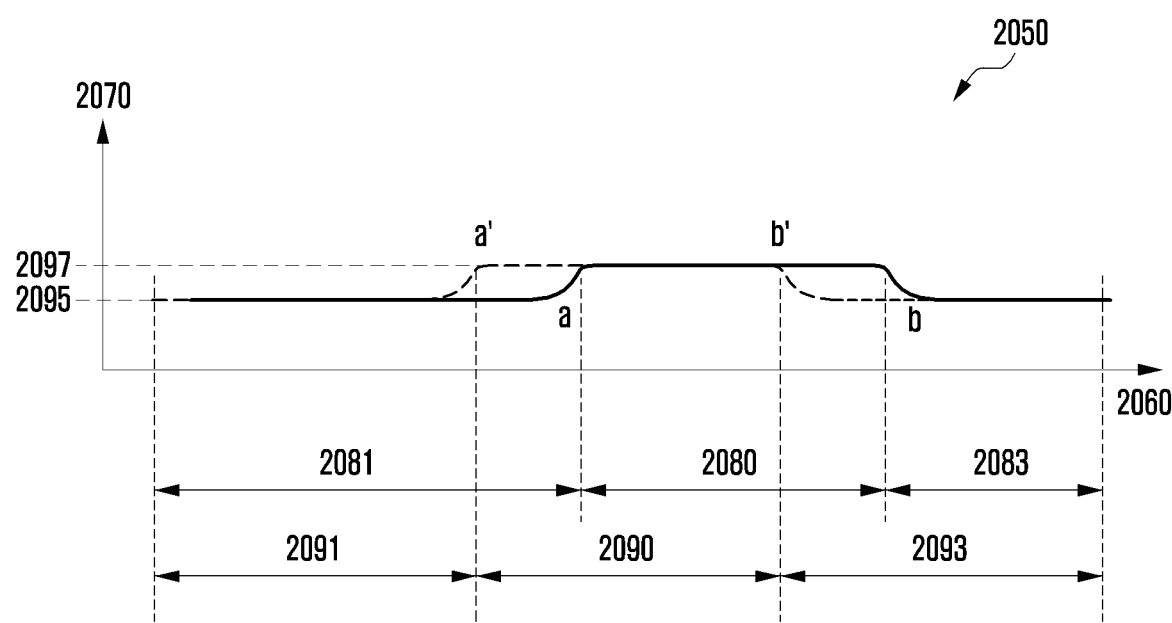

FIG. 20A and FIG. 20B are views 2000 and 2050 explaining a method for changing an activation area of a flexible display 430 based on detection of a state change of the flexible display 430 according to various embodiments.

Referring to FIG. 20A, an electronic device (e.g., the electronic device 801 in FIG. 8) may detect a state change in which a flexible display (e.g., the flexible display 430 in FIG. 4A and FIG. 4B) is withdrawn 2020 to an outer space of a housing (e.g., the housing 410 in FIG. 4A and FIG. 4B). Without limitation thereto, although not shown, the state change may include a state change in which the flexible display 430 is inserted into an inner space of the housing 410.

In an embodiment, based on detecting of the state change in which the flexible display 330 is withdrawn 2020 to the outer space of the housing 310, movement of a folded area of the flexible display 430 may be detected. For example, in case that the flexible display 430 moves 1220 in a clockwise direction (e.g., the x-axis direction) (e.g., in case that the flexible display 430 is withdrawn from the inner space of the housing 410), a bending area of the flexible display 430 may be moved (changed).

In FIG. 20B according to an embodiment, the x-axis indicates an area 2060 of the unfolded flexible display 430 and the y-axis shows a capacitance value 2070 of the unfolded flexible display 430.

For example, referring to FIG. 20B, before detecting the state change in which the flexible display 430 is withdrawn 2020 to the outer space of the housing 410, a capacitance value of an area 2080 including the first section (e.g., a) to the second section (e.g., b) of the flexible display 430 is a second capacitance value 2097 which may be different from a first capacitance value 2095 of an second area (e.g., an activation area 2083 of the flexible display 430 and a planar area 2081 inserted into the housing 410) of the flexible display 430. For example, the second capacitance value 2097 of the area 2080 including the first section (e.g., a) to the second section (e.g., b) of the flexible display 430 may be relatively larger than the first capacitance value 2095 of the second area (e.g., the activation area 2083 of the flexible display 430 and the planar area 2081 inserted into the housing 410) of the flexible display 430.

In an embodiment, based on detecting of the state change in which the flexible display 430 is withdrawn 2020 to the outer space of the housing 410, an area 2090 including the third section (e.g., a') to the fourth section (e.g., b') of the flexible display 430 may have a second capacitance value 2097 and based thereon, the electronic device 801 may determine the 2090 including the third section (e.g., a') to the fourth section (e.g., b') of the flexible display 430 having the second capacitance value 2097 as a folded area.

In an embodiment, the electronic device 801 may configure the area 2090 including the third section (e.g., a') and the fourth section (e.g., b') of the flexible display 330, which has been determined as the folded area, as a deactivation area. In an embodiment, an area 2091 inserted into the housing 410 to be formed to be the planar area of the display area of the flexible display 430 may be further configured as a deactivation area.

In an embodiment, as the folded area of the flexible display 330 is changed, the activation area of the flexible display 430 may be changed as well. For example, based on detecting of the state change in which the flexible display 330 is withdrawn 2020 to the outer space of the housing 310, the activation area 2083 of the flexible display 430 may be changed into an area 2093.

Figure 21:
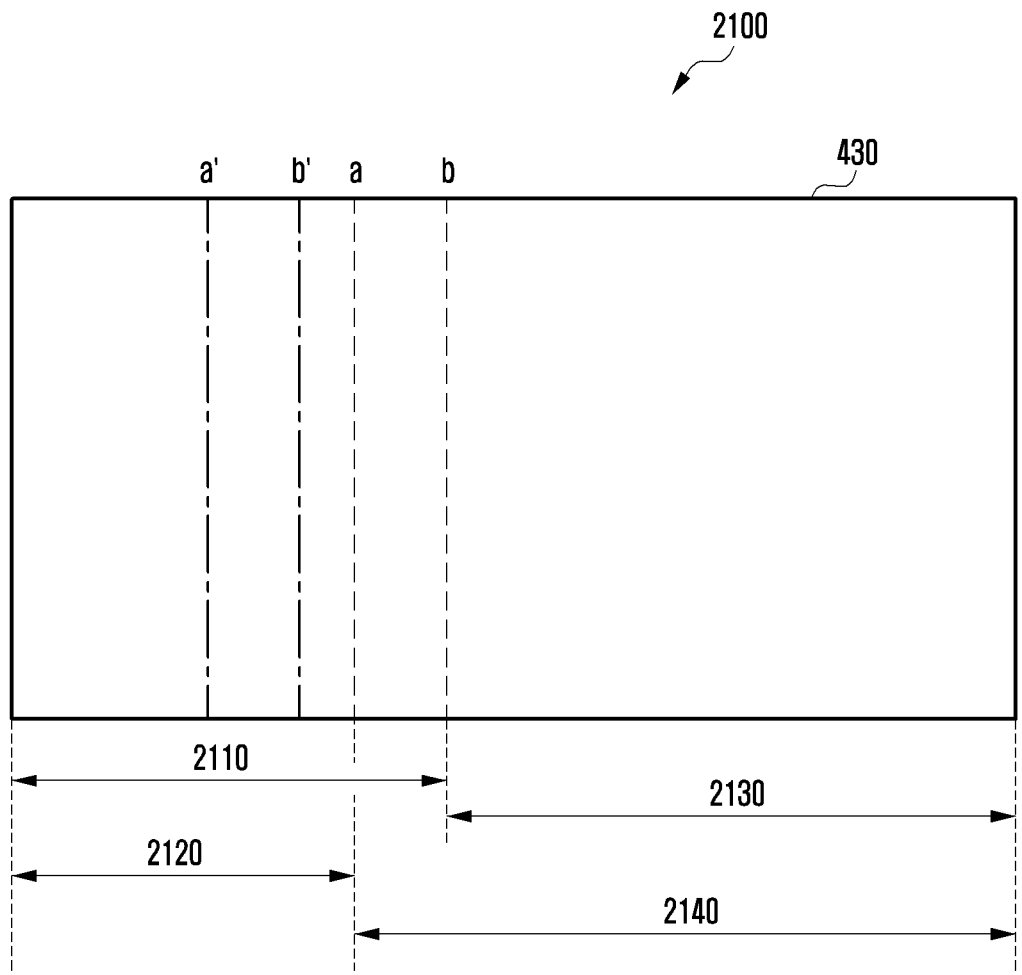
FIG. 21 a view explaining a method for changing an activation area of a flexible display based on detection of a state change of the flexible display according to various embodiments.

FIG. 21 is a view 2100 explaining a method for changing an activation area of a flexible display 430 based on detection of a state change of the flexible display 430 according to various embodiments.

Referring to FIG. 21, in a state in which an area including the first section (e.g., a) and the second section (e.g., b) of the whole display area of the flexible display 430 (e.g., the flexible display 430 in FIG. 4A and FIG. 4B) is determined as a bending area (or a folded area), an electronic device (e.g., the electronic device 801 in FIG. 8) may detect a state change of the flexible display 430. The state change may include a change to a state in which the flexible display 430 is withdrawn to the outer space of the housing 410 or inserted into the inner space of the housing 410. Based on detecting of a state change of the flexible display 430, the bending area and the activation area of the display area of the flexible display 430 may be changed.

In an embodiment, in a state in which the flexible display 430 is folded or rolled, the electronic device 801 may determine a first area 2130 of the whole display area of the flexible display 430 as an activation area and determine a second area 2110 as a deactivation area. After the first area 2130 is determined as the activation area, in case that the bending area (e.g., an area including the first section (e.g., a) to the second section (e.g., b)) is used as a touch area, the electronic device 801 may a valid touch area as a third area 2140. For example, in case that the electronic device 801 reproduces a multimedia content, a UX capable of performing a control operation required for multimedia content reproduction, such as play, fast forward, rewind, pause, and/or volume control, may be displayed on the bending area.

In an embodiment, in case of detecting of the state change of the flexible display 430, the bending area of the flexible display 430 may be changed as well. For example, according to the embodiments of FIG. 20A and FIG. 20B, as the bending area is changed from the first section (e.g., a) to the second section (e.g., b) and from third section (e.g., a') to the fourth section (e.g., b'), the activation area of the flexible display 430 may be changed from the first area 2130 to the third area 2140 with reference to the third section (e.g., a') to the fourth section (e.g., b') and the deactivation area may be changed from the second area 2110 to a fourth area 2120.

In various embodiments, although not shown, in case of detecting a state change of the flexible display 430, based on that the bending area and the activation area of the display area of the flexible display 430 are changed, the electronic device 801 may reconfigure a screen to rearrange and/or adjust a ratio of visual information to be displayed on the flexible display 430 so as to correspond to the changed activation area. The electronic device 801 may display the screen reconfigured to correspond to the changed activation area through the activation area of the flexible display 430.

In various embodiments, although not shown, in case that a rear surface of the flexible display 430 is used, the first section (e.g., a) or the third section (e.g., a') according to a state change of the flexible display 430 may function as a reference for determining the activation area of the display area on the rear surface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
 a housing;
 a touch circuit comprising multiple TX electrodes and multiple RX electrodes, wherein the multiple RX electrodes are arranged to cross over the multiple TX electrodes;
 a flexible display comprising the touch circuit, the flexible display being movable out from an inner space of the housing;
 a touch controller; and
 a processor operatively connected to the touch circuit, the flexible display, and the touch controller,
 wherein the touch controller is configured to:
 apply a driving signal through the multiple TX electrodes of the touch circuit;
 acquire the driving signal through the multiple RX electrodes;
 identify a capacitance value based on the acquired driving signal; and identify information about a folded area of the flexible display based on the capacitance value, and wherein the processor is configured to:
based on the information about the folded area of the flexible display, determine an activation area with respect to an unfolded area of the flexible display;

determine an area of the display area of the flexible display, which is inserted into the inner space of the housing and formed to be a planar area, as a deactivation area;

detect movement of the folded area based on the capacitance value;

adjust the activation area based on the detected movement of the folded area;

adjust a ratio of a screen including visual information to be displayed on an adjusted activation area and reconfigure the screen including the visual information based on the adjusted activation area; and output the reconfigured screen through the adjusted activation area.

2. The electronic device of claim 1, wherein the processor is further configured to determine an area of the display area of the flexible display excluding the folded area and the area inserted into the inner space of the housing and formed to be a planar area, as the unfolded area.

3. The electronic device of claim 1, wherein the touch controller is further configured to:
identify whether a state change of the flexible display is detected after the activation area with respect to the unfolded area of the flexible display is determined; and
identify the capacitance value based on the driving signal acquired through the multiple RX electrodes as applied through the multiple TX electrodes, wherein the change in driving signal is based on the detection of the state change of the flexible display.

4. The electronic device of claim 1, wherein the touch controller is further configured to identify the capacitance value based on the driving signal acquired through the multiple RX electrodes as applied through the multiple TX electrodes at a designated time interval after the activation area with respect to the unfolded area of the flexible display is determined.

5. The electronic device of claim 1, further comprising a semicircular conductor disposed in the inner space of the housing.

6. The electronic device of claim 5, wherein the touch controller is further configured to apply the driving signal by using the semicircular conductor based on the detection of a state change of the flexible display.

7. The electronic device of claim 1, wherein the state change of the flexible display comprises a change into a state in which the flexible display is withdrawn from the inner space of the housing of the electronic device or inserted into the inner space of the housing.

8. A method for display of an electronic device comprising a flexible display, the method comprising:
applying a driving signal by using multiple TX electrodes of a touch circuit included in the flexible display;

acquiring the driving signal through multiple RX electrodes of the touch circuit;

identifying a capacitance value based on the acquired driving signal;

identifying information about a folded area of the flexible display based on the capacitance value;

determining, based on the information about the folded area of the flexible display, an activation area with respect to an unfolded area of the flexible display;

determining an area of the display area of the flexible display, which is inserted into the inner space of a housing of the electronic device and formed to be a planar area, as a deactivation area;

detecting movement of the folded area based on the capacitance value;

adjusting the activation area based on the detected movement of the folded area;

adjusting a ratio of a screen including visual information to be displayed on an adjusted activation area and reconfigure the screen including the visual information based on the adjusted activation area; and outputting a reconfigured screen through the adjusted activation area.

9. The method of claim 8, wherein the determining of the activation area with respect to the unfolded area of the flexible display comprises:
determining an area of the display area of the flexible display excluding the folded area and the area inserted into the inner space of the housing and formed to be a planar area, as the unfolded area.

10. The method of claim 8, further comprising:
identifying whether a state change of the flexible display is detected after the activation area with respect to the unfolded area of the flexible display is determined; and
identifying the capacitance value based on the driving signal acquired through the multiple RX electrodes as applied through the multiple TX electrodes, wherein the change in driving signal is based on the detection of the state change of the flexible display.

11. The method of claim 8, further comprising:
identifying the capacitance value based on the driving signal acquired through the multiple RX electrodes as applied through the multiple TX electrodes at a designated time interval after the activation area with respect to the unfolded area of the flexible display is determined.

12. The method of claim 11, further comprising:
detecting movement of the folded area based on the capacitance value; and
adjusting the activation area based on the detected movement of the folded area.

13. The method of claim 8, wherein the electronic device comprises a semicircular conductor disposed in an inner space of a housing of the electronic device.

14. The method of claim 13, further comprising: applying the driving signal by using the semicircular conductor based on detection of a state change of the flexible display.

* * * * *